(12) United States Patent
Celikkol et al.

(10) Patent No.: US 10,183,732 B2
(45) Date of Patent: Jan. 22, 2019

(54) POSE DETECTION AND CONTROL OF UNMANNED UNDERWATER VEHICLES (UUVS) UTILIZING AN OPTICAL DETECTOR ARRAY

(71) Applicant: University of New Hampshire, Durham, NH (US)

(72) Inventors: Barbaros Celikkol, Durham, NH (US); Firat Eren, Durham, NH (US); Shachak Pe'eri, Silver Spring, MD (US); Yuri Rzhanov, Nottingham, NH (US); M. Robinson Swift, Durham, NH (US); May-Win Thein, Lee, NH (US)

(73) Assignee: University of New Hamphire, Durham, NH (US)

( * ) Notice: Subject to any disclaimer, the term of this patent is extended or adjusted under 35 U.S.C. 154(b) by 0 days.

(21) Appl. No.: 15/094,453

(22) Filed: Apr. 8, 2016

(65) Prior Publication Data
US 2016/0334793 A1 Nov. 17, 2016

Related U.S. Application Data

(60) Provisional application No. 62/145,077, filed on Apr. 9, 2015.

(51) Int. Cl.
*G05D 1/00* (2006.01)
*G08G 3/00* (2006.01)
(Continued)

(52) U.S. Cl.
CPC ............ *B63G 8/001* (2013.01); *G01C 21/20* (2013.01); *G01S 3/781* (2013.01); *G01S 3/784* (2013.01);
(Continued)

(58) Field of Classification Search
CPC ........ B63G 2008/008; B63G 2008/007; B63G 8/32; B63G 8/39; B63B 2027/165; B63B 2211/02; B63B 2022/006; G02F 2001/133334; G02F 1/13363; G02F 2202/36; H01S 3/1062; H01S 3/1083; H01S 3/1118; G01S 15/588; G01S 11/14; G01S 15/8904; G01S 7/52004; G01S 3/46; G01S 19/34; G06F 2203/04105; G06F 17/3087; G06F 1/163; G06F 3/017; G06F 3/0416; G06F 3/044; G01C 21/206; G01C 3/08; G05D 1/0223; G05D 1/0231; G05D 1/0246; G05D 1/00; G05D 1/02
(Continued)

(56) References Cited

U.S. PATENT DOCUMENTS 5,991,023 A * 11/1999 Morawski ............. G01J 3/0259
356/326
6,424,416 B1 * 7/2002 Gross ........................ G01J 3/02
356/326

(Continued)

*Primary Examiner* — Courtney D Heinle
*Assistant Examiner* — Luis A Martinez Borrero
(74) *Attorney, Agent, or Firm* — Finch & Maloney PLLC

(57) ABSTRACT

Optical detectors and methods of optical detection for unmanned underwater vehicles (UUVs) are disclosed. The disclosed optical detectors and may be used to dynamically position UUVs in both static-dynamic systems (e.g., a fixed light source as a guiding beacon and a UUV) and dynamic-dynamic systems (e.g., a moving light source mounted on the crest of a leader UUV and a follower UUV).

22 Claims, 24 Drawing Sheets

(51) Int. Cl.
*G01S 3/784* (2006.01)
*B63G 8/00* (2006.01)
*G05D 1/12* (2006.01)
*G01C 21/20* (2006.01)
*G01S 3/781* (2006.01)
*G05D 1/08* (2006.01)

(52) U.S. Cl.
CPC ..... *G05D 1/0875* (2013.01); *B63G 2008/004* (2013.01); *B63G 2008/005* (2013.01)

(58) Field of Classification Search
USPC .................................. 701/21, 2, 3, 472, 494
See application file for complete search history.

(56) References Cited

U.S. PATENT DOCUMENTS

| | | | | |
|---|---|---|---|---|
| 6,700,835 | B1* | 3/2004 | Ward | F16L 1/26 367/131 |
| 7,365,845 | B2* | 4/2008 | Takahashi | G01J 3/02 356/326 |
| 7,720,554 | B2* | 5/2010 | DiBernardo | G01S 5/163 356/139.03 |
| 8,050,523 | B2* | 11/2011 | Younge | A61B 5/1076 385/13 |
| 8,226,042 | B1* | 7/2012 | Howell | B63B 27/36 244/137.4 |
| 8,462,406 | B2* | 6/2013 | Takizawa | G01J 3/02 356/326 |
| 8,768,620 | B2* | 7/2014 | Miller | G01C 21/16 701/500 |
| 8,908,476 | B2* | 12/2014 | Chun | B63G 8/001 114/312 |
| 8,929,178 | B2* | 1/2015 | Lichter | G01S 7/521 367/173 |
| 8,965,682 | B2* | 2/2015 | Tangirala | G01C 21/165 701/408 |
| 8,983,682 | B1 | 3/2015 | Peeters et al. | |
| 9,086,375 | B2* | 7/2015 | Priest | B82Y 20/00 |
| 9,223,025 | B2* | 12/2015 | Debrunner | G01S 17/89 |
| 9,250,081 | B2* | 2/2016 | Gutmann | G05D 1/0231 |
| 9,417,180 | B2* | 8/2016 | Seo | G01N 21/211 |
| 9,665,182 | B2* | 5/2017 | Send | G01S 17/32 |
| 9,796,089 | B2* | 10/2017 | Lawrence, III | G01B 11/24 |
| 9,812,018 | B2* | 11/2017 | Celikkol | G01S 3/784 |
| 9,857,313 | B2* | 1/2018 | Durand De Gevigney | G01N 21/8851 |
| 2003/0043363 | A1* | 3/2003 | Jamieson | G01C 23/005 356/5.01 |
| 2004/0030570 | A1 | 2/2004 | Solomon | |
| 2005/0088318 | A1 | 4/2005 | Liu et al. | |
| 2005/0213092 | A1* | 9/2005 | MacKinnon | G01J 1/32 356/336 |
| 2006/0215177 | A1* | 9/2006 | Doerband | G01B 11/2509 356/609 |
| 2008/0137933 | A1* | 6/2008 | Kim | G01B 9/021 382/131 |
| 2008/0300742 | A1* | 12/2008 | Weaver | B63C 11/40 701/21 |
| 2009/0103083 | A1* | 4/2009 | Kremeyer | G01N 21/1702 356/317 |
| 2010/0168949 | A1* | 7/2010 | Malecki | G05D 1/0676 701/24 |
| 2010/0204964 | A1* | 8/2010 | Pack | G06T 7/521 703/1 |
| 2010/0245792 | A1* | 9/2010 | Bijnen | G03B 27/42 355/53 |
| 2010/0269143 | A1 | 10/2010 | Rabowsky | |
| 2011/0229141 | A1* | 9/2011 | Chave | H04B 13/02 398/104 |
| 2012/0101715 | A1* | 4/2012 | Tangirala | G01C 21/165 701/408 |
| 2013/0342848 | A1* | 12/2013 | Nebosis | G01N 21/4795 356/479 |
| 2014/0012434 | A1* | 1/2014 | Spence | G01S 15/93 701/2 |
| 2014/0076985 | A1* | 3/2014 | Pettersson | B05B 12/122 239/11 |
| 2014/0220923 | A1 | 8/2014 | Shoshan et al. | |
| 2014/0300885 | A1* | 10/2014 | Debrunner | G01S 17/89 356/4.01 |
| 2015/0092178 | A1* | 4/2015 | Debrunner | G01S 17/89 356/4.01 |
| 2015/0378361 | A1* | 12/2015 | Walker | G05D 1/0206 701/21 |
| 2016/0189362 | A1* | 6/2016 | Evers-Senne | G06T 7/70 348/46 |
| 2016/0253906 | A1* | 9/2016 | Celikkol | G01S 3/784 701/21 |
| 2016/0266246 | A1* | 9/2016 | Hjelmstad | G01S 17/023 |
| 2017/0097574 | A1* | 4/2017 | Goodwin | G03F 7/70141 |

* cited by examiner

POSE DETECTION AND CONTROL OF UNMANNED UNDERWATER VEHICLES (UUVS) UTILIZING AN OPTICAL DETECTOR ARRAY

CROSS-REFERENCE TO RELATED APPLICATIONS

This application claims the benefit of U.S. Provisional Patent Application No. 62/145,077, filed on Apr. 9, 2015, which is hereby incorporated herein by reference in its entirety.

BACKGROUND OF THE INVENTION

Unmanned underwater vehicles (UUVs) play a major role in deep oceanic applications, such as underwater pipeline and cable inspection, bathymetry exploration as well as in military applications such as mine detection, harbor monitoring and anti-submarine warfare. These applications mostly take place in deep sea environment and include heavy duty tasks that may take long time periods and therefore, are not suitable to be performed by divers. Some underwater operations (e.g., surveying a large area or an area with a complex seafloor bathymetry) require more than one Unmanned Underwater Vehicle (UUV) for efficient task completion. In these cases, the deployment of multiple UUVs in formation can perform such tasks and reduce the operational time and costs.

SUMMARY OF THE INVENTION

In laboratory conditions at University of New Hampshire (UNH) Jere A. Chase Ocean Engineering facilities, it has been demonstrated that an optical detector array is capable of discriminating pose in three translational axes, x, y and z. In addition, the optical detector array is capable of generating velocity signal as feedback to the Unmanned Underwater Vehicle control system. The accuracy of the pose estimations with respect to a light source as a guiding beacon is within 0.5 m in x-axis and 0.2 m for y and z-axes. The velocity estimations in x-axis are within 0.14 m/s.

In order to predict the pose estimation performance in different water conditions such as in Portsmouth Harbor, N.H., uncertainty analysis has been conducted through Monte Carlo simulations. The simulations results suggest that under the calibration conditions conducted at UNH Ocean Engineering facilities, the pose estimations performance in predicted Portsmouth Harbor water conditions decrease by 1 m in x-axis, 0.05 m for y-axis and 0.2 m for z-axis.

As part of the research for development of a leader-follower formation between unmanned underwater vehicles (UUVs), this study presents utilization of optical feedback for UUV navigation by developing an optical detector array. Capabilities of pose detection and control in a static-dynamic system (e.g., a UUV navigation into a docking station) and a dynamic-dynamic system (UUV-UUV leader-follower) are investigated. In both systems, a single light source is utilized as a guiding beacon for the UUV and an optical array consisting of photodiodes is used to receive the light field emitted from the light source.

For UUV navigation applications, accurate pose estimation is important. In order to evaluate the feasibility of underwater distance detection, experimental work is conducted. Based on the experiments, the range of operations between two platforms, i.e., light source and optical detector, the optimum spectral range that allowed maximum light transmission is calculated. Based on the light attenuation in underwater, dimensions of an optical detector array are determined. The boundary conditions for the pose detection algorithms and the error sources in the experiments are identified.

As a test-bed to determine optical array dimensions and size, a simulator, i.e., numerical software, is developed. In the simulator, planar and curved array geometries of varying number of elements are analytically compared and evaluated. Results show that the curved optical detector array is able to distinguish 5-DOF motion (translation in x, y, z and pitch and yaw rotations) with respect to the single light source. The positional changes of 0.2 m and rotational changes of 10 o within 4 m-8 m range in x-axis can be detected. Analytical pose detection and control algorithms are developed for both static-dynamic (UUV-docking station) and dynamic-dynamic (UUV-UUV) systems for dynamic positioning applications. Three different image processing algorithms, i.e. phase correlation and log-polar transform, Spectral Angle Mapper (SAM), and image moment invariants, are evaluated for pose detection of the UUVs. The efficacy of Proportional-Integral-Derivative (PID) and Sliding Mode Controller) SMC is evaluated for static-dynamic systems. The algorithms are developed for curved optical detectors of size 21×21 and 5×5 for varying single DOF static-dynamic system controls and multiple initial condition static-dynamic control as well as dynamic-dynamic control. Results show that a 5×5 detector array with the implementation of SMC is sufficient for UUV dynamic positioning applications.

The capabilities of an optical detector array to determine the pose of a UUV in 3-DOF (x, y and z-axes) are experimentally tested. An experimental platform consisting of a 5×5 photodiode array mounted on a hemispherical surface is used to sample the light field emitted from a single light source. Pose geometry calibrations are conducted by collecting images taken at 125 positions in 3-D space. Pose detection algorithms are developed to detect pose for steady-state and dynamic cases. Monte Carlo simulations are conducted to assess the pose estimation uncertainty under varying environmental and hardware conditions such as water turbidity, temperature variations in water and electronics noise. Experimental results demonstrate that x, y and z-axis pose estimations are accurate within 0.3 m, 0.1 m and 0.1 m respectively. Monte Carlo simulation results show that the pose uncertainties (95%) associated with x, y and z-axes are 1.5 m, 1.3 m and 1 m, respectively.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 6E shows a serial to USB port check on PC.

FIG. 6F shows an arm login and password screen.

FIG. 6G shows Arduino Device names verified in the BB-XM.

FIG. 6H shows a program that reads data from two Arduinos and passes it to the pc. (readPD.py)

DETAILED DESCRIPTION

Figure 1A:
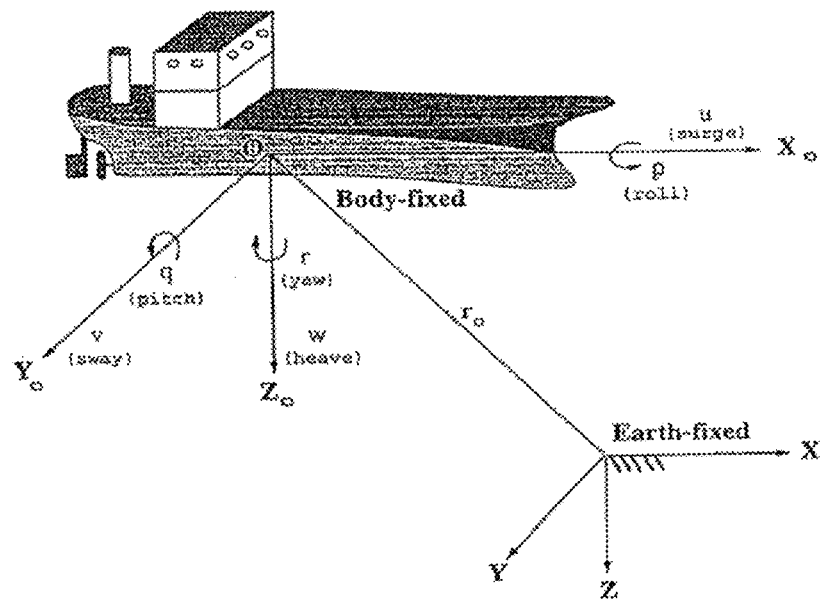
FIG. 1A shows a body-fixed reference frame and an earth fixed reference frame.

A requirement for a group of UUVs to move in a controlled formation is an underwater communication link between the UUVs. In addition to UUV operation in formation, underwater communication links can also be used for UUV docking or data transfer from an operating UUV to a data storage platform. The two latter applications allow UUVs to operate with longer periods underwater without the need for excessive emerging/submerging. This study presents the development of an optical feedback interface and control system for two types of UUV applications: 1) Static-Dynamic system (e.g., a UUV and a data transfer/storage platform such as a docking station) and 2) Dynamic-Dynamic system (i.e., formation control of at least two UUVs). A requirement for a fleet of UUVs to move in a controlled formation is a reliable underwater communication link between all UUVs and between the UUV to a docking station.

There is a variety of possible formation architectures for controlled formation of unmanned vehicles. Most of these architectures require specialized on-board hardware to enable communication between the vehicles in formation. For coordinated formation control of unmanned vehicles, a variety of formation architectures and strategies have been developed. The main strategies include:

Virtual structure approach—In this approach, the whole fleet is treated as a single rigid structure. The main advantage of this approach is that a highly precise formation can be maintained. However, its disadvantage is that the position and orientation from the agents' states requires high computational complexity.

Behavior based methods—Several behaviors for each robot are employed and final control action is obtained from the weighting of each behavior. However, the stability of the system is not guaranteed because there is not enough modeling information for the subsystems and the environment.

Leader-follower—This method employs one vehicle as the leader that guides the other vehicles in the formation (the followers). Based on one-way communication transmitted from the leader, the followers position themselves relative to the leader position and orientation. The leader-follower method is considered less complex than the other approaches as it requires no feedback from the followers to the leader. The disadvantage of this method is that if there is an error in the leader's trajectory, the followers deviate from their trajectory as well and the error accumulates.

Artificial potentials—In artificial potentials an interaction control force is defined between the vehicles. The artificial potential use this force to enforce a desired inter-vehicle spacing. In this method, there is no leader vehicle assigned in the fleet. This eliminates the single point failures and adds robustness to the system. However, the assumption is that each node is equipped with a sensor allowing it to determine the range and forces between each node, which increase the number of hardware and complexity in the system.

Graph theory—Graph theory allows flexibility in changing the group formation during the operation. However, this approach needs a list of all possible transition geometries that is expected to occur in the robots that are in the formation. In addition, a good plan of action is needed when faced with environmental and sensor constraints.

The formation control approach used in this study, more specifically in the dynamic-dynamic system, is the leader-follower strategy because of the simplicity in its implementation. In an underwater environment, the communication signals commonly used in aerial and terrestrial vehicles (e.g., GPS and radio signals) are significantly attenuated and thus cannot be used.

Most studies on inter-communication between UUVs have concentrated on acoustic communication that performs well over long distances. Acoustic communication types used in underwater operations consist of Long Baseline (LBL), Short Baseline (SBL) and Ultra-Short Baseline (USBL) systems. In LBL, multiple acoustic transponders are placed on the seafloor and provide high accuracy navigation for underwater tasks that require precision. LBL systems are used in leader-follower formation flying systems SBL systems are mainly used for tracking of the underwater vehicles and divers. Unlike LBL systems, SBL transponders are not placed on the seafloor. Multiple SBL transponders are placed in water from the sides of the ship and one transponder is placed on the target to be tracked. SBL systems are used in UUV to docking station communication. USBL systems which offer fixed precision consist of two transponders, one is lowered to the sea on the ship and the other one is placed on the target of interest. In addition, USBL systems have found application in docking systems as well. However, the necessary hardware for acoustics communication is costly and requires payload considerations in the UUV platform design. In areas with large traffic volume, such as harbor and recreational fishing areas, the marine environment can become acoustically noisy that can reduce the performance of the acoustic communication and may not allow UUV operations such as docking.

A cost-effective alternative is optical detection that either uses existing hardware (e.g., light sources as beacons) or additional hardware, i.e. low cost, commercially available off the shelf (COTS) photo detectors, etc. In astronautical and aeronautical applications, optical communications are used for navigation, docking and data transfer. For example, free space optical communication is used in rendezvous radar antenna systems. In both cases of interspacecraft rendezvous and docking, a continuous-wave laser is transmitted from the pursuer spacecraft to a target spacecraft or to aid in the docking process. The challenge to conduct underwater optical communication is that light is significantly more scattered and absorbed in water than it is in air. As a result, the effective communication range is, however, shorter than that of acoustic communication. Optical communication for data transfer in underwater was demonstrated at range of 30 m for clear water conditions. In addition to relatively shorter range of operation, the optical properties of water (e.g., diffuse attenuation coefficient and scattering) constantly change and affect communication reliability.

In some examples, detector arrays consisting of individual optical detector elements are used for pose detection between UUVs. Many possible geometric shapes for optical detector arrays exist. In various examples, two array designs are presented: planar and curved. Each design has its own benefits. A planar-array design can maximize the signal-to-noise ratio between all its elements, while curved arrays require a smaller number of optical elements and results in a larger field of view.

Currently, studies that have investigated optical communication for UUVs are very limited and focus on planar arrays for Autonomous Underwater Vehicles (AUVs). These studies include an estimation of AUV orientation to a beacon by using a photodiode array and distance measurement between two UUVs. In addition to array designs for communication between UUVs, other studies have investigated optical communications for docking operations. For example, a single detector (quadrant photodiode) has been used to operate as a 2×2 detector array. In addition, researchers have mounted an optical detector on an AUV to detect translational motion of the AUV with respect to a light source. Optical communication for distance sensing between a swarm of UUVs was conducted using a LED transceiver with an IrDA encoder/decoder chip. In addition to navigation purposes, the use of optical communication has been investigated for transmitting remote control commands and data transfer rates. Results based on laboratory and field work showed that an optical modem system consisting of an omnidirectional light source and photomultiplier tube can achieve a data streaming rate of up to 10 Mbit/s, with a reported 1.2 Mbit/s data transfer rate up to 30 m underwater in clear water conditions. Other studies utilized underwater sensor network consisting of static and mobile nodes for high-speed optical communication system, where a point-to-point node communication is proposed for data muling.

Previous studies using acoustic communication evaluated the control performance of the UUVs for docking applications, namely using Autonomous Underwater Vehicles (AUVs) that include: Adaptive Control Strategy Proportional-Integral-Derivative (PID); Multi-Input-Multi-Output controller; and Sliding Mode Controller (SMC) and its variants, namely High-Order SMC (HOSMC) and State Dependent Riccati Equation-HOSMC (SDRE-HOSMC). Recent studies have demonstrated the potential use of both acoustic and optical communication for docking. In these systems, acoustic communication is used in relatively longer ranges, 100 m, for navigating towards a docking station and video cameras are used in closer ranges, 8-10 m, to guide the vehicle into the docking station. In this study, PID and SMC are investigated for both static-dynamic and dynamic-dynamic systems.

The scope of some examples includes control between two UUVs and between a UUV and docking stations) using primarily or only optical communication. The work investigated control theory and ocean optics concepts that are used to develop models, algorithms and hardware. Three main goals of this study are, for example:

1) Design of a cost-effective optical detector array interface. In order to receive feedback to the controls, an optical detector array interface is vital. A guiding light beacon will be used as a transmitter. The light field intersecting with the detector module will be translated into an electronic signal for pose detection and control purposes.

2) Evaluation of control and image processing algorithms to be used in pose detection and UUV control. For timely and stable response of the UUV to the changes in the optical input coming from another UUV or a docking station, the performance of image processing and control algorithms need to be evaluated. The performance should take into account the optical variability that exists in natural waters.

3) Development of optical detector hardware to obtain real-time pose feedback signal for the control of a UUV. A proof-of-concept hardware will demonstrate the performance of pose detection and control in laboratory settings.

In addition to the goals of this study to develop an interface and controls between two UUVs and between a UUV and a docking station, there are other applications that can benefit from this study, for example:

1) FSO communication—In this study a continuous-wave light source was used as the transmitting signal. However, the bandwidth of the photodetectors allows the transmission of pulsed signals which can provide coded control signals and also data transfer.

2) Beam diagnostics—The two array designs, i.e. planar and curved arrays, are compared based on their ability to generate a unique image footprint. This can also be used to evaluate scattering and absorption of light through the water column in addition to the geometrical and environmental factors that affect the light travel in underwater.

UUV Modeling, Control and Stability
Introduction

The control of a UUV to either navigate to a predefined point in space or to follow a path requires a fundamental understanding of the UUV model. In this chapter, UUV model is analyzed in two sections, kinematics, i.e. geometrical aspects of the motion without force analysis and UUV dynamics, i.e. analysis of the forces that contribute to the motion of the UUV. More detailed analysis of marine vehicle modeling including UUVs is provided. This chapter summarizes the main concepts demonstrated in these sources.

UUV Kinematics

The UUV are capable of motion in 6 degrees-of-freedom (DOF) in underwater. For analysis of the UUV motion, two coordinate frames are introduced: 1) The moving coordinate frame, $X_oY_oZ_o$, which is fixed to the UUV body and thus also named body-fixed reference frame. $X_o$ defines the longitudinal axis (aft to fore), $Y_o$ defines the transverse axis (port to starboard) and $Z_o$ defines the normal axis (top to bottom). 2) Earth fixed reference frame. The motion of the UUV in body fixed frame is described in the earth fixed frame which is also called inertial reference frame (FIG. 1A).

Because the rotation of the Earth does not affect the motion of the UUVs significantly (as they are considered as low-speed vehicles), it is assumed that the accelerations of a point on the Earth fixed reference frame can be neglected. Thus, position and orientation of the UUV can be expressed in Earth-fixed frame while the linear and angular velocities are expressed in the body-fixed reference frame. The variables in this manuscript are defined according to the SNAME (the Society of Naval Architects and Marine Engineers) (1950) notation as demonstrated in Table 1.1.

TABLE 1.1

SNAME notation for marine vehicles

| DOF | Motion type | Forces and Moments | Linear and angular velocities | Positions and Euler angles |
|---|---|---|---|---|
| 1 | Surge | X | u | x |
| 2 | Sway | Y | v | y |
| 3 | Heave | Z | w | z |
| 4 | Roll | K | p | φ |
| 5 | Pitch | M | q | θ |
| 6 | Yaw | N | r | ψ |

The motion of a UUV in 6-DOF can be represented in the following vectorial forms:

$$\eta=[\eta_1^T,\eta_2^T]^T \ \eta_1=[x,y,z]^T \ \eta_2=[\varphi,\theta,\psi]^T \quad (1.1)$$

$$v=[v_1^T,v_2^T]^T \ v_1=[u,v,w]^T \ v_2=[p,q,r]^T \quad (1.2)$$

$$\tau=[\tau_1^T,\rho_2^T] \ \tau_1=[X,Y,Z]^T \ \tau_2=[K,M,N]^T \quad (1.3)$$

$\eta \in \Re^{6\times1}$ denotes the position and orientation in Earth-fixed coordinate system, $\sigma \times \Re^{6\times1}$ denotes the linear and angular velocities acting on the body-fixed frame and $\tau \in \Re^{6\times1}$ represents the forces and the moments acting on the UUV on the body-fixed reference frame. In this manuscript, the orientation is described by Euler angles.

Euler Angles

The vehicle motion in body-fixed reference frame can be transformed into Earth-fixed coordinate system through a velocity transformation as in $$\dot{\eta}_1=J_1(\eta_2)v_1 \quad (1.4)$$

$J_1(\eta_2)$ is the linear velocity transformation matrix from linear body-fixed velocity vector to the velocities expressed in Earth-fixed reference frame. The transformation matrix is a function of roll ($\varphi$), pitch ($\theta$) and yaw ($\psi$) angles. $J_1(\eta_2)$ is described through a series of rotation sequences (3-2-1) as follows:

$$J_1(\eta_2)=C_{z,\psi}^T C_{y,\theta}^T C_{x,\varphi}^T \quad (1.5)$$

where the principle rotations $C_{z,\psi}^T, C_{y,\theta}^T, C_{x,\varphi}^T$ are defined as $$C_{z,\psi}^T = \begin{bmatrix} c\psi & s\psi & 0 \\ -s\psi & c\psi & 0 \\ 0 & 0 & 1 \end{bmatrix} C_{y,\theta}^T = \begin{bmatrix} c\theta & 0 & -s\theta \\ 0 & 1 & 0 \\ s\theta & 0 & c\theta \end{bmatrix} \quad (1.6)$$

$$C_{x,\phi}^T = \begin{bmatrix} 1 & 0 & 0 \\ 0 & c\phi & s\phi \\ 0 & -s\phi & c\phi \end{bmatrix}$$

Here c(•) and s(•) represent cosine and sine functions, respectively. Expanding (2.5) results in:

$$J_1(\eta_2) = \begin{bmatrix} c\psi c\theta & -s\psi c\phi + c\psi s\theta s\phi & s\psi s\phi + c\psi c\phi s\theta \\ s\psi c\theta & c\psi c\phi + s\phi s\theta s\psi & -c\psi s\phi + s\theta s\psi c\phi \\ -s\theta & c\theta s\phi & c\theta c\phi \end{bmatrix} \quad (1.7)$$

Similarly, the angular velocities acting on the body-fixed frame can be transformed into Euler rate vector $\dot{\eta}_2=[\dot{\varphi},\dot{\theta},\dot{\psi}]^T$ as in $$\dot{\eta}_2=J_2(\eta_2)v_2 \quad (1.8)$$

$J_2(\eta_2)$ is the angular velocity transformation matrix that transforms from angular body-fixed reference frame to Euler rate vector. Integration of Euler rate vector yields Euler angles. $J_2(\eta_2)$ is expressed as:

$$J_2(\eta_2) = \begin{bmatrix} 1 & s\phi t\theta & c\phi t\theta \\ 0 & c\phi & -s\phi \\ 0 & s\phi/c\theta & c\phi/c\theta \end{bmatrix} \quad (1.9)$$

where t(•) represents tangent function. It should be noticed that for a pitch angle of $\theta=+90°$, $J_2(\eta_2)$ is undefined. Because UUVs can operate close to this singularity point, this could present a problem. This could be resolved by using quaternion representation [Fossen 1] rather than Euler angles. In this manuscript, the UUVs are assumed to be mechanically designed and built stable to be within $\theta=\pm 10°$. Therefore, it is mechanically prevented to be close to the singularity point.

UUV Dynamics

6-DOF nonlinear UUV dynamic equations are expressed as $$M\dot{v}+C(v)v+D(v)v+g(\eta)=\tau \quad (1.10)$$

where $M \in \Re^{6\times6}$ is the inertial matrix including rigid body terms, $M_{RB}$, and added mass, $M_A$. $C(v) \in \Re^{6\times6}$ is the Coriolis and centripetal terms consisting of rigid body Coriolis and centripetal terms $C_{RB}$ and hydrodynamic Coriolis and centripetal terms, $C_A$. $D(v) \in \Re^{6\times6}$ is the damping force matrix, $g(\eta) \in \Re^{6\times1}$ is the gravitational forces and moments and $\tau \in \Re^{6\times1}$ is the vector of control inputs. The UUV 6-DOF dynamic equations are expressed using Newton's second law.

Newton-Euler Formulation

The foundations of Newton-Euler formulation are based on the Newton's second law relating the mass, m, acceleration, $\dot{v}_c$, and force, $f_c$, as follows $$m\dot{v}=f_c \quad (1.11)$$

subscript denotes the center of mass of the body. Euler's first axiom states that the linear momentum of a body, $p_c$ is equal to the product of the mass and the velocity of the center of mass:

$$mv_c=p_c \quad (1.12)$$

Euler's second axiom states that the rate of change of angular momentum, $h_c$, about a point fixed in Earth fixed reference frame or center of mass of the body is equal to the sum of external torques:

$$I_c\omega=h_c \quad (1.13)$$

where $I_c$ is the inertia tensor about the center of gravity. These expressions are used to derive the UUV rigid body equations of motion.

Rigid-Body Dynamics

Defining a body-fixed coordinate frame $X_oY_oZ_o$ rotating with an angular velocity vector $\omega=[\omega_1,\omega_2,\omega_3]^T$, about an Earth-fixed coordinate system XYZ, the inertia tensor of the body, $I_o$, in the body-fixed coordinate system $X_oY_oZ_o$ with an origin O is defined as $$I_o \triangleq \begin{bmatrix} I_x & -I_{xy} & -I_{xz} \\ -I_{yx} & I_y & -I_{yz} \\ -I_{zx} & -I_{zy} & I_z \end{bmatrix} \quad (1.14)$$

$I_x$, $I_y$, and $I_z$ are the moments of inertia about the $X_o$, $Y_o$ and $Z_o$ axes while the products of inertia $I_{xy}=I_{yx}$, $I_{xz}=I_{zx}$ and $I_{yz}=I_{zy}$. The elements of the inertia tensor are defined as $$I_x=\int(y^2+z^2)\rho_A dV;\ I_{xy}=\int xy\rho_A dV=I_{yx} \quad (1.15)$$

$$I_y=\int(x^2+z^2)\rho_A dV;\ I_{xz}=\int xz\rho_A dV=I_{zx} \quad (1.16)$$

$$I_z=\int(x^2+y^2)\rho_A dV;\ I_{yz}=\int yz\rho_A dV=I_{zy} \quad (1.17)$$

$\rho_A$ is the mass density of the body

The inertia tensor, $I_o$, can be represented in the vectorial form as:

$$I_o\omega=\int r\times(\omega\times r)\rho_A dV \quad (1.18)$$

The mass of the body can be defined as $$m=\int \rho_A dV \quad (1.19)$$

Figure 1B:
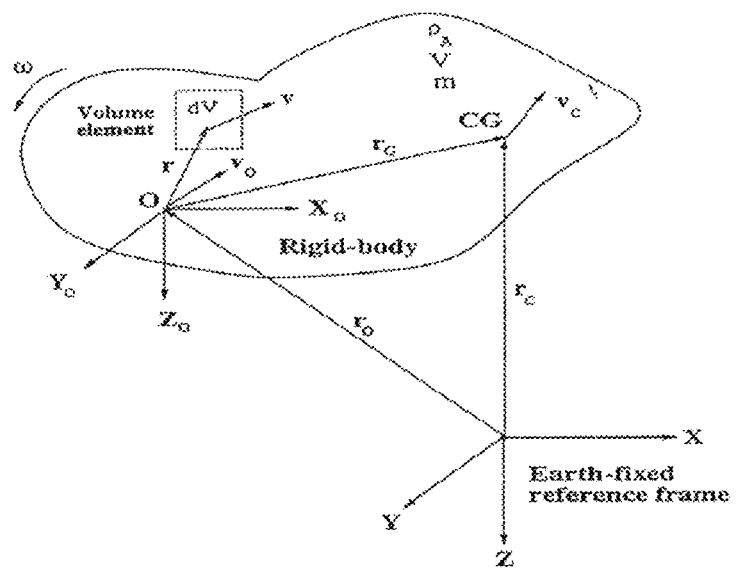
FIG. 1B shows the earth-fixed non-rotating reference frame and the body-fixed rotating reference frame $X_o Y_o Z_o$.

FIG. 1B shows the earth-fixed non-rotating reference frame XYZ and the body-fixed rotating reference frame $X_oY_oZ_o$.

The underlying assumptions in the dynamics analysis of UUV are
1) The vehicle mass is constant in time, i.e. $\dot{m}=0$.
2) The vehicle is rigid: This assumption neglects the interacting forces between the individual UUV parts.
3) The Earth-fixed reference frame is inertial: This assumption eliminates the need to include the occurring forces due to Earth's motion relative to a star-fixed reference system which is used in space applications.

By utilizing the first assumption, the distance from the origin of the body fixed reference frame, $X_oY_oZ_o$, to the vehicle's center of gravity is $$r_G = \frac{1}{m}\int r\rho_A dV \quad (1.20)$$

In order to obtain the equations of motion from a selected arbitrary origin in the body-fixed coordinate system, the following formula is used $$\dot{c}=\dot{c}_B+\omega\times c \quad (1.21)$$

This formula relates the time derivative of an arbitrary vector in the Earth-fixed frame, XYZ, i.e. $\dot{c}$ to the time derivative of an arbitrary vector in the body-fixed reference frame, $X_oY_oZ_o$, i.e. $\dot{c}_B$. This relation yields:

$$\dot{\omega}=\dot{\omega}_B+\omega\times\omega=\dot{\omega}_B \quad (1.22)$$

stating that the angular acceleration is equal in both reference frames.

Translational Motion

From FIG. 1B it is seen that the distance from the origin of the Earth-fixed reference frame to the center of gravity of the vehicle, i.e. $r_C$ can be expressed as $$r_c=r_G+r_o \quad (1.23)$$

Thus, the velocity of the center of gravity is $$v_c=\dot{r}_c=\dot{r}_o+\dot{r}_G \quad (1.24)$$

Utilizing the following relations $v_o=\dot{r}_o$ and $\dot{r}_{GB}=0$ for rigid body, $$\dot{r}_G=\dot{r}_{G_B}+\omega\times r_G=\omega\times r_G \quad (1.25)$$

$\dot{r}_{G_B}$ stands for time-derivative with respect to the body-fixed reference frame, $X_oY_oZ_o$. Therefore, $$v_C=v_o+\omega\times r_G \quad (1.26)$$

The acceleration vector is:

$$\dot{v}_C=\dot{v}_o+\dot{\omega}\times r_G+\omega\times\dot{r}_G \quad (1.27)$$

which in turn yields:

$$\dot{v}_C=\dot{v}_{o_B}+\dot{\omega}_B\times r_F+\omega\times(\omega\times r_G) \quad (1.28)$$

Substituting (2.28) into (2.11) results in $$m(\dot{v}_{o_B}+\omega\times v_o+\dot{\omega}_B\times r_G+\omega\times(\omega\times r_G))=f_o \quad (1.29)$$

If the arbitrary origin of the body-fixed coordinate system $X_oY_oZ_o$ is chosen to coincide with the center of gravity, the distance from the center of gravity to the origin, $r_G=[0,0,0]^T$ and with $f_o=f_C$ and $v_o=v_C$, (2.29) reduces to $$m(\dot{v}_{C_B}+\omega\times v_C)=f_C \quad (1.30)$$

Rotational Motion

The absolute momentum at the origin in FIG. 1B is defined as $$h_o \triangleq \int r\times v\rho_A dV \quad (1.31)$$

Taking the time derivative of (2.31) yields:

$$\dot{h}_o=\int r\times\dot{v}\rho_A dV+\int \dot{r}\times v\rho_A dV \quad (1.32)$$

Noticing that $m_o=\int r\times \dot{v}\rho_A dV$ and $v=\dot{r}_o+\dot{r}$ which implies $\dot{r}=v-v_o$. Plugging in these relations to (2.32) yields $$\dot{h}_o=m_o-v_o\times\int v\rho_A dV \quad (1.33)$$

or $$h_o=m_o-v_o\times\int(v_o+\dot{r})\rho_A dV=m_o-v_o\times\int \dot{r}\rho_A dV \quad (1.34)$$

(2.34) can be rewritten by taking the time derivative of (2.20) as:

$$m\dot{r}_G=\int \dot{r}\rho_A dV \quad (1.35)$$

Using the fact that $\dot{r}_G=\omega\times r_G$, (2.35) is rewritten as $$\int \dot{r}\rho_A dv=m(\omega\times r_G) \quad (1.36)$$

Substituting (2.36) in (2.34) results in $$\dot{h}_o=m_o-mv_o\times(\omega\times r_G) \quad (1.37)$$

Writing (2.31) as $$h_o=\int r\times v\rho_A dV=\int r\times v_o\rho_A dV+\int r\times(\omega\times r)\rho_A dV \quad (1.38)$$

$\int r\times v_o\rho_A dV$ term in (2.38) can be rewritten as $$\int r\times v_o\rho_A dV=(\int r\rho_A dV)\times v_o=mr_G\times v_o \quad (1.39)$$

(2.38) reduces to $$h_o=I_o\omega+mr_G\times v_o \quad (1.40)$$

Under the assumption that $I_o$ is constant, we take the time-derivative of (2.40):

$$\dot{h}_o = I_o\dot{\omega}_B + \omega\times(I_o\omega) + m(\omega\times r_G)\times v_o + mr_G\times(\dot{v}_{oB}+\omega\times v_o) \quad (1.41)$$

Using the relations $(\omega\times r_G)\times v_o = -v_o\times(\omega\times r_G)$ and eliminating $\dot{h}_o$ term from (2.37) and (1.41) yields $$I_o\dot{\omega}_B + \omega\times(I_o\omega) + mr_G\times(\dot{v}_{oB}+\omega\times v_o) = m_o \quad (1.42)$$

If the origin of the body-fixed coordinate system $X_oY_oZ_o$ is chosen to coincide with the center of gravity of the UUV, then (2.42) simplifies to $$I_c\dot{\omega} + \omega\times(I_c\omega) = m_C \quad (1.43)$$

DOF Rigid-Body Equations of Motion

In this section, vectorial representation of the UUV dynamics will be shown. In addition, assumptions that simplify the equations of motion will be introduced. Applying the following SNAME notation $f_o = \tau_1 = [X,Y,Z]^T$ = External Forces $m_o = \tau_2 = [K,M,N]^T$ = External Moments about origin $O$ $v_o = v_1 = [u,v,w]^T$ = Linear velocities on body-fixed coordinate frame $X_oY_oZ_o$ $\omega = v_2 = [p,q,r]^T$ = Angular velocities on body-fixed coordinate frame $X_oY_oZ_o$ $r_G = [x_G,y_G,z_G]^T$ = center of gravity Applying this notation to the translational and rotational motion equations shown in previous sub-sections yields $$m[\dot{u} - vr + wq - x_G(q^2+r^2) + y_G(pq-\dot{r}) + z_G(pr+\dot{q})] = X \quad (1.44)$$

$$m[\dot{v} - wp + ur - y_G(r^2+p^2) + z_G(qr-\dot{p}) + x_G(pq+\dot{r})] = Y$$

$$m[\dot{w} - uq + vp - z_G(p^2+q^2) + x_G(pr-\dot{q}) + y_G(qr+\dot{p})] = Z$$

$$I_x\dot{p} + (I_z - I_y)qr - (\dot{r}+pq)I_{xz} + (r^2-q^2)I_{yz} +$$
$$(pr-\dot{q})I_{xy} + m[y_G(\dot{w}-uq+vp) - z_G(\dot{v}-wp+ur)] = K$$

$$I_y\dot{q} + (I_x - I_z)pr - (p+qr)I_{xy} + (p^2-r^2)I_{zx} +$$
$$(pq-\dot{r})I_{yz} + m[z_G(\dot{u}-vr+wq) - x_G(\dot{w}-uq+vp)] = M$$

$$I_z\dot{r} + (I_y - I_x)pq - (\dot{q}+pr)I_{yz} + (q^2-p^2)I_{xy} +$$
$$(rq-\dot{p})I_{zx} + m[x_G(\dot{v}-wp+ur) - y_G(\dot{u}-vr+wq)] = N$$

These equations can be represented in a more compact, vectorial form as follows $$M_{RB}\dot{v} + C_{RB}(v)v = \tau_{RB} \quad (1.45)$$

The rigid-body equations can be simplified by choosing the origin of the body fixed-coordinate frame coinciding with the center of gravity. In this case $r_G = [0,0,0]$ and all the center of gravity related terms drop out of equation. This yields $$m(\dot{u} - vr + wq) = X \ I_{x_C}\dot{p} + (I_{z_C} - y_C)qr = K$$

$$m(\dot{v} - wp + ur) = Y \ I_{y_C}\dot{q} + (I_{x_C} - I_{z_C})pr = M$$

$$m(\dot{w} - uq + vp) = Z \ I_{z_C}\dot{r} + (I_{y_C} - I_{x_C})pq = N \quad (1.46)$$

Hydrodynamic Forces and Moments

Hydrodynamic forces acting on the rigid bod, are analyzed as radiation-induced forces, i.e. when the rigid body is forced to oscillate with the wave excitation frequency and there are no incident waves. In this case, the radiation induced forces and moments can be analyzed in 1) Added mass due to inertia of the surrounding fluid
2) Damping effects due to potential damping, skin friction, wave drift damping and vortex shedding
3) Restoring forces due to weight and buoyancy The effect of hydrodynamic forces acting on the vehicle can be shown as follows $$\tau_H = -M_A\dot{v} - C_A(v)v - D(v)v - g(\eta) \quad (1.47)$$

where $M_A$ and $C_A(v)$ are added mass and hydrodynamic Coriolis and centripetal term matrices, $D(v)$ is the hydrodynamic damping matrix including potential damping, skin friction, wave drift damping and vortex shedding, $g(\eta)$ is the restoring forces. In addition to the hydrodynamic forces exerting on the UUV during the motion, environmental forces also affect the UUV motion. The environmental forces are mainly due to ocean currents, waves and winds. Combining all of these effects, the 6-DOF dynamic equations of motion of a UUV is $$M\dot{v} + C(v)v + D(v)v + g(\eta) = \tau + \tau_H + \tau_E \quad (1.48)$$

where $\tau$ is the propulsion forces including the thruster/propellers and control surfaces/rudder forces, $\tau_E$ denotes the environmental forces.

Added Mass

Added mass is the pressure-induced forces and moments due to a forced harmonic motion of the body which are proportional to the acceleration of the body. As the UUV passes through the fluid, the fluid must move aside and close behind the vehicle, i.e. open the passage for the UUV. The fluid passage possesses the kinetic energy which would be lacked if the UUV is stationary. Fluid kinetic energy can be written as $$T_A = \tfrac{1}{2}v^T M_A v \quad (1.49)$$

$M_A \in \mathfrak{R}^{6\times 6}$ is the added inertia matrix defined as $$M_A \triangleq -\begin{bmatrix} X_{\dot{u}} & X_{\dot{v}} & X_{\dot{w}} & X_{\dot{p}} & X_{\dot{q}} & X_{\dot{r}} \\ Y_{\dot{u}} & Y_{\dot{v}} & Y_{\dot{w}} & Y_{\dot{p}} & Y_{\dot{q}} & Y_{\dot{r}} \\ Z_{\dot{u}} & Z_{\dot{v}} & Z_{\dot{w}} & Z_{\dot{p}} & Z_{\dot{q}} & Z_{\dot{r}} \\ K_{\dot{u}} & K_{\dot{v}} & K_{\dot{w}} & K_{\dot{p}} & K_{\dot{q}} & K_{\dot{r}} \\ M_{\dot{u}} & M_{\dot{v}} & M_{\dot{w}} & M_{\dot{p}} & M_{\dot{q}} & M_{\dot{r}} \\ N_{\dot{u}} & N_{\dot{v}} & N_{\dot{w}} & N_{\dot{p}} & N_{\dot{q}} & N_{\dot{r}} \end{bmatrix} \quad (1.50)$$

For many UUV applications, the vehicle will be allowed to move at low speeds. If the vehicle is assumed to have three planes of symmetry, then $M_A$ and $C_A(v)$ simplifies to $$M_A = -\text{diag}\{X_{\dot{u}}, Y_{\dot{v}}, Z_{\dot{w}}, K_{\dot{p}}, M_{\dot{q}}, N_{\dot{r}}\} \quad (1.51)$$

$$C_A(v) = -\begin{bmatrix} 0 & 0 & 0 & 0 & -Z_{\dot{w}}w & Y_{\dot{v}}v \\ 0 & 0 & 0 & Z_{\dot{w}}w & 0 & -X_{\dot{u}}u \\ 0 & 0 & 0 & -Y_{\dot{v}}v & X_{\dot{u}}u & 0 \\ 0 & -Z_{\dot{w}}w & Y_{\dot{v}}v & 0 & -N_{\dot{r}}r & M_{\dot{q}}q \\ Z_{\dot{w}}w & 0 & -X_{\dot{u}}u & N_{\dot{r}}r & 0 & -K_{\dot{p}}p \\ Y_{\dot{v}}v & X_{\dot{u}}u & 0 & -M_{\dot{q}}q & K_{\dot{p}}p & 0 \end{bmatrix} \quad (1.52)$$

Strip Theory

In order to estimate the hydrodynamic derivatives, i.e. added inertia matrix terms, strip theory is used. By dividing the submerged part of the vehicle into strips, the hydrodynamic coefficients can be computed for each strip and estimated over the length of the UUV to obtain three-dimensional results. For submerged slender vehicles the following formulas can be used to obtain the hydrodynamic coefficients $$-X_u = \int_{-L/2}^{L/2} A_{11}^{(2D)}(y,z)dx \approx 0.10 \text{ m} \quad (1.53)$$

$$-Y_v = \int_{-L/2}^{L/2} A_{22}^{(2D)}(y,z)dx \quad (1.54)$$

$$-Z_w = \int_{-L/2}^{L/2} A_{33}^{(2D)}(y,z)dx \quad (1.55)$$

$$-K_p = \int_{-L/2}^{L/2} A_{44}^{(2D)}(y,z)dx \quad (1.56)$$

$$-M_q = \int_{-L/2}^{L/2} A_{55}^{(2D)}(y,z)dx \quad (1.57)$$

$$-N_r = \int_{-L/2}^{L/2} A_{66}^{(2D)}(y,z)dx \quad (1.58)$$

where L is the length of the vehicle. $A_{22}^{(2D)}$, $A_{33}^{(2D)}$ and $A_{44}^{(2D)}$ values are approximated using the values in FIG. 1C depending on the UUV body type.

Figure 1C:
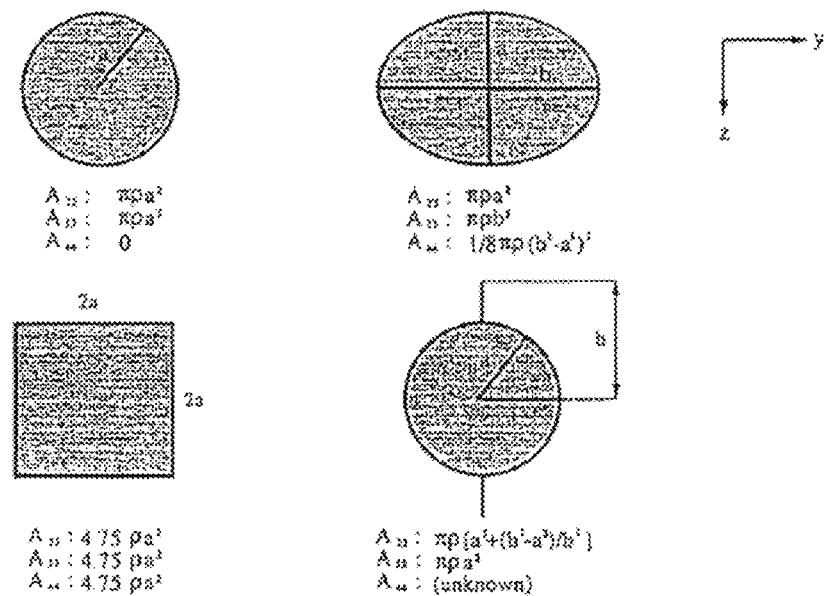
FIG. 1C shows two dimensional added mass coefficients used in strip theory.

FIG. 1C shows two dimensional added mass coefficients used in strip theory. Two-dimensional hydrodynamic coefficients for roll, pitch and yaw angles can be found by $$\int_{-L/2}^{L/2} A_{44}^{(2D)}(y,z)dx \triangleq \int_{-B/2}^{B/2} y^2 A_{33}^{(2D)}(x,z)dy + \int_{-H/2}^{H/2} z^2 A_{22}^{(2D)}(x,y)dz \quad (1.59)$$

$$\int_{-L/2}^{L/2} A_{55}^{(2D)}(y,z)dx \triangleq \int_{-L/2}^{L/2} x^2 A_{33}^{(2D)}(x,z)dx + \int_{-H/2}^{H/2} z^2 A_{11}^{(2D)}(x,y)dz \quad (1.60)$$

$$\int_{-L/2}^{L/2} A_{66}^{(2D)}(y,z)dx \triangleq \int_{-B/2}^{B/2} y^2 A_{11}^{(2D)}(x,z)dy + \int_{-H/2}^{H/2} z^2 A_{11}^{(2D)}(x,y)dx \quad (1.61)$$

B and H are the width and height of the vehicle. For other geometrical types of vehicles, more detailed analysis can be found. Another approach to estimate the hydrodynamic coefficients is to use hydrodynamic computation software such as, WAMIT, RESPONSE, SIMAN, MIMOSA, SIMO and WAVERES, etc.

Hydrodynamic Damping

Hydrodynamic damping for marine vehicles is sometimes mainly caused by potential damping, skin friction, wave drift damping and vortex shedding.

Potential damping is the radiation induced damping term encountered when the UUV body is forced to oscillate with the wave excitation frequency in the absence of incident waves. The contribution from potential damping is negligible in comparison to the dissipative terms like viscous damping.

Skin friction is due to laminar boundary layer when the vehicle undergoes low-frequency motion. In addition to the linear skin friction, there is also quadratic skin friction effects that should be taken into account during the design of the control system.

Wave-drift damping is the added resistance for surface vessels. Thus, it is not a dominant affect for UUVs.

Vortex Shedding is caused by frictional forces in a viscous fluid. The viscous damping force due to vortex shedding can be formulated as:

$$f(U) = -\tfrac{1}{2}\rho C_D(R_n)A|U|U \quad (1.62)$$

where U is the vehicle speed, $\rho$ is the surrounding water density, A is the projected cross-sectional area in water, $C_D(R_n)$ is the drag coefficient as a function of Reynolds number as $$R_n = \frac{UD}{v} \quad (1.63)$$

where D is the characteristic length of the vehicle and $v$ is the kinematic viscosity coefficient (for salt water at 5° C. with salinity 3.5%, $v=1.56\cdot10^{-6}$). Quadratic drag in 6-DOF is expressed as:

$$D_M(v)v = \begin{bmatrix} |v|^T D_1 v \\ |v|^T D_2 v \\ |v|^T D_3 v \\ |v|^T D_4 v \\ |v|^T D_5 v \\ |v|^T D_6 v \end{bmatrix} \quad (1.64)$$

$D_i$ (i=1 ... 6)$\in \Re^{6\times 6}$ depend on $\rho$, $C_D$ and A. Thus each term in (2.64) is different. Subscript M in $D_M$ stands for Morison's equation.

Restoring Forces and Moments

The gravitational and buoyancy forces actin on the marine vehicle are named restoring forces in the hydrodynamic terminology. $f_G$, the gravitational force, acts on the center of gravity $r_G = [x_G, y_G, z_G]^T$ while $f_B$, the buoyancy force, acts on the center of buoyancy $r_B = [x_B, y_B, z_B]^T$. For underwater vehicles, defining m as the mass of the vehicle and $\nabla$ as the volume of fluid displaced by the vehicle, g the gravitational acceleration and $\rho$ as the fluid density, the submerged weight of the body is W=mg, and the buoyancy force is $B=\rho g\nabla$. The weight and the buoyancy force can be transformed in the body-fixed coordinate frame as $$f_G(\eta_2) = J_1^{-1}(\eta_2)\begin{bmatrix} 0 \\ 0 \\ W \end{bmatrix} \quad (1.65)$$

$$f_B(\eta_2) = -J_1^{-1}(\eta_2)\begin{bmatrix} 0 \\ 0 \\ B \end{bmatrix}$$

The restoring force and moment vector can be expressed as:

$$g(\eta) = -\begin{bmatrix} f_G(\eta) + f_B(\eta) \\ r_G \times f_G(\eta) + r_B \times f_B(\eta) \end{bmatrix} \quad (1.66)$$

Expanding this expression results in $$g(\eta) = \begin{bmatrix} (W-B)s\theta \\ -(W-B)c\theta s\phi \\ -(W-B)c\theta c\phi \\ -(y_G W - y_B B)c\theta c\phi + (z_G W - z_B B)c\theta s\phi \\ (z_G W - z_B B)s\theta + (x_G W - x_B B)c\theta c\phi \\ -(x_G W - x_B B)c\theta s\phi + (y_G W - y_B B)s\theta \end{bmatrix} \quad (1.67)$$

which is the Euler angle representation of the hydrostatic forces and moments. If the UUV is neutrally buoyant, then W=B. Defining the distance between the center of gravity $r_G$ and the center of buoyancy $r_B$ as:

$$\overline{BG} = [\overline{BG}_x, \overline{BG}_y, \overline{BG}_z]^T = [x_G - x_B, y_G - y_B, z_G - z_B]^T \quad (1.68)$$

Therefore, (2.67) simplifies to $$g(\eta) = \begin{bmatrix} 0 \\ 0 \\ 0 \\ -\overline{BG}_y Wc\theta c\phi + \overline{BG}_z Wc\theta s\phi \\ \overline{BG}_z Ws\theta + \overline{BG}_x Wc\theta c\phi \\ -\overline{BG}_x Wc\theta s\phi - \overline{BG}_y Ws\theta \end{bmatrix} \quad (1.69)$$

UUV Controllers and Stability

Proportional-Integral-Derivative (PID) Control

Most UUV systems, specifically Remotely Operated Vehicles (ROVs) utilize a series of single-input-single-output (SISO) PID controllers to control each DOF. This suggests the use of the control gain matrices $K_p$, $K_i$ and $K_d$ in the PID control law as follows:

$$\tau_{PID} = K_p e(t) + K_d \dot{e}(t) + K_i \int e(\tau) d\tau \quad (1.70)$$

Figure 1D:
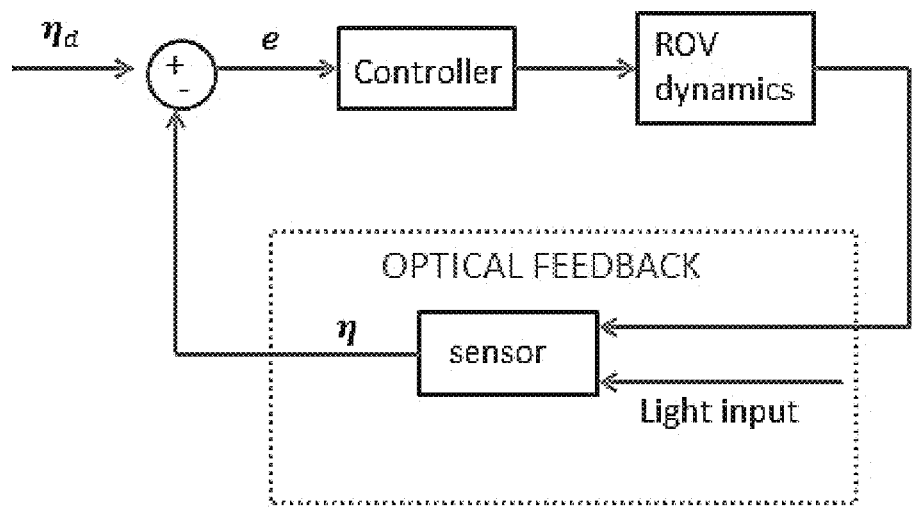
FIG. 1D shows a UUV Control Block diagram with the output obtained from optical feedback array. Controller regulates the UUV motion based on the feedback obtained from the optical detector array and changes the course of the UUV by sending commands to the thrusters.

$e = \eta_d - \eta$ is the tracking error, $\eta_d$ denotes the vector of desired states and $\eta$ denote the vector of measured states from the sensors. Throughout this manuscript, $\eta$ is the pose output obtained from the optical detector array (FIG. 1D). FIG. 1D shows a UUV Control Block diagram with the output obtained from optical feedback array. Controller regulates the UUV motion based on the feedback obtained from the optical detector array and changes the course of the UUV by sending commands to the thrusters.

The control problems for the static-dynamic and dynamic-dynamic cases demonstrated in this manuscript can be evaluated as a set-point regulation problem in which the desired state vector $\eta_d$ is constant. In the static-dynamic case, the UUV navigates to a position based on the guidance obtained from the static light source. In the dynamic-dynamic case the follower UUV follows the changing path of the leader UUV with the desired state vector staying constant.

PID Stability for UUVs

In the set point regulation problem, PID controller of a nonlinear square system is shown to guarantee local stability as follows: The generalized momentum, p, of the UUV is $$p = M_\eta \dot{\eta} \quad (1.71)$$

where $M_\eta$ is the mass represented in the Earth-fixed coordinate system. The inertia matrix M represents the mass with respect to the body-fixed coordinate system such that $$M_\eta = J^{-T}(\eta) M J^{-1}(\eta) \quad (1.72)$$

where J is the transformation matrix relating the body and Earth-fixed coordinate systems (as discussed previously). A PID control law is taken to be of the following form:

$$u = B^{-1}[J^T(\eta)(K_p e + K_i \int_0^t e(\tau) d\tau - K_d \dot{\eta}) + g(\eta)] \quad (1.73)$$

In addition, a Lyapunov function candidate is given as $$V(x) = \frac{1}{2} x^T \begin{bmatrix} M_\eta^{-1} & \alpha I & 0 \\ \alpha I & K_p & K_i \\ 0 & K_i & \alpha K_i \end{bmatrix} \quad (1.74)$$

$\alpha$ is a small positive constant and x is given as:

$$x = [p \; \eta \int_0^t e(\tau) d\tau]^T \quad (1.75)$$

Then, it has been shown that $\dot{V} \leq 0$ and $\eta$ converges to a constant $\eta_d$. The PID controller parameters $K_p$, $K_i$ and $K_d$ are matrices that satisfy:

$$K_d > M_\eta \quad (1.76)$$

$$K_i > 0 \quad (1.77)$$

$$K_p > K_d + \frac{2}{\alpha} K_i \quad (1.78)$$

Positive constant $\alpha$ is chosen such that it satisfies the following condition:

$$\frac{1}{2}(1-\alpha)K_d - \alpha M_\eta + \frac{\alpha}{2} \sum_{i=1}^{6} (\eta_i - \eta_{id}) \frac{\partial m_\eta}{\partial \eta_i} > 0 \quad (1.79)$$

More details of the proof were given.

Sliding Mode Controller (SMC)

The dynamics of a UUV system can easily change when, for example, new sensor packages and tools are mounted on a UUV. The Sliding Mode Control (SMC) is a robust nonlinear control technique that is designed to address modeling uncertainties and has been employed in dynamic positioning of remotely operated vehicles. The SMC, however, requires a priori knowledge of uncertainty bounds and assumes full-state feedback. In this study, SMC uses pose detection via image moment invariants algorithm for full state sensor feedback described in Chapter 4.

The SMC needs both position and velocity signals as inputs. In the developed system, the detector array can provide position/orientation inputs directly to the controllers. However, for the velocity signals, the first derivatives of the pose signals are taken.

Because UUV motion in this study is restricted to be decoupled, SISO system approach is taken for UUV SMC system design. Therefore, five second-order controllers are designed rather than a single fifth-order controller:

$$x^n = b(X;t)[f(X;t) + U + d(t)] \quad (1.80)$$

where, $x^n$ is the $n^{th}$ derivative of state x, U is the control input generated by the UUV propellers, d(t) is the potential disturbances such as wave and currents, $X = [x, \dot{x}, \ldots, x^{n-1}]^T$ is the state vector of the system (i.e., position, velocity and acceleration of the vehicle in a specific axis). $f(X; t)$ represents all lumped nonlinear functions in the system dynamics. For the follower UUV model used in this research, $f(X; t)$ includes the velocity-dependent effects including drag forces and inertia. For a second order system, $b(X; t)$ is the inverse of the inertia.

The following simplified UUV model is used for pose detection for each 5-DOF of under interest for this study:

$$m\ddot{x} + c\dot{x}|\dot{x}| = u \quad (1.81)$$

where x is the state variable, m is the mass/inertia term (which also includes added mass/inertia), c is the drag coefficient and u is the control input.

A time-varying surface S(t) in the state space $R^n$ is defined by the scalar equation s(X; t)=0 as in $$s(X;t) = \left(\frac{d}{dt} + \lambda\right)^{n-1} \tilde{x} \quad (1.82)$$

λ is a positive constant and tracking error $\tilde{x}$ is defined such that $\tilde{x}=x-x_d$, where $x_d$ denotes the desired state value. For a second order system (i.e., n=2), the sliding surface becomes $$s(X;t)=\dot{\tilde{x}}+\lambda\tilde{x} \tag{1.83}$$

where s is a weighted sum of position and velocity errors. s(X; t) corresponds to a line that moves with the point $(x_d, \dot{x}_d)$ having a slope λ.

The sliding condition is achieved when $\dot{s}=0$, where the error trajectory $\tilde{x}$ converges to the origin. For this, the derivative of the sliding surface is analyzed:

$$\dot{s}=\ddot{x}-\ddot{x}_d+\lambda\dot{\tilde{x}} \tag{1.84}$$

The follower UUV model is represented in (28)

$$\dot{s}=-\frac{c}{m}\dot{x}|\dot{x}|+\frac{1}{m}u-\ddot{x}_d+\lambda\dot{\tilde{x}} \tag{1.85}$$

Setting $\dot{s}=0$ and combining (28) and (24), an equivalent control law $\hat{u}$ may be obtained to help achieve the sliding condition $\dot{s}=0$ such that $$\hat{u}=\hat{m}(\ddot{x}_d-\lambda\dot{\tilde{x}})+c\dot{x}|\dot{x}| \tag{1.86}$$

In order to satisfy the sliding condition, a discontinuous term across the surface s=0 is added to the $\hat{u}$ term such that $$u=\hat{u}-k1(s) \tag{1.87}$$

where 1(s) is a switching function and can be any odd function. Typically the signum function is used, but for this research, 1(s) is chosen to be the saturation function, sat(s/Φ), to eliminate the high frequency chattering that is inherent in the signum function and undesirable for UUV thruster actuation. (Here, Φ represents the boundary layer thickness of the switching function within which the switching function is smooth and linear.) The discontinuous switching gain, k, is chosen to be larger than the maximum bounded uncertainty such that $$k(x)=(F+\beta\eta)+\hat{m}(\beta-1)|\ddot{x}_d-\lambda\dot{\tilde{x}}| \tag{1.88}$$

where F is the estimation error bound on the nonlinear dynamics f, i.e. $|\hat{f}-f|\leq F$. β is the gain margin of the system, defined as $$\beta=\sqrt{\frac{b_{max}}{b_{min}}} \tag{1.89}$$

where $b_{min}$ and $b_{max}$ are the minimum and maximum bounds on the control gain b in the system, i.e. $\ddot{x}=f+bu$. η is a strictly positive constant. In order to fully utilize the available control bandwidth, the control law is smoothed out in a time-varying thin boundary layer $$\bar{k}(x)=k(x)-\dot{\Phi} \tag{1.90}$$

where Φ is the boundary layer thickness. Tuning Φ to represent a first-order filter of bandwidth, λ

$$k(x_d)=\dot{\Phi}+\lambda\Phi \tag{1.91}$$

Setting the gain margin, $\beta_d=\beta$, the switching term with time-varying thin boundary layer, $\bar{k}(x)$ is expressed as $$\bar{k}(x)=k(x)-k(x_d)+\frac{\lambda\Phi}{\beta_d} \tag{1.92}$$

Finally, the resulting control input u is $$u=\hat{u}-\bar{k}(x)\text{sat}(s/\Phi) \tag{1.93 SMC Stability for UUVs}$$

A SMC for a Multiple Input Multiple Output (MIMO) UUV 6-DOF system is shown to be stable in the sense of Lyapunov as follows: Defining a Lyapunov-like function candidate $$V(S,t)=\tfrac{1}{2}s^TM^*s \tag{1.93}$$

where $M^*=J^{-T}MJ^{-1}$. The time derivative of the Lyapunov function is $$\dot{V}=s^TM^*\dot{s}+\tfrac{1}{2}s^T\dot{M}^*s-s^TC^*s+s^TC^*s \tag{1.94}$$

Incorporating the 6-DOF nonlinear UUV equations of motion as in (1.81) and assuming that the number of control inputs is equal to or more than number of controllable DOF:

$$\dot{V}=-s^T(D^*+K_D)s+(J^{-1}s)^T(\tilde{M}\ddot{q}_r+\tilde{C}\dot{q}_r+\tilde{D}\dot{q}_r+\tilde{g})-k^T|J^{-1}s| \tag{1.95}$$

where $\tilde{M}=\hat{M}-M$, $\tilde{C}=\hat{C}-C$, $\tilde{D}=\hat{D}-D$, $\tilde{g}=\hat{g}-g$ and $q_r$ denotes a virtual reference vector. Defining the switching term $k_i$ as $$k_i\geq|\tilde{M}\ddot{q}_r+\tilde{C}(\dot{q})\dot{q}_r+\tilde{D}(\dot{q})\dot{q}_r+\tilde{g}(x)|_i+\eta_i, \tag{1.96}$$

where $\eta_i>0$ as defined previously. This yields:

$$\dot{V}\leq-s^T(D^*+K_D)s-\eta^T(J^{-1}s)\leq 0 \tag{1.97}$$

The dissipative matrix D>0 and the gain matrix $K_D\geq 0$, resulting in $(J^{-T}DJ^{-1}+K_D)>0$.

Characterization of Optical Communication in a Leader-Follower UUV Formation

As part of the research to development an optical communication design of a leader-follower formation between unmanned underwater vehicles (UUVs), this chapter presents light field characterization and design configuration of the hardware required to allow the use of distance detection between UUVs. The study specifically is targeting communication between remotely operated vehicles (ROVs). As an initial step in this study, the light field produced from a light source mounted on the leader UUV was empirically characterized and modeled. Based on the light field measurements, a photo-detector array for the follower UUV was designed. Evaluation of the communication algorithms to monitor the UUV's motion was conducted through underwater experiments in the Jere E. Chase Ocean Engineering Laboratory at the University of New Hampshire. The optimal spectral range was determined based on the calculation of the diffuse attenuation coefficients by using two different light sources and a spectrometer. The range between the leader and the follower vehicles for a specific water type was determined. In addition, the array design and the communication algorithms were modified according to the results from the light field.

Preliminary work for this study included the development of a control design for distance detection of UUV using optical sensor feedback in a Leader-Follower formation. The distance detection algorithms were designed to detect translational motion above water utilizing a beam of light for guidance. The light field of the beam was modeled using a Gaussian function as a first-order approximation. This light field model was integrated into non-linear UUV equations of motion for simulation to regulate the distance between the leader and the follower vehicles to a specified reference value. A prototype design of a photo-detector array consisting of photodiodes was constructed and tested above water. However, before an array can be mounted on the bow of the follower UUV, a better understanding of the underwater light is needed. The proposed system is based on detecting the relative light intensity changes on the photodiodes in the array. The size of the array strictly depends on the size of the ROV. This chapter provides an overview on the experiments and simulations conducted to adjust the algorithms based on underwater conditions. Underwater light is attenuated due to the optical characteristics of the water, which are constantly changing and are not uniformly distributed. As a result, applying distance detection algorithms underwater adds complexity and reduces operational ranges. Accordingly, the operation distance between the UUVs was limited to a range between 4.5 to 8.5 m for best performance. Experimental work in this study was performed in the wave and tow tank at the Jere E. Chase Ocean Engineering facilities.

Theoretical Background

The basic concept for optical communication in this chapter is based on the relative intensity measured between the detectors within the photo-detector array mounted on the follower ROV. In addition to the beam pattern produced by the light source, the intensity of light underwater follows two basic concepts in ocean optics: The inverse square law and Beer-Lambert law.

Beam Pattern

The light field emitted from a light source can be modeled with different mathematical functions. In addition, there are a variety of light sources that can be used underwater that differ in their spectral irradiance (e.g., halogen, tungsten, and metal-halide). The spectral characteristics of the light source are an important issue that affects the illumination range, detector type and the detection algorithms. As in the case of the light sources, the photo-detectors also have a spectral width in which their sensitivity is at a maximum value. By determining the spectral characteristics of the light source, it is possible to select the detector and filters for the photodetector array. We assume that the beam pattern can be modeled using a Gaussian function. This representation is valid for a single point light source. The Gaussian model used in this study can be represented as follows:

$$I(\theta) = A * \exp(-B * \theta_i^2) \quad (2.1)$$

In (2.1), I is the intensity at a polar angle, $\theta_i$, where the origin of the coordinate system is centered around the beam direction of the light source. A and B are constants that describe the Gaussian amplitude and width respectively.

Inverse Square Law

According to the inverse square law, the intensity of the light is inversely proportional to the inverse square of the distance:

$$I = \frac{S}{4\pi r^2} \quad (2.2)$$

where I is the intensity at r distance away from the source and S is the light field intensity at the surface of the sphere. Thus, the ratio of the light intensities at two different locations at the same axis can be expressed as:

$$\frac{I_1}{I_2} = \frac{\frac{S}{4\pi r_1^2}}{\frac{S}{4\pi r_2^2}} = \left(\frac{r_2}{r_1}\right)^2 \quad (2.3)$$

The light field S generated by a light source is assumed to show uniform illumination characteristics in all directions. In addition, the light intensity is such that the light source is assumed to be a point source and that its intensity is not absorbed by the medium. It should also be noted that although the inverse square law is the dominant concept in the development of control algorithms, for this research this is not the only dominant optical mechanism that affects the light passing in water. As the light travels through water, its rays also get absorbed by the medium according to Beer-Lambert law.

Beer-Lambert Law

Beer-Lambert law states that radiance at an optical path length l in a medium decreases exponentially depending on the optical length, l, the angle of incidence, $\theta_i$, and the attenuation coefficient, K: Beer-Lambert law describes the light absorption in a medium under the assumption that an absorbing, source free medium is homogeneous and scattering is not significant. When the light travels through a medium, its energy is absorbed exponentially as in $$L(\zeta, \hat{\xi}) = L(0, \hat{\xi}) \exp\left(-\frac{\zeta}{\mu}\right) \quad (2.4)$$

where L denotes the radiance, $\zeta$ the optical depth, $\hat{\xi}$ the direction vector, and $\mu$ denotes the light distribution as a function of angle $\theta$ such that:

$$\mu = \cos \theta_i \quad (2.5)$$

Defining a quantity l, (i.e. the optical path length in direction $\mu$), $$dl \equiv \frac{d\zeta}{\mu} = \frac{K(z)dz}{\mu} \quad (2.6)$$

where K(z) is the total beam attenuation coefficient and dz is the geometric depth.

In this chapter, the experimental setup is built such that the incidence angle $\theta_i$ is zero. As a result, combination of (2.4) and (2.6) results in:

$$L(\zeta, \hat{\xi}) = L(0, \hat{\xi}) \exp(-K(z)dz) \quad (2.7)$$

Experimental Setup

Figure 2A:
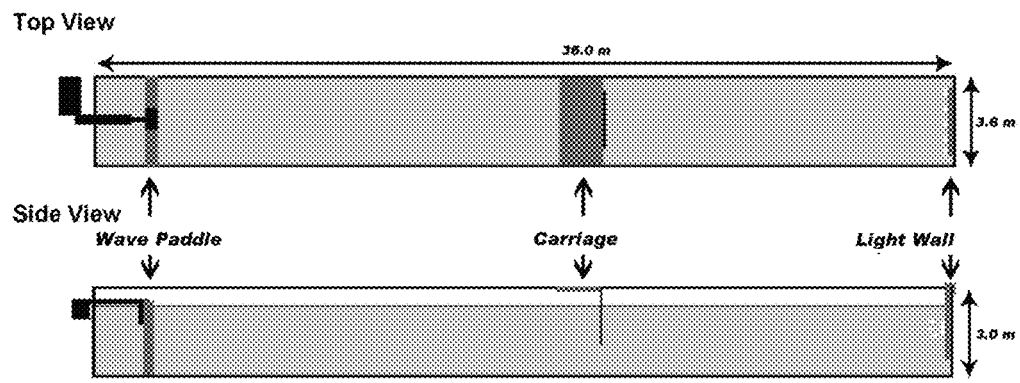
FIG. 2A shows an experimental schematic of the UNH tow tank.

Experimental work in this study was performed in order to evaluate a proposed hardware design which was based on ocean optics and the hardware restrictions for a given ROV system. The experiments included beam diagnostics, spectral analysis and intensity measurements from several light sources. These experiments were conducted in the Tow and Wave Tank at the Ocean Engineering facilities. The wave and tow tank has a tow carriage that moves on rails. A light source was mounted on a rigid frame to the wall in the tow tank and a light detector was placed underwater connected to a tow carriage (FIG. 2A). This experimental setup is based on the design. To characterize the interaction between the light source and the light array a 50 Watt halogen lamp powered by 12 V power source is used. For the detector unit, a spectrometer (Ocean Optics Jaz) was used to characterize the underwater light field. These empirical measurements were used to adjust the detection algorithms and will be also used in the design of the photo-detector array. The light source in the tank simulates a light source that is mounted on the crest of the leader ROV. The design of the photo-detector array simulates the array that will be mounted on the bow of the follower ROV. The photo-detector array design depends on the size of the ROV and the light field produced by the light source mounted on the leader ROV. In this case, the size for an optical detector module was kept at 0.4 m, which is the width dimension of the UNH ROV as a test platform, a small observation class ROV.

FIG. 2A shows an experimental schematic of UNH tow tank [73]. Translational experiments in 1-D and 3-D (i.e., motion along and perpendicular to the center beam of the light source) were conducted in air and in water. The goals for the 1-D experiments were to characterize the spectral properties of the water and to determine the best spectral ranges for optical communication between the ROVs. In the underwater experiment, a submerged fiber optic cable with a collimator was connected to the spectrometer and was vertically aligned based on the peak value of radiance emitted from the light source. This alignment is considered the illumination axis (x-axis). The radiance emitted from the light source through the water column was empirically measured by the spectrometer at distances ranging from 4.5 to 8.5 m at 1 m increments. The spectrometer was configured to average 40 samples with an integration time of 15 milliseconds. A 2° collimator was used to restrict the field of view collected by the spectrometer and to avoid the collection of stray light rays reflecting off the tank walls or from the water surface.

The experimental setup in air was very similar, where the spectrometer was mounted on a tripod and aligned to the peak value of radiance, the illumination axis (z-axis). Because such light sources produce heat at high temperatures (up to 700° C.) that can damage the waterproof fixing, the experimental setup in air required that the light source be submerged in an aquarium during operation. Similar to the underwater experiments, the same distances between the light source and the spectrometer, including the offsets, were maintained.

Figure 2B:
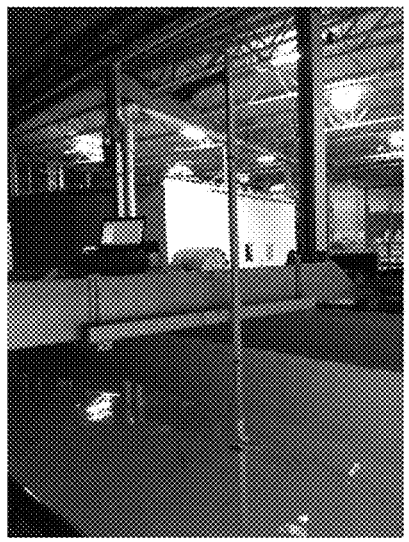
FIG. 2B shows an experimental Setup for translational 3-D underwater experiments. (Left image) detector unit that includes a submerged fiber optic cable with a collimator that was connected to the spectrometer. (Right image) transmitting unit mounted to the wall of the tank.
Figure 2B:
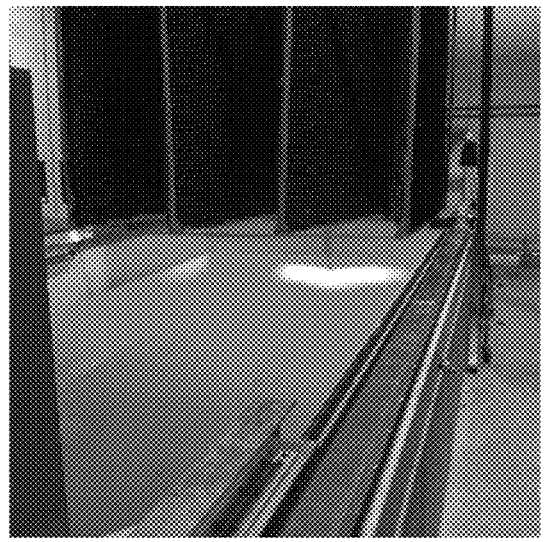

The 3-D translational underwater experiments utilized the same setup as that of the underwater 1-D experiments where additional radiance measurements were conducted along a normal axis (z-axis) that is located on a plane normal to the illumination axis (x-axis). The 3-D translational experiment maintained the same distances along the illumination axis between the light source and the spectrometer (i.e., 4.5 to 8.5 m), where additional measurements were conducted along the normal axis at 0.1 m increments ranging from 0 m to 1 m. As mentioned previously, it is assumed that the light source is producing a beam pattern that can be modeled using a Gaussian function. Accordingly, we assume that the radiance measurements along the normal axis are symmetric in all directions. The experimental setups for 3-D underwater experiments can be seen in FIG. 2B. FIG. 2B shows an experimental setup for translational 3-D underwater experiments. In particular, the left image shows a detector unit that includes a submerged fiber optic cable with a collimator that was connected to the spectrometer and the right image shows a transmitting unit mounted to the wall of the tank.

Results

Figure 2C:
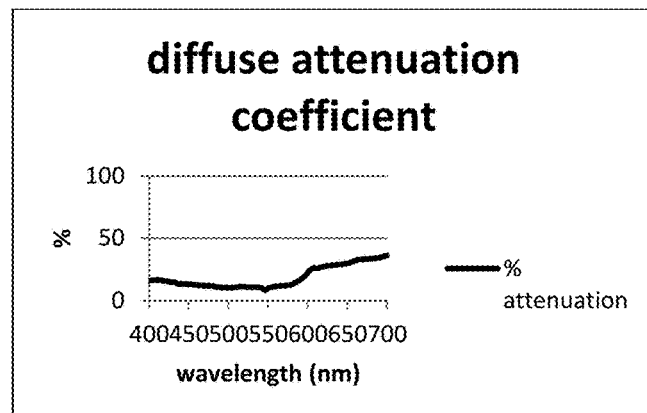
FIG. 2C is a percent attenuation graph. This graph shows the light percent attenuation per meter. It is seen that the spectral range between 500-550 nm undergoes the least attenuation at any given distance.

Light attenuation underwater causes a significant loss of radiant energy over increasing distances. The diffuse attenuation coefficient, K, is used as a parameter to calculate the decreased amount of energy from the light source to the target. In this study, the diffuse attenuation coefficient is used to determine the spectral range of the light source and determine the photo-detector types that can be utilized in the array. For successful optical communication up to ranges of 9 m, the ideal spectral ranges should be maintained such that the diffuse attenuation coefficient values are smaller than 0.1 $m^{-1}$. At this distance, the signal loses about half its energy. As a first-order approximation, the diffuse attenuation coefficient values are assumed constant throughout the water column. This assumption reduces the number of parameters used in the distance detection algorithms and the processing time used in future controls applications. In the study, the diffuse attenuation coefficient values are calculated for a 50 W light source. In FIG. 2C, the percentage loss curve for various distances is shown.

Diffuse attenuation was calculated based on (2.7). Measurements taken at a specific distance in water and in air are compared in order to account for the inverse square law. The light that travels in air also undergoes diffuse attenuation but it is ignored in this case. These values suggest that the UNH wave tank, where the experiments were conducted, contains algae and dissolved matter. The study results suggest that 500-550 nm band-pass filters in the range should be used in the detector unit to provide better performance of the distance detection algorithms.

FIG. 2C shows a percent attenuation graph. This graph shows the light percent attenuation per meter. It is seen that the spectral range between 500-550 nm undergoes the least attenuation at any given distance.

Based on the light attenuation results, the distance between the leader and the follower vehicles was calculated. The experimental results (FIG. 2.4) show that the performance of the algorithms in the UNH water tank is expected to decrease after 8.5 m. Beyond this range, the light intensity falls into the background noise level (i.e., <20%).

Figure 2D:
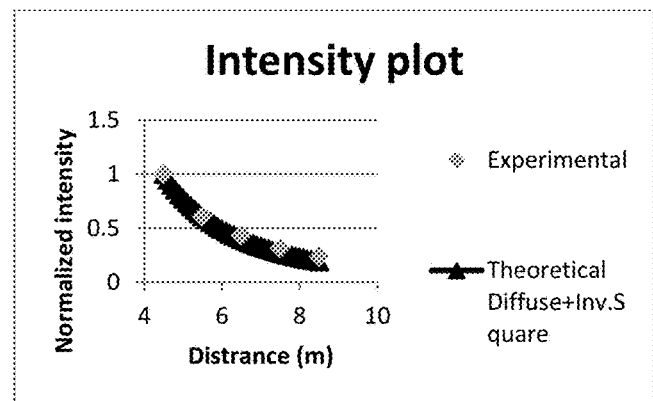
FIG. 2D shows an intensity vs. distance plot. The intensity readings are collected between 500-550 nm and averaged. In this plot, the experimental values are compared with the theoretical. Blue diamonds represent the experimental data and the green triangles represent the theoretical calculations from taking the inverse square and Beer-Lambert laws. The readings are normalized. The measurement at 4.5 m was used as the reference measurement to normalize the intensity.

FIG. 2D is an intensity vs. distance plot. The intensity readings are collected between 500-550 nm and averaged. In this plot, the experimental values are compared with the theoretical. Blue diamonds represent the experimental data and the green triangles represent the theoretical calculations from taking the inverse square and Beer-Lambert laws. The readings are normalized. The measurement at 4.5 m was used as the reference measurement to normalize the intensity.

Figure 2E:
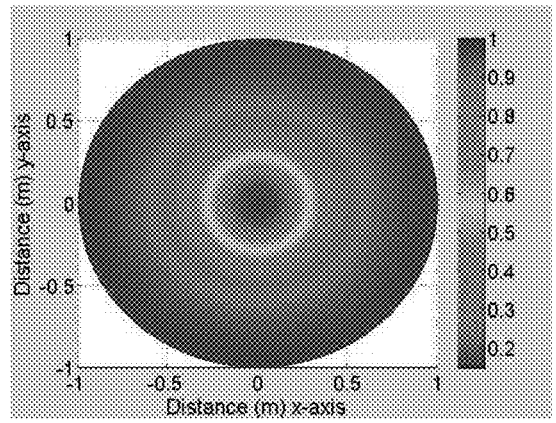
FIG. 2E is a plot of the cross-sectional beam pattern. The measurements were collected from 0 to 1.0 m at x-axis and at 4.5 m at the illumination axis for 50 W light source. The measurements between 500-550 nm are average.

The light profile calculated from the 3-D experiments agrees with the assumption that the pattern of the light beam can be described using a 2-D Gaussian fit (FIG. 2E). Using a 50% intensity decrease as a threshold, the effective beam radius from the center (i.e., the illumination axis) is 0.3 m. Another key finding obtained from the 3-D experiments, is the dimensions of the light detector array. It can be seen that if the length of the array is kept at 0.6 m, then different light detector elements can detect the light intensity change, which is useful information for control algorithms. It should be stated that the physical characteristics of the photo-detector array such as dimensions and the spacing between the array elements strictly depend on beam divergence.

FIG. 2E is a plot of the cross-sectional beam pattern. The measurements were collected from 0 to 1.0 m at x-axis and at 4.5 m at the illumination axis for 50 W light source. The measurements between 500-550 nm are averaged.

Discussion

The study results provide valuable environmental information for modifying a photo-detector array design according to light field. According to the diffuse attenuation, a 500-550 nm band-pass filter will allow the observation at the light field from a single source as a 2-D Gaussian beam pattern. At this spectral range is around 0.1 $m^{-1}$ the peak power of the beam (along the z-axis) will change from 100% to 23% as the array moves away from light from 4.5 m to a distance of 8.5 m. The size of the beam pattern is a function of the divergence angle of the beam. In the current configuration, the Full width at half maximum (FWHM) radius expands from 0.3 m to 0.4 m as the array moves away from light from 4.5 m to a distance of 8.5 m. The beam divergence can be modified using reflectors and optic elements in case more acute changes in the light field are needed over a shorter distance of 0.4 m, the maximum length of the array.

During the empirical measurements in the UNH Tow Tank depth, several error sources were identified that limited an accurate correlation between the models and its corresponding measurements. These errors included alignment errors and measurement errors underwater. Although the frame mounting all the elements was rigid and aligned, the internal alignment of the light source and of the detectors may not have been aligned perfectly along one axis. As a result, the profile measurements of light along the z-axis and the along the xy-plane might be slightly skewed. Another factor is the water turbidity. An accurate calculation of the water turbidity in a survey site is very challenging. Therefore, for more accurate distance detection algorithms, water turbidity should be taken into account. The focus of the current study emphasized 3-D translational motion. Future work will be towards expanding the research to characterize rotational motion.

The study can be also applied in other applications, such as underwater optical communication and docking. Underwater optical communication can provide rates of up to 10 Mbits over ranges of 100 m. Several studies have investigated the use of omnidirectional sources and receivers in seafloor observatories as a wireless optical communication. Another application is underwater docking by using optical sensors. Currently, studies have shown that such an application is possible for docking vessels as far as 10-15 m for turbid waters and 20-28 m in clear waters.

Conclusions

Experimental work in this study was performed in order to evaluate the feasibility of a control design for underwater distance detection. The experiments included beam diagnostics, spectral analysis and intensity measurements using a 50 W light source. A light source was mounted on a rigid frame to the wall in the tow tank and a light detector was placed underwater connected to a tow carriage that can move on rails along the tank. The study shows that a 500-550 nm band-pass filter will allow the observation of a light field from a single source as a 2-D Gaussian beam pattern. In the current configuration, the FWHM radius expands from 0.3 m to 0.4 m as the array moves away from light from 4.5 m to a distance of 8.5 m. During the empirical measurements in the UNH Tow Tank depth, alignment errors and measurement errors underwater were identified that can limit the performance of the distance detection algorithms.

Optical Detector Array Design for Navigational Feedback Between UUVs

Designs for an optical sensor detector array for use in autonomous control of Unmanned Underwater Vehicles (UUVs), or between UUVs and docking station, are demonstrated in this chapter. Here, various optical detector arrays are designed for the purpose of determining and distinguishing relative 5 degree-of-freedom (DOF) motion between UUVs: 3-DOF translation and 2-DOF rotation (pitch and yaw). In this chapter, a numerically based simulator is developed in order to evaluate varying detector array designs. The simulator includes a single light source as a guiding beacon for a variety of UUV motion types. The output images of the light field intersecting the detector array are calculated based on detector hardware characteristics, the optical properties of water, and expected noise sources. Using the simulator, the performance of planar and curved detector array designs (of varying size arrays) are analytically compared and evaluated. Output images are validated using empirical in situ measurements. Results show that the optical detector array is able to distinguish relative 5-DOF motion with respect to the simulator light source. Furthermore, tests confirm that the proposed detector array design is able to distinguish positional changes of 0.2 m and rotational changes of 10° within 4 m-8 m range in x-axis based on given output images.

Introduction

The underwater optical communication methods reported in the literature are shown to be able to measure only up to 3-DOF, as opposed to the UUV's full maneuvering capabilities in all 6-DOF. Multiple DOF motion is necessary to determine the relative orientation between two or more UUVs or between a UUV and a docking platform. Therefore, the design of an optical detector array for such an application becomes crucial. This chapter compares planar and curved array designs for underwater optical detection between UUVs or between a UUV and a docking station. The comparison between the two types of arrays is conducted using a simulator that models a single-beam light field pattern for a variety of motion types (i.e., 3-DOF translation and 2-DOF rotation). In addition, the number of elements in the array and the possible noise sources from experimental hardware and the environment are also taken into account. The results from the simulator are validated using in situ measurements conducted in underwater facilities at the Jere E. Chase Ocean Engineering Laboratory. The results of this study are to be used for the design of an optical detector unit for UUVs and the development of translational and rotational detection and control algorithms.

The performance criteria for an optical detector array design suitable for underwater communication between UUVs can be judged by two characteristics. The first is the ability of the detector array to provide a unique signature, that is, a sampled image that represents a given location and orientation of a UUV with respect to a transmitter (i.e., light source). The second characteristic is the minimum number of required optical detector components. This characteristic is derived from the fact that a UUV should have a timely response to fast changes of the UUV's dynamics. (A smaller number of detectors would simplify the hardware design and reduce processing time. A unique signature, an image footprint from the optical detectors, would enable a UUV to receive the necessary feedback to help the on-board control system to determine appropriate control commands to maintain a specified/desired orientation with respect to and distance from a beacon (or any other object of interest).

Optical Design Considerations

The idea behind an optical detector array is such that as this array, which is mounted on a UUV, comes in contact with (without loss of generality) a guiding beam, the light field is sampled and a signature of the light beam can be obtained. Here, the light source represents a guide that is mounted on a leader UUV or on a docking station. In this study, a single light source is used as the guiding beam for the detector array. The light field generated from the light source is approximated as a Gaussian beam at a given solid angle. For large arrays (i.e., arrays with several individual detectors), the light signature can be further represented as an image.

The design considerations for an optical detector array can be categorized as environmental and hardware-related. In this research, the primary hardware for such a module consists of optoelectronic array components (e.g. photodiodes). These components are framed in a specific configuration and are mounted to an appropriate area on a UUV.

Figure 3A:
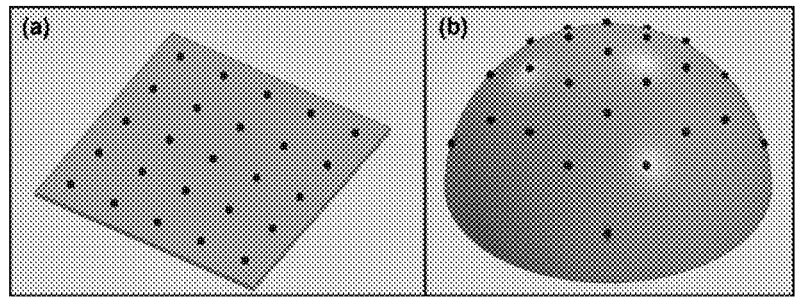
FIG. 3A is a schematic illustration of array designs used in the simulator: (a) Planar array and (b) Curved array.

A planar array is an array of optical detectors that are mounted on a flat, 2-dimensional frame. Although the optical detectors can be placed in any configuration, a traditional equidistant design is assumed (without loss of generality) for the sake of simplicity. The detector, furthermore, is assumed to be square, having an equal number of vertical and horizontal elements (FIG. 3A(a)). The planar array simplifies the design and the resulting light signature, which is a cross-sectional (and possibly rotated) view of and within the light field. A curved array is an array of optical detectors that are mounted on either a spherical or parabolic frame. The geometry of the frame (curvature and oblateness) provides a larger range of incidence angles between the detectors and the light field. In this study, all elements of the curved array are equidistant in a plane projection and located at a fixed distance from the geometric center of the frame (FIG. 3A(b)). FIG. 3A is a schematic illustration of array designs used in the simulator: (a) Planar array and (b) Curved array.

Environmental Considerations

The light source in this study is assumed to be a point source with peak radiance $L_0(r=0, \rho=0, \Delta\lambda)$ [W/m$^2$·sr·nm] for a given detector with a fixed aperture area and a spectral range of $\Delta\lambda$. Using a cylindrical coordinate system, the axial distance from the light source to the optical element along the beam axis is defined as r and the radial distance from the beam axis is defined as $\rho$. Assuming that light is not absorbed or scattered by the water medium, radiance collected by a detector is inversely proportional to the square of the distance to the source. The location for half the peak intensity from the light source, $\Delta r_{half}$ along the beam axis is assumed to be relatively small. The radiance from the light source according to the inverse-square law can be defined as:

$$L_{obs}(r, 0, \Delta\lambda) = L_0(0, 0, \Delta\lambda) \cdot \left(\frac{\Delta r_{half}}{r}\right)^2 \quad (3.1)$$

Alternatively, the radiance change from one location, $r_1$, to a second location, $r_2$, along the beam axis can be expressed using:

$$L_{obs}(r_1, 0, \Delta\lambda) = L_{obs}(r_2, 0, \Delta\lambda) \cdot \left(\frac{r_2}{r_1}\right)^2 \quad (3.2)$$

The beam pattern produced from the intersection of a Gaussian beam light field with a plane that is perpendicular to the transmission direction can be described using a Gaussian function. Traditionally, the beam pattern is described using length terms with the peak intensity value at the intersection point of the beam axis with the plane ($\rho=0$):

$$L_{obs}(r, \rho, \Delta\lambda) \approx L_0(0, 0, \Delta\lambda) \cdot \left(\frac{\Delta r_{half}}{r}\right)^2 \cdot e^{\left(-\frac{2\rho^2}{W^2(r)}\right)} \quad (3.3)$$

where, W(r) is the radial distance of the beam width on the plane at a beam intensity of $1/e^2$ of the peak value at a distance r from the light source.

For this study, a description of the beam pattern angular terms was applied with a relationship: $\rho = r \cdot \tan(\eta_b)$, where $\eta_b$ is the angle between the beam axis and the light ray reaching the detector. In addition, the RMS width of intensity distribution, which is half of the beam width, $\sigma_\rho = 0.5\ W(r)$, was also converted to an angular relationship:

$$\sigma_\eta = \tan^{-1}\left(\frac{\sigma_\rho}{r}\right).$$

Using a small-angle approximation, the exponent term can be defined as:

$$e^{\left(-\frac{2\rho^2}{W^2(r)}\right)} = e^{\left(-\frac{r^2 \tan^2 \eta_b}{2r^2 \tan^2 \sigma_{\eta_b}}\right)} \cong e^{\left(\frac{-\eta_b^2}{2\sigma_{\eta_b}^2}\right)} \quad (3.4)$$

Light in water is also attenuated by absorption and scattering. Environmental background noise, denoted by $L_b$, from scattering of light in the water column may occur. This attenuation can be described using Beer's law, which states that radiance decreases exponentially through the medium as a function of distance, r, from the source and the diffuse attenuation coefficient, $K(\Delta\lambda)$. The attenuated radiance at each detector is:

$$L_{att}(r, \eta, \Delta\lambda) = (L_{obs}(r, \eta, \Delta\lambda) - L_b) \cdot e^{\left(\frac{-2 \cdot K(\Delta\lambda) \cdot r}{2 - \eta^2}\right)} + L_b \quad (3.5)$$

The environmental background noise caused by interaction between the light beam and the water medium has been previously modeled. These studies that have investigated the interaction of light beams through turbulent medium approximate the background noise using a blurring function applied to the light beam. In this study, the background noise is modeled using a Hanning window:

$$h(n) = 0.5\left(1 - \cos\left(\frac{2\pi n}{N_w - 1}\right)\right) \quad (3.6)$$

where, $N_w$, denotes the size of the Hanning window and n is the sample number in the window, i.e. $0 \leq n \leq N_w - 1$. The Hanning window is convolved with the output image generated by the optical elements.

Hardware Considerations

As light interacts with a detector element (e.g., photodiode) in the array, photons from the light are absorbed by the detector and current is generated. The current is then manipulated by the signal conditioning circuitry into a digital signal using an analog-to-digital convertor (ADC). The electrical signal measured by the detector is dependent on the intensity (i.e., the optical power) of the light beam and on the detector's responsivity (i.e., the electrical output of a detector for a given optical input). Also, noise sources produced in the hardware can make it difficult to extract useful information from the signal. The quality of the detector is characterized by the sensitivity that specifies the minimum intensity value that can be detected. The key hardware noise sources are: signal shot noise, $\sigma_s$, background shot noise, $\sigma_b$, dark-current shot noise, $\sigma_{dc}$, Johnson noise, $\sigma_j$, amplifier noise, $\sigma_j$, and ADC-generated quantization noise, $\sigma_q$. All sources of hardware noise are assumed to be mutually independent. Furthermore, it is assumed that all noise can be approximated as Gaussian with corresponding values of standard deviation. Accordingly, these noise sources may be combined as a root sum of squares and represented with a net noise current:

$$\sigma_n = \sqrt{\sigma_s^2 + \sigma_b^2 + \sigma_{dc}^2 + \sigma_j^2 + \sigma_q^2} \quad (3.7)$$

In addition to the electro-optical characteristics of the array component, the geometrical design of the array also affects the received intensity of the light signal. The incidence angle, $\theta$, of the light ray reduces the level of radiance measured by the detector according to Lambert's cosine law:

$$L_\theta(r, \eta, \Delta\lambda) = L_n(r, \eta, \Delta\lambda) \cdot \cos(\theta), \quad (3.8)$$

$L_\theta(r,\eta,\Delta\lambda)=L_0(r,0,\Delta\lambda)\cos\theta$ where $L_n$ is the radiance at the surface normal.

The Simulator

Based on the hardware and environmental considerations, a simulator (an analytical test bed) is developed. The goal of the simulator is to analyze varying array designs for UUV optical detection of relative translation and rotation with respect to a reference coordinate frame. The criteria in evaluating the effectiveness of a detector array design includes: 1) determining the minimum number of detector elements required for robust UUV position and attitude determination and 2) verifying that the detector is able to acquire a unique signature for each UUV position/orientation combination with respect to the given light source.

The simulator calculates light intensities at the individual optical elements based on the relative geometry between the light source and the detector. The simulator also takes into account the environmental and hardware effects described in the previous section. The effective operational distance for underwater communication is dependent on water clarity. Although a broad spectral range of light (400 to 700 nm) can be used for optical communication, the radiation calculation in the simulator uses a narrower spectral range (between 500 to 550 nm), providing maximum transmittance in clear to moderately clear waters. Based on empirical measurements using a 400 W metal halide lamp and a commercial grade Mounted Silicon Photodiode photodetector, a maximum operational distance of up to 20 m is assumed for extremely clear waters, which represents open ocean conditions ($K=0.05$ m$^{-1}$), and up to 8 m for moderately clear waters, which represents tropical coastal waters ($K=0.1$ m$^{-1}$). Although the simulator can provide results for larger angles, pitch and roll angles are limited to within 20°. This constraint is based on the assumption that most UUVs are built to be stable about their pitch and roll axes of rotation.

Reference Frame

In the simulator, an Earth-fixed reference frame is assumed, where a light source is centered at the origin (0,0,0). Several coordinates are identified in the x-y-z coordinate frame with respect to the UUV center of mass (COM). Several attitude orientations are also identified with respect to the Earth-fixed reference frame and defined by angles $\varphi$, $\theta$, and $\psi$ for roll, pitch, and yaw, respectively. In order to ensure appropriate sensor feedback for adequate control performance, the detector array should be able to detect a unique light signal (pattern) for each combination of coordinate position and attitude orientation. Furthermore, this detection should be accurate to within 0.2 m of the true COM coordinate position and within 10° of the true attitude orientation within 4 m-8 m range in x-axis.

The array geometry is chosen based upon the dimensions of the UUV. The UUV in this study is assumed to be a rigid body of box-type shape with a width (starboard to port) and height (top to bottom) of 0.4 m and a length (from bow to stern) of 0.8 m, the size of a generic observation-class ROV used as a test platform. Accordingly, the width and height of the detector array are 0.4 m×0.4 m for both planar and curved array designs. The adapted coordinate axes convention is that of the Tait-Bryan angles. Here, the x-axis points toward the bow and the y-axis towards starboard. The body-fixed z-axis points downward and completes the orthogonal triad. In this study, the follower is assumed to undergo rotation about all three-axes, i.e., pitch, roll and yaw. The coordinates associated with the array detectors are multiplied with the rotation matrices in order to be in the same reference system as the leader UUV.

Array Geometry

As previously mentioned, two array shapes are compared in this study: (1) a planar array and (2) a curved array. The geometry of both arrays is defined in this section.

In the planar detector array, the detectors are defined relative to the UUV COM with respect to the local (body) coordinate frame. The center and the four corners of the planar array frame are defined as follows:

$$Arr_{center} = \left(COM_x + \frac{l}{2}, COM_y, COM_z\right) \quad (3.9a)$$

$$Arr_{min(y), max(y)} = COM_y \pm \frac{w}{2} \quad (3.9b)$$

$$Arr_{min(z), max(z)} = COM_z \pm \frac{h}{2} \quad (3.9c)$$

where $COM_x$, $COM_y$, and $COM_z$ respectively define the x, y and z coordinates of the follower COM, l is the length of the UUV, and w and h denote the width and the height of the vehicle, respectively. The lateral and vertical spacing (denoted as $p_y$ and $p_z$,) between the individual detectors on the array can be expressed as:

$$p_y = \frac{w}{N-1} \quad (3.10a)$$

$$p_z = \frac{h}{N-1} \quad (3.10b)$$

It is assumed that the detector array is an N×N square where N is the number of optical elements. That is, the number of detectors in the rows and columns of the array are the same. Accordingly, the detector spacing is also the same (i.e. $p_y=p_z$). It is important to note that for a curved array, $p_y$ and $p_z$ are projected detector spacing.

A hemispherical shape is used for the curved array. The number of detectors in the curved array is initially defined based on the N×N planar array design. Then, if the detectors are projected onto the hemispheric surface, as in FIG. 3.1(b), with a fixed radius r:

$$x_{ij} = \sqrt{r^2 - y_{ij}^2 - z_{ij}^2} \quad (3.11)$$

where $x_{ij}$ is the position of the detector element on the x-axis and $y_{ij}$ and $z_{ij}$ are the coordinates of the array that is projected onto the bow of the follower UUV. i and j are the indices that represent the row and column number of the array. In this study, the radius, r, of the hemisphere (of the curved array) is 0.32 m and is defined from its focal point, F, which is the center of the hemisphere:

$$F_x = COM_x + l/2 \quad (3.12a)$$

$$F_y = COM_y \quad (3.12b)$$

$$F_z = COM_z \quad (3.12c)$$

The main difference between the planar and curved array designs is that all of the optical elements in the planar array are oriented in the same direction, while the detectors in the curved array are normal to the surface of the array frame and thus allow a larger range of incidence angles.

Radiometry

The construction of a realistic light field (as measured by the array detectors) is based on the radiometric and hardware considerations for each detector. The radiometric calculations are based on the distance (i.e., inverse square law and Beer's law) and orientation (Lambert's cosine law) of each detector with respect to the light source. Using the detector's characteristics and the associated electronics, the artificially created incident light is numerically converted into a digital signal. For the array simulator in this study, the specifications of two types of photodiodes are used as reference (Thorlabs SM05PD1A, Thorlabs SM05PD2A). The resulting electronic signal is represented as a 10-bit (0-1023) sensor output value (thus, introducing quantization error). Environmental background noise is artificially added to the signal using a Hanning window of size $N_w$=11. Also, a random net noise current of $\sigma_n$=$10^{-6}$ is added to the electronic signal. The final digital signal is used to generate an image pattern which, in turn, is to be used by the array detectors to identify the position and the orientation of the UUV.

Results

Simulator Results

The success of the simulator described in this study relies on the ability of the array to provide a unique image for every UUV position/orientation combination. In order to process the simulator output images more efficiently, the output data is reduced to a few key image parameters, allowing for a multi-parameter comparison. These chosen few parameters describe the beam pattern and allow the use of simple algorithms that do not require significant computational effort. One such algorithm is the Spectral Angle Mapper (SAM), which is the dot product between sets of key parameters extracted from two images that are represented as vectors, $U(u_1, u_2, \ldots u_{np})$ and $V(v_1, v_2, \ldots v_{np})$:

$$\alpha = \cos^{-1}\left(\frac{\vec{U_t} \cdot \vec{V_t}}{\|\vec{U_t}\| \cdot \|\vec{V_t}\|}\right) \tag{3.13}$$

The calculated angle between the two vectors, i.e. SAM angle $\alpha$, is the numerical resemblance between the images. Two very similar images result in an angle value close to 0°, whereas two very different images result in an angle close to 90°. The SAM angle provides a good performance evaluation indicator to the different types of array detector geometries tested using a single-value parameter.

Although the UUV is a six DOF system, it is assumed that it is not possible to achieve relative roll angle detection (because of axial symmetry about the body x-axis). Thus, five parameters are provided to the simulator as input: translation along all three coordinate axes, rotation of the pitch angle, $\theta$, and rotation of the yaw angle, $\psi$. Accordingly, the image output of the simulator is analyzed using five parameters that can be related to input parameters (FIG. 3B): the peak light intensity value, I, the corresponding location of the horizontal detector, j, and vertical detector, k, at peak intensity, the location of the skewness of the horizontal intensity profile gradient, $Sk_h$, and skewness of the vertical intensity profile gradient, $Sk_v$. The peak value is normalized with respect to a given maximum detectable intensity (0.0<I<1.0). The locations of the horizontal and vertical detectors are defined with respect to the central detector (j=(N+1)/2, k=(N+1)/2). Based on the location of the peak intensity, the slopes of the horizontal and vertical intensity are calculated. The slope of the profile is used rather than the profile itself as the slope also provides the directionality of the beam profile (i.e., negative or positive) in addition to the asymmetry of the profile. The images and the corresponding parameters for the planar and the curved array of size 21×21 for a given coordinate location and yaw rotation are shown in FIG. 3B and FIG. 3C, respectively.

Figure 3B:
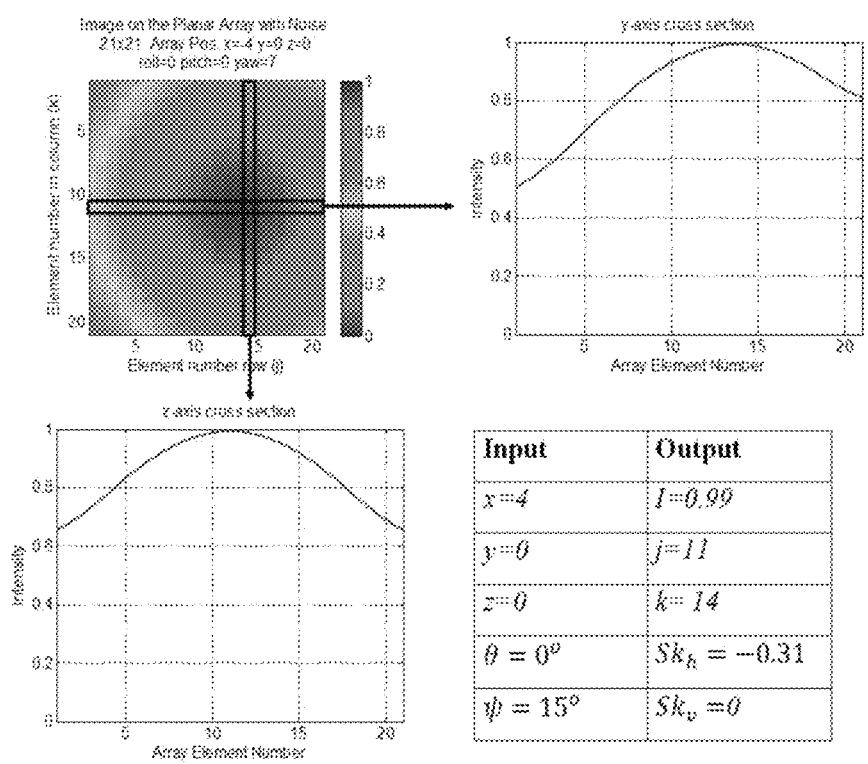
FIG. 3B shows key image parameters and intensity profiles for a planar array detector unit with hardware and environmental background noise: (top left) Output image from the simulator, (top right) Horizontal profile, (bottom left) Vertical profile, (bottom right) Input values used to generate output image and key parameters describing output image.

FIG. 3B shows key image parameters and intensity profiles for a planar array detector unit with hardware and environmental background noise: (top left) Output image from the simulator, (top right) Horizontal profile, (bottom left) Vertical profile, (bottom right) Input values used to generate output image and key parameters describing output image.

Figure 3C:
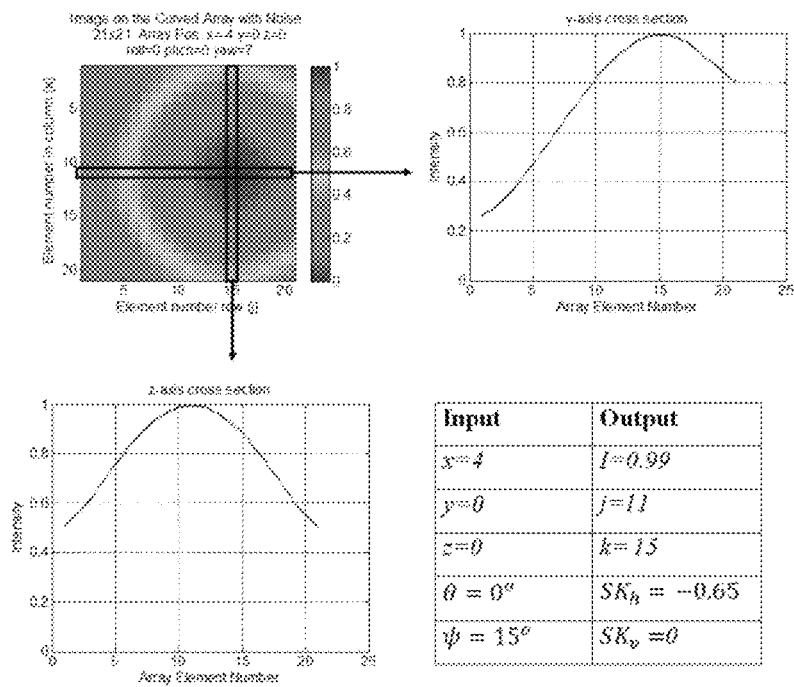
FIG. 3C shows key image parameters and intensity profiles for a curved array detector unit with hardware and environmental background noise: (top left) Output image from the simulator, (top right) Horizontal profile, (bottom left) Vertical profile, (bottom right) Input values used to generate output image and key parameters describing output image.

FIG. 3C shows key image parameters and intensity profiles for a curved array detector unit with hardware and environmental background noise: (top left) Output image from the simulator, (top right) Horizontal profile, (bottom left) Vertical profile, (bottom right) Input values used to generate output image and key parameters describing output image.

Detector Array Comparison

Figure 3D:
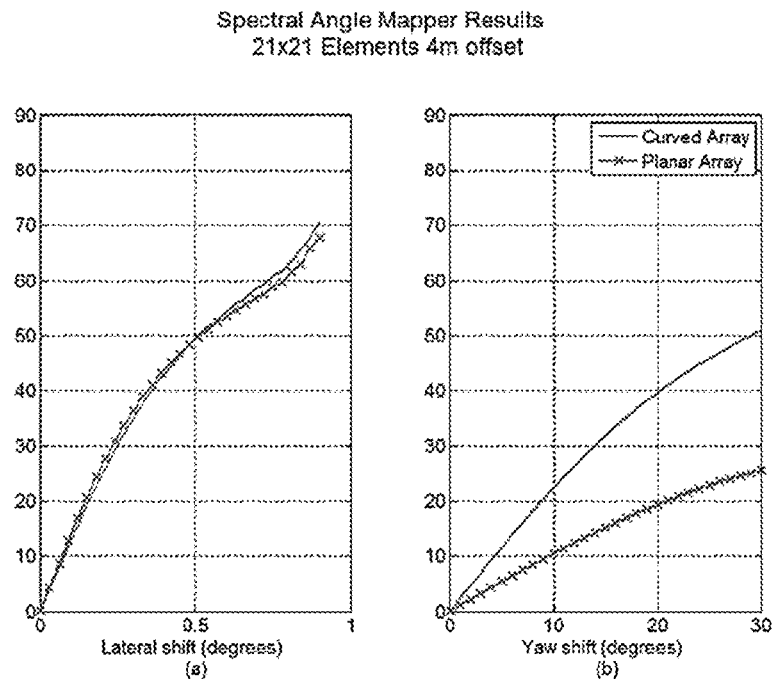
FIG. 3D illustrates comparative resemblance results (SAM angles) for 21×21 element curved and planar array (at x=4 m) as a function of: (a) lateral translation, (b) yaw rotation.

As a first step for the selection of the array design, the geometry of the detector array is evaluated. A performance evaluation between planar and curved arrays is conducted, where each detector array contains a 21×21 grid of detector elements with a detector spacing of 0.02 m. Both detector arrays are evaluated for their ability to detect changes in position and orientation, i.e., changes in SAM angle, $\alpha$. Changes in position are evaluated as the UUV translates along the y-axis from a given origin (0 m) to an offset of 0.9 m in 0.03 m increments. Similarly, changes in orientation are evaluated by rotating the UUV about the z-axis, yaw rotation, from its initial reference (0°) to 30° in increments of 1°. FIG. 3D represents the resemblance results to identify UUV positional and attitude changes based on measured signals (images) collected by the detector array at 4 m. The comparative results for changes in position using the SAM algorithm show similar performance between the two array geometries, where the curved array performs slightly better (2°) at shifts greater than 0.6 m. However, an investigation of the results for changes in orientation reveals that the curved array is more sensitive to changes in orientation than the planar array. The SAM angle results for the curved array show changes of 12° at 5° yaw rotations and changes of 22° at 10° rotations, whereas the results for the planar array show changes in SAM angle of 5° at 5° yaw rotations and 11° at 10° rotations. Based on these results, it is deduced that the curved array geometry is more suitable for distinguishing changes in position and, especially, orientation of a UUV platform with respect to a reference light beacon. FIG. 3D illustrates comparative resemblance results (SAM angles) for 21×21 element curved and planar array (at x=4 m) as a function of: (a) lateral translation, (b) yaw rotation.

After the geometry of the detector array is defined, relationships between the ability to distinguish changes in position and orientation from the output images and the number of elements in the curved detector array are evaluated. The comparisons include different array sizes, ranging from a 3×3 size array up to a 101×101 size array at distances ranging from 4 m to 8 m to the light source. The comparative results at 4 m (FIG. 3E) show that changes in positional and rotational shifts can be detected by an array with the size of at least 5×5 optical elements with detector spacing of 0.1 m. Based on a threshold of a 15° SAM angle, a smaller array would fail to detect translational shifts smaller than 0.2 m or rotational changes smaller than 10°. It should also be noted that no significant changes in detection capability are observed for array sizes greater than 7×7 with a detector spacing of 0.067 m. Although the ability of the curved array to distinguish between the images decreases as the operational distance increases, the SAM algorithm results for 5×5 array at 8 m are still above 10° for a 10° yaw rotation and above 6° for 0.2 m translation.

Figure 3E:
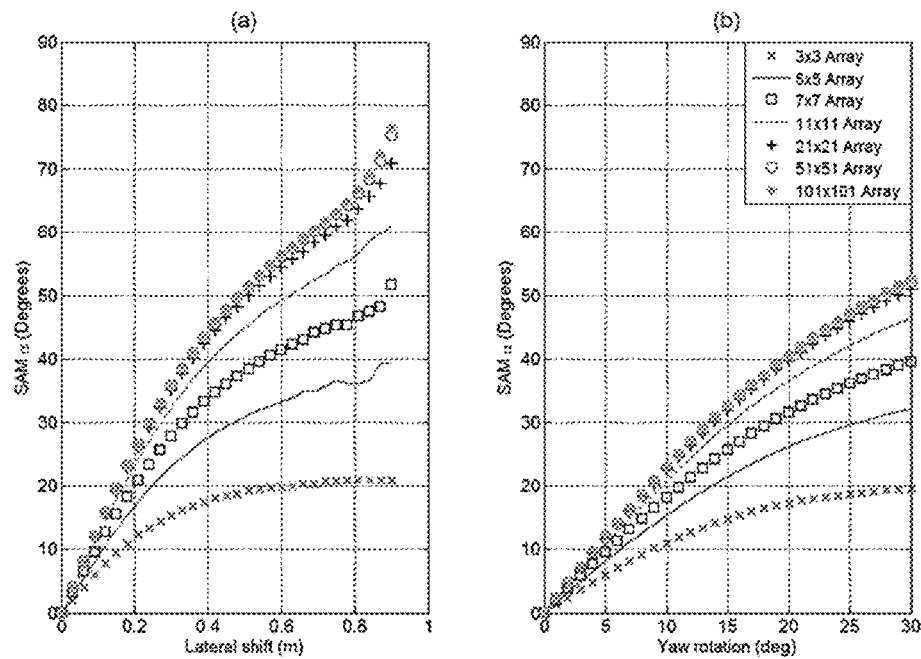
FIG. 3E illustrates comparative resemblance results (i.e., SAM angle) with respect to varying array sizes (incorporating environmental and background noise): (a) SAM angle with respect to lateral motion (b) SAM angle with respect to angular rotation.

FIG. 3E illustrates comparative resemblance results (i.e., SAM angle) with respect to varying array sizes (incorporating environmental and background noise): (a) SAM angle with respect to lateral motion (b) SAM angle with respect to angular rotation.

Figure 3F:
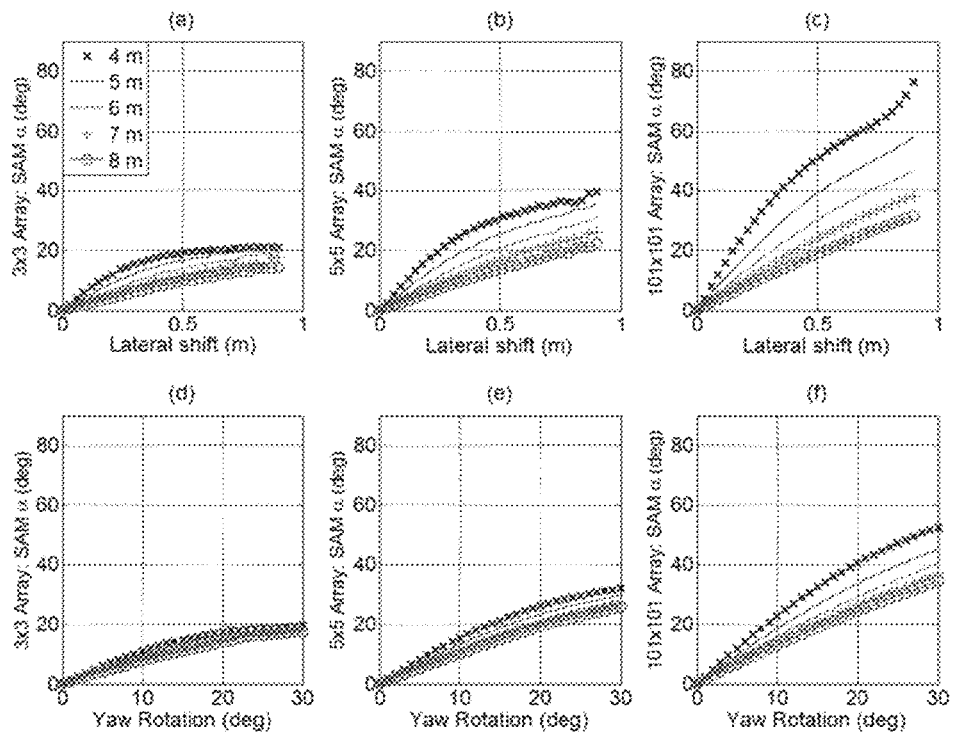
FIG. 3F shows comparative resemblance results (i.e., SAM angle) with respect to operational distance (incorporating environmental and background noise): (a-c) lateral shift, (d-f) yaw rotation—(a,d) 3×3 array (b,e) 5×5 array (c,f) 101×101 array with spacing of 0.2 m, 0.1 m and 0.004 m, respectively.

FIG. 3F illustrates comparative resemblance results (i.e., SAM angle) with respect to operational distance (incorporating environmental and background noise): (a-c) lateral shift, (d-f) yaw rotation—(a,d) 3×3 array (b,e) 5×5 array (c,f) 101×101 array with spacing of 0.2 m, 0.1 m and 0.004 m, respectively.

Experimental Confirmation

In addition to the analytical study presented in this chapter, experimental validations are conducted at the wave and tow tank. The underwater experiments compare the simulator outputs to that of empirical measurements. This comparison validates the optical model used in the simulator (i.e., Gaussian beam profile) and confirms the environmental physical properties that contribute to the light field as received by the detector array. The light source in this study is a 400 W underwater halogen lamp (contained in a waterproof fixture). Profiles of light intensity data (radiance measurements) were collected via a spectrometer such that the measurements are perpendicular to that of the illumination axis. The profiles are collected at distances ranging from 4 m to 8 m at 1 m increments and with lateral shifts from the illumination axis up to 1 m away from the axis at 0.1 m increments.

Figure 3G:
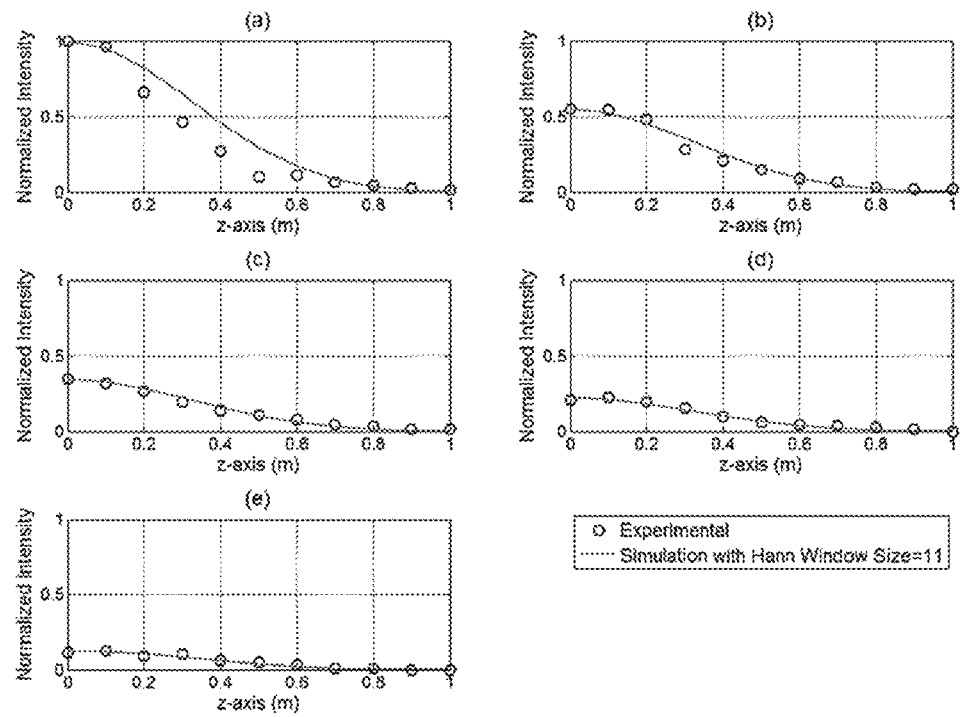
FIG. 3G shows a comparison of Experimental and Simulation results (a) 4 m (b) 5 m (c) 6 m (d) 7 m (e) 8 m.

The profiles from empirical measurements are compared to profiles produced from simulator output images calculated for the same distance and orientation conditions (FIG. 3G). The measured profiles confirm that the light field calculations for the simulations are valid. Although the background noise in the simulated models is overestimated, the correlation, $R^2$, between the two profiles is between 0.95-0.99 for distances from 4-8 m. FIG. 3G illustrates comparison of Experimental and Simulation results (a) 4 m (b) 5 m (c) 6 m (d) 7 m (e) 8 m.

Discussion

The results of this study show that the detector array simulator is a useful and reliable tool for array design in optical communication between UUVs or between a UUV and a docking station. The simulator has a modular design to allow for the addition and changing of hardware and environmental parameters. Although the simulator can evaluate other array geometries with a variety of sizes, only two traditional shapes are considered. The simulator results show that a curved array with a minimum array size of 5×5 elements is sufficient for distinguishing positional changes of 0.2 m and rotational changes of 10°. For the distinction of smaller changes, a larger array size is required.

A follower UUV is assumed to have five DOF maneuverability with respect to a given light source: three DOF translations (i.e., translations along the x, y, and z axes) and two DOF rotations (yaw and pitch). Because the transmitter unit in the presented configuration has only one light source with a Gaussian spatial intensity distribution, it is not possible to decouple roll changes (rotation about the body-fixed x-axis) from either pitch or yaw. This is due to the axial symmetry of the light beam. The use of multiple light sources or a light source with a unique intensity distribution may enable roll rotation sensing.

It is important to note that the simulator assumes that the water column is uniform with systematic background noise. As a result, the output images of the light field intersecting with the detector array resemblance a Gaussian beam pattern. However, disturbances in the medium (e.g., sediment plume) may cause the beam pattern to be distorted. This point should be taken into account in the development of control algorithms for UUV navigation. Otherwise, the control algorithms may misinterpret the acquired image and direct the follower UUV away from the guiding beam. The simulator results show that detector noise does not contribute significantly to the image output. Other detectors with a larger noise level may contribute more to output images.

An alternative hardware component that was considered instead of photodetectors was a camera array. The potential benefits using COTS cameras (CCD or CMOS) is to provide additional spatial information that can potentially enhance the performance of pose detection algorithms. However, one of the requirements for an autonomous system is the ability to process the sensor's input and execute the pose detection algorithms fast enough to respond to changes in the UUV's dynamics (i.e., detection of the leader UUV and a response by the follower UUV). It seems that a camera array that performs image extraction and processing procedures may not be sufficiently fast for the UUV interaction. With that said, the camera array option will be considered for future work that allows slower update rates of pose detection algorithms.

Conclusions

In this chapter, a detector array simulator was developed to evaluate different geometrical structures of optical arrays of varying sizes for underwater position/orientation detection between UUVs or between a UUV and a docking station. Criteria for an array design suitable in underwater communication between UUVs was based on: 1) the ability of the array to distinguish changes in position and orientation of a UUV with respect to a given light source and 2) the minimum number of optical detector components that would simplify the hardware design and reduce processing time. The simulator calculated a light field generated from a single light source passing through the water column, taking into account attenuation and scattering. Based on the optoelectronic characteristics of the detectors (including noise) and the array design, an output image of the light field intersecting the detector array was produced.

Two array designs, i.e. planar and curved, were evaluated based on their ability to distinguish changes in position and orientation between the UUV and a guiding light source. Because of the beam pattern symmetry (generated from a single light source), it is possible to detect 5-DOF UUV motion, i.e. translations along x, y and z-axes, as well as pitch and yaw rotations, and not full 6-DOF motion. The input data in the simulator evaluation included the relative geometry between the light source and the optical array. SAM algorithm evaluated the detector array design and was able to distinguish translational changes within an operational range between 4 m to 8 m with accuracy of 0.2 m and rotational shifts within 10° using key output image parameter values. Using a 21×21 array with detector spacing of 0.02 m, it was determined that a curved array design is more sensitive to rotational changes than a planar array, whereas both array geometries performed similarly for translational shifts. After the geometry of the detector array was defined, the minimum number of element in the detector array was determined. The simulator results showed that an array of at least 5×5 detector elements with 0.1 m detector spacing was needed to distinguish changes in five DOF. The results were also validated using in situ experimental measurements.

Pose Detection and Control Algorithms for Dynamic Positioning of UUVs Via an Optical Sensor Feedback System The use of an optical feedback system for pose detection of Unmanned Underwater Vehicles (UUVs) for the purpose of UUV dynamic positioning is investigated in this chapter. The optical system is comprised of a curved optical detector array (on board the UUV) of hemispherical geometry that is used to detect the relative pose between an external light source and the UUV. This pose detection is accomplished in two ways: via Spectral Angle Mapper (SAM) algorithm and via image moment variants. These two methods are also compared to a traditional image processing algorithm, phase correlation and log-polar transform. In this chapter, analytical simulations are conducted to test the efficacy of feedback controllers (PID, Sliding Mode Control) using the optical feedback system and a previously developed numerical simulator. The resulting dynamic positioning and control performance of a UUV is observed in two simulated control scenarios: 1) a static-dynamic (regulation control) system in which the UUV autonomously positions itself via 4 degrees-of-freedom (DOF) (translational control in addition to yaw/heading control) with respect to a fixed external light source and 2) a dynamic-dynamic (tracking control) system where one UUV tracks another independent UUV (via translational control in 3 DOF). In these simulations, the numerical simulator takes into account environmental conditions (water turbidity and background noise) and hardware characteristics (hardware noise and quantization). Simulation results show proof of concept for this optical-based feedback control system for both the static-dynamic and dynamic-dynamic cases, the UUV being able to regulate/track its desired position(s) to within a reasonable level of accuracy.

Introduction

As a first step to investigate positioning and coordinated formation of UUVs using optical communication, a detector array interface, i.e. a numerical simulator was designed. An optical array for UUVs was designed based on theoretical models of a point source light field and a range of oceanic conditions (e.g. diffuse attenuation coefficients). In this study, a curved optical detector array design of hemispherical geometry with radius of 0.55 m is used to decouple UUV translation from orientation changes using sensor detection measurements of an external light source. Array sizes of 21×21 and 5×5 grids of detection sensors are investigated in order to observe comparative pose detection performance capabilities. The detection algorithms are developed based on two different types of underwater applications. The first one is a static-dynamic (regulation control) system, e.g. UUV approaching a docking station or a data-transfer hub, in which a guiding light source (and, therefore, its optical illumination axis) is static. Here, the UUV is controlled to arrive at and maintain a desired position and orientation with respect to the light source. The second underwater application is a dynamic-dynamic (tracking control) system, e.g. leader-follower UUV tracking system. In this case, one leader UUV is equipped with a light source with a Gaussian intensity profile mounted to its crest and a follower UUV is guided with the aid of a light detector array mounted at its bow. Two types of pose detection algorithms (Spectral Angle Mapper (SAM) and image moment invariants) are compared to a more traditional image processing approach (phase correlation and log-polar transform). Performance criteria of the three algorithms include positional accuracy, processing speed, and dependence on the environmental characteristics. In this chapter, Proportional-Integral-Derivative (PID) and Sliding Mode Controllers (SMC) are implemented for a variety of static-dynamic and dynamic-dynamic UUV scenarios in order to evaluate the optical-based feedback control system performance under varying conditions.

Pose Detection Algorithms

Phase Correlation and Log-Polar Transform

Phase correlation and log-polar transform approach to pose detection is able to take into account images in 4-degrees-of-freedom (DOF) (i.e., rotation, scale and translation along two axes). The phase correlation algorithm uses Fourier Shift Theorem to detect the translated images. It is given that two images, represented as $f_1$ and $f_2$, observe the same target source acquired at different locations with relative translations, dx and dy, with respect to each other. Then, at the same relative orientation, the relationship between the two images can be described as:

$$f_2(x,y) = f_1(x-dx, y-dy) \tag{4.1}$$

The corresponding relationship of the Fourier transforms for these images, $F_1(\omega_x, \omega_y)$ and $F_2(\omega_x, \omega_y)$, is given by:

$$F_2(\omega_x,\omega_y) = e^{(\omega_x dx + \omega_y dy)} F_1(\omega_x,\omega_y) \tag{4.2}$$

The magnitudes of $F_1(\omega_x, \omega_y)$ and $F_2(\omega_x, \omega_y)$ are comparable to each other if the relative translations, dx and dy, are, in turn, comparatively small with respect to the image size, whereas the phase difference between the two images is directly related to their translation. This phase difference is equivalent to the phase of the cross-power spectrum:

$$e^{\omega_x dx + \omega_y dy} = \frac{F_1(\omega_x, \omega_y) F_2^*(\omega_x, \omega_y)}{|F_1(\omega_x, \omega_y) F_2^*(\omega_x, \omega_y)|} \tag{4.3}$$

where $F_2^*$ denotes the complex conjugate of $F_2$.

The relative translation values are derived by calculating the inverse Fourier Transform in (4.3). The location of the resulting peak corresponds to the translation of dx and dy, respectively, such that $$(dx, dy) = \max(F\{e^{\omega_x dx + \omega_y dy}\}) \tag{4.4}$$

Figure 4A:
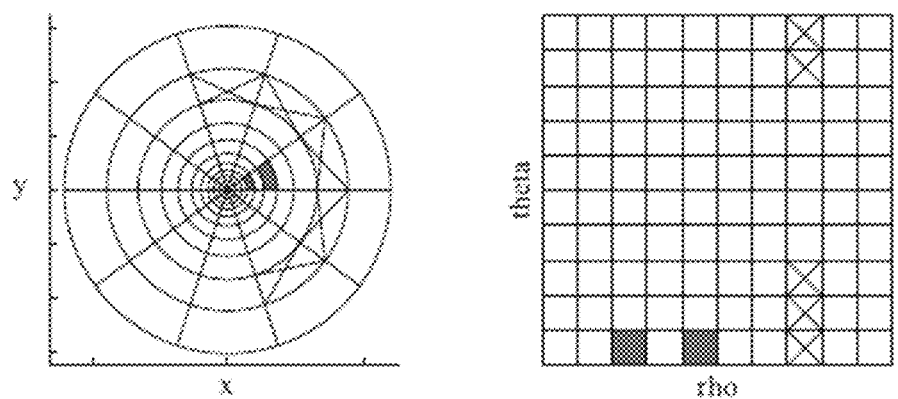
FIG. 4A illustrates transformation of an image from Cartesian space to polar space. Cartesian space (left). Polar space (right).

The rotation and scale between two images is calculated using the log-polar transform. Here, both images are first translated from a Cartesian domain (x, y), to a log-polar domain (log($\varphi$), $\theta$) using the following transformation:

$$\log(\rho) = \log\left(\sqrt{(x-x_c)^2 + (y-y_c)^2}\right) \tag{4.5}$$

$$\theta = \tan^{-1}\left(\frac{y-y_c}{x-x_c}\right) \tag{4.6}$$

where $\rho$ is the radial distance from the center of the image, $(x_c, y_c)$ and $\theta$ is the corresponding angle (FIG. 4A). FIG. 4A shows transformation of an image from Cartesian space to polar space [90]. Cartesian space (left). Polar space (right).

After the transformation of the images to a log-polar domain, the phase correlation algorithm described in (4.3) is applied to detect relative rotation and scale between the two images.

A reference image is calculated and obtained from the simulator and is designated as $f_1$. The pose parameters for the reference image are a set of five pre-defined x-axis offsets (e.g., 4 m to 8 m with 1 m increments) with respect to the leader's beacon. All other 5-DOF pose geometries (translation with respect to the y and z axes; roll, pitch and yaw rotations) are kept the same as the leader UUV. The instantaneous image of the follower UUV in motion, $f_2$, is calculated using the simulator for the pose evaluation path. The results from the phase correlation and log-polar transformation algorithms (i.e., relative translation and rotation between the reference and the instantaneous image) are converted to the local coordinate reference system showing the relative translations and rotations between the leader and that of the follower. The algorithms are evaluated in terms of their correlation to the parameters in the pose evaluation path datasets.

Spectral Angle Mapper (SAM)

Key parameters from the follower's detector array output image were extracted to a vector of identifiers for each pose. Changes in translation and orientation between the poses were monitored using a dot product between two identifier vectors of two poses using SAM described in Chapter 3. In this chapter, the SAM algorithm relies on five main image parameters that include the skewness of both the row and column of the resulting intensity profile of the image pixel with the maximum intensity and the row and column numbers of the image pixel with the maximum intensity as demonstrated.

The SAM algorithm has been implemented for a planar detector array of 21×21 elements. To quantify the amount of shift in x-axis, an offline calibration procedure that ranges from 4 m to 8 m at 1 m increments is performed. The reference image is the output obtained when there is only x-offset, i.e. no translation in the y and z axes or yaw or pitch rotations. (Roll rotation is not considered, as it is not possible to detect roll changes from a single light source configuration.) The image under test is the output when there is a specific relative geometry, including all of 5-DOF motions (again, full 6-DOF motion less roll rotation), between the light source and the detector. Images are produced for all possible poses of the follower UUV with respect to the leader UUV over a translation range ±0.3 m at 0.03 m increments and a rotation range of ±30° at 3° increments. A vector of the five main image parameters is extracted for each image. This reference dataset, which is a look-up table of vector identifiers, is used to calculate the pose of the instantaneous images. Instantaneous image vector identifiers are compared to vector identifiers in the aforementioned look-up table. Pose candidates based on the location of image pixel (row and column numbers) with the maximum intensity are extracted from the look-up table. The extracted pose candidates are then weighted with the weighting coefficients to form a cost function using:

$$P_i = c_1|Sk_x - Sk_{xi}| + c_2|Sk_y - Sk_{yi}| + c_3|SAM - SAM_i| \quad (4.7)$$

where $P_i$ is the cost function, $c_1$, $c_2$ and $c_3$ are the weighting coefficients that are determined by trial and error, $Sk_{xi}$, $Sk_{yi}$ and $SAM_i$ are the skewness among the row, skewness among the column and SAM angle for the instantaneous pose, i. The resulting pose is determined based on the pose candidate that results in the minimum cost function, $P_i$. The algorithm is evaluated based on the accuracy of the type of pose detection (i.e. relative translation and motion) between the leader and the follower vehicle and the amount of shift in translation and rotation. Pose detection algorithms using SAM approach were explained in more detail.

Calculation of the Image Moment Invariants

The third approach used for pose detection in this study utilizes the image moment invariants that are defined as the weighted sum of the intensity values of the array pixels, $1_{i,j}$ with respect to the location of the peak intensity, $P_{max} = (y_o, z_o)$ [93]-[94]. Image moment invariants can be defined as:

$$M_{pq} = \frac{1}{S} \sum_{i,j} (y_i - y_o)^p (z_j - z_o)^q 1_{i,j} \quad (4.8)$$

where $S = \Sigma_{i,j} 1_{i,j}$ and $y_i$, $z_j$ are the row and column coordinates for a given detector in the array, respectively. p and q denote the order of moments. Image moment invariants are calculated up to the second order (p=2, q=2) for maintaining a simple and efficient calculation of the pose detection, i.e. $M_{00}$, $M_{10}$, $M_{11}$, ... $M_{22}$. The location of the pixel with the maximum intensity, $P_{max}$, is calculated at a sub-pixel accuracy. The relative translational and rotational motions between the UUVs in this approach are distinguished based on moment invariant functions. The output of the image moment invariants algorithm for a specific pose is a 3×3 matrix where each element denotes information about the symmetry of the light intersected on the array. The pose detection algorithm utilizes this property of the image moment invariants approach in a calibration procedure to determine and quantify the pose.

UUV Modeling and Control

The UUV pose-based feedback control system is deemed as successful if the UUV in study is able to maintain relative pose to within an accuracy of ±0.1 m in translation (i.e. in each x, y and z-axes) and ±5° in rotation (yaw and pitch). These requirements are to accomplish docking operation of a UUV into a docking station. The PID and SMC are implemented separately on a simulated UUV system under both the regulation (static-dynamic) and tracking (dynamic-dynamic) scenarios.

UUV control in this study is restricted to be decoupled. That is, the UUV is allowed to be controlled in 1-DOF at a time, (i.e., either a single x, y, or z translation or pitch or yaw rotation). This is true for both the leader and the follower UUVs. The leader UUV is assumed to be controlled separately, say, with a user-controlled joystick (open-loop) whereas the follower UUV has PID and SMC implemented for autonomy.

For a dynamic-dynamic system under the assumption that the leader UUV has a known path a priori, the follower UUV can use information collected by the curved detector array as feedback to determine the leader UUV's relative pose $$\eta_f = \eta_r - \eta_d \quad (4.9)$$

where $\eta_f$ is the follower pose, m is the leader pose determined by the follower, and $\eta_d$ is the desired relative pose, incorporating desired relative distance and attitude, between the leader and the follower UUVs. The control problem in this case can be evaluated as a trajectory control problem as the leader is assumed to be remotely controlled to given waypoints while the follower generates its own time-varying trajectory from the leader motion. For a static-dynamic system, the problem can be considered as a set-point regulation problem.

Results

The image moments approach requires a calibration procedure in order to distinguish the motion type and quantify the degree of relative translational and rotational displacements. In the case of a single guiding light beam, the calibration procedure is only conducted for positive translation and rotation values because the image moment invariants for positive translation and rotational motion are symmetrical. (A sign difference exists only for negative motion.) For a 21×21 sized light sensor detector array, image outputs from the array simulator include translation, ranging from 0 to 0.18 m in 0.02 m increments in the y and z-axis direction and from 0° to 27° with 3° increments for pitch and yaw rotations. For a 5×5 sized array, the calibration range for translation motion is from 0 to 0.14 m in 0.02 m increments and from 0° to 27° with 3° increments for pitch and yaw rotations. In the x-axis direction, the calibration range between the leader and the follower vehicle is from 2 m to 8 m at 1 m increments. The limiting factor of the calibration range is the sub-pixel accuracy algorithm in both translational and rotational motion because this algorithm requires the intensity value of the neighbor pixel that is adjacent to the pixel with maximum intensity. Because of this limitation, the pixel with the maximum intensity cannot be located at a border of the array. The calibration procedure consists of two steps: 1) calibration for relative decoupled motion (i.e. the UUV being restricted to a single 1-DOF motion at a time) and 2) calibration to detect motion when the UUV is translated in y-axis and rotated in yaw.

Static-Dynamic System

The pose detection algorithm is first based on distinguishing the type of motion (i.e. translational from rotational). This is accomplished by evaluating numerical values of the image functions which provide a descriptive feature of a specific motion type, i.e. translational or rotational motion. After the type of motion is determined, the amount of translational or rotational displacement is quantified through an off-line calibration procedure to linearly estimate the amount of relative shift in both translation (x, y and z-axis directions) and rotation (pitch and yaw) between the leader and the follower vehicles with respect to detected light levels.

In the static-dynamic system algorithm, it is assumed that the relative motion between the fixed light source and the UUV consists of 5-DOF motion (all 6-DOF except roll). In addition, pitch is not considered when the UUV aligns itself with the external light source when the UUV is initially misaligned along 4 axes of translation and yaw. The detection and control strategy for the static-dynamic system is first based on quantifying the UUV z-axis motion and control to its desired state, $z_d$. The second step is to distinguish between y-axis translation and yaw motion. This second step is particularly complex as y-axis translation and yaw rotation both act on the same axis and can distort the detection algorithm and, therefore, degrade the accuracy of the results. The second calibration procedure is conducted to distinguish and quantify yaw rotation and y-axis translation when both motions are present.

In this section, two sets of results are presented. The first set of results shows the detection and control capability of the pose detection algorithms combined with SMC and PID controllers when there is only one axis of translation or rotation that is initially misaligned. For each DOF, the UUV is directed to a desired state. The second set of results consists of case studies in which all pose detection capabilities and models are utilized. In this case, 4 axes of translation/rotation are misaligned (x, y, z and yaw) and the UUV has four desired states to reach. This is also conducted introducing a constant external current (disturbance). The control loop for all the simulations are run at a rate of 10 Hz.

Single-DOF SMC, Motion with 21×21 Detector Array

Figure 4B:
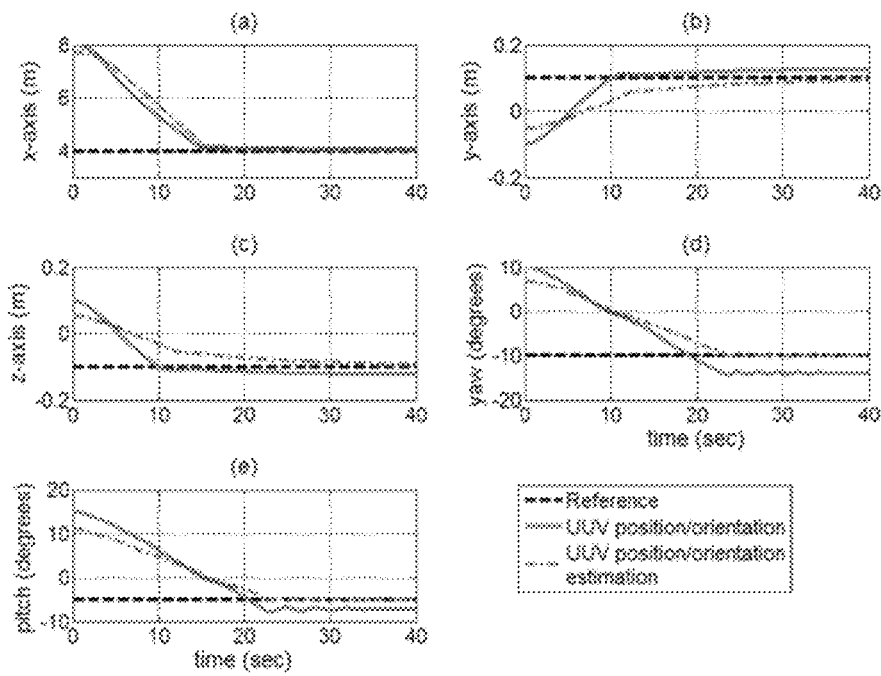
FIG. 4B illustrates independent DOF SMC results for a curved 21×21 array. (a) x-axis control (b) y-axis control (c) z-axis control (d) yaw control (e) pitch control.

In this scenario, a UUV is mounted with a curved detector array consisting of 21×21 photodetector elements. A single stationary light source placed underwater acts as a guiding beacon to position the UUV with respect to a given reference value. 1-DOF SMC control is established for each of the five axes (i.e. x, y, z, pitch and yaw) separately. It is assumed that there are no external disturbances in the environment. The simulation results in FIG. 4B show that with the pose detection algorithms and SMC, the UUV in study converges to the desired reference point for each DOF. In addition, Table 4.1 shows the results for decoupled translation and rotation, showing UUV initial conditions, reference (desired) position/orientation and final position/orientation. FIG. 4B shows independent DOF SMC results for a curved 21×21 array. (a) x-axis control (b) y-axis control (c) z-axis control (d) yaw control (e) pitch control.

TABLE 4.1

Initial, reference and final UUV positions and orientations for a 21 × 21 curved array for decoupled 5-DOF Control

| Initial position/ orientation | Reference position/ orientation | Final position/ orientation |
|---|---|---|
| $x_i$ = 8 m | $x_d$ = 4 m | $x_f$ = 4.02 m |
| $y_i$ = −0.1 m | $y_d$ = 0.1 m | $y_f$ = 0.09 m |
| $z_i$ = 0.1 m | $z_d$ = −0.1 m | $z_f$ = −0.09 m |
| $\psi_i$ = 10° | $\psi_d$ = −10° | $\psi_f$ = −10.05° |
| $\theta_i$ = 10° | $\theta_d$ = −5° | $\theta_f$ = −5.03° |

Single DOF SMC, Motion with 5×5 Detector Array

Figure 4C:
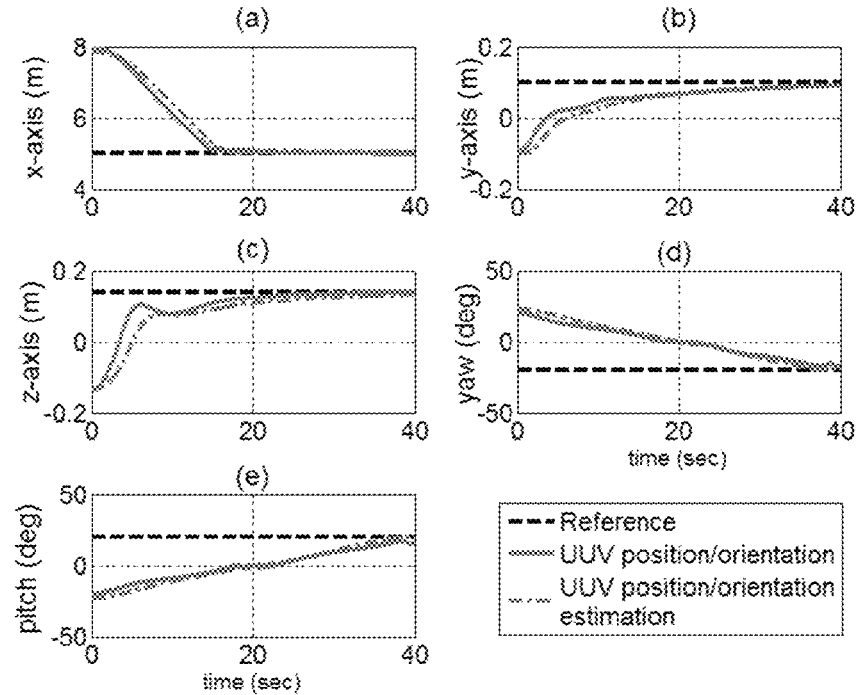
FIG. 4C shows independent DOF control results with SMC for a curved 5×5 array. (a) x-axis control (b) y-axis control (c) z-axis control (d) yaw control (e) pitch control.

It is shown that a 5×5 curved detector array was sufficient to distinguish between the translational and rotational displacements. In addition, the construction of a 5×5 array is more cost-efficient than the construction of a 21×21 array. Therefore, pose detection and control algorithms are also developed for a 5×5 array. SMC is implemented in the same way as applied in the case of the 21×21 array. The simulations are conducted without any external disturbance present. The pose detection algorithm and SMC work efficiently to dynamically position the UUV to the vicinity of the desired reference values (FIG. 4C and Table 4.2) especially in the translational directions. In both cases, i.e. a 21×21 and a 5×5 detector arrays, it is observed that small amplitude oscillations exist for yaw and pitch control. As it is shown that pose detection and SMC for a 5×5 array demonstrate satisfactory control performance and that a more costly option of a 21×21 array is not necessary, further simulations in this study are conducted solely with a 5×5 detector array. FIG. 4C shows independent DOF control results with SMC for a curved 5×5 array. (a) x-axis control (b) y-axis control (c) z-axis control (d) yaw control (e) pitch control.

TABLE 4.2

Initial, reference and final UUV positions and orientations for a 5 × 5 curved array for decoupled 5-DOF Control

| Initial position/ orientation | Reference position/ orientation | Final position/ orientation |
|---|---|---|
| $x_i$ = 8 m | $x_d$ = 5 m | $x_f$ = 4.99 m |
| $y_i$ = −0.1 m | $y_d$ = 0.1 m | $y_f$ = 0.09 m |
| $z_i$ = −0.14 m | $z_d$ = 0.14 m | $z_f$ = 0.14 m |
| $\psi_i$ = 20° | $\psi_d$ = −20° | $\psi_f$ = −17.7° |
| $\theta_i$ = −20° | $\theta_d$ = 20° | $\theta_f$ = 15.3 | x-Axis PID Control with a 5×5 Detector Array

Figure 4D:
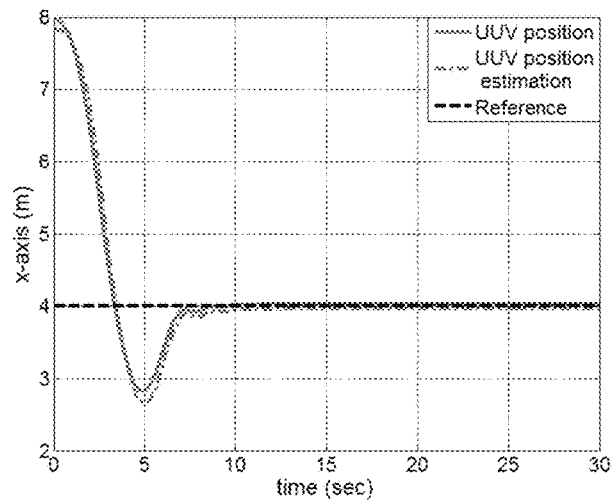
FIG. 4D shows a PID x-axis control for a 5×5 array.

In addition to the SMC to dynamically position a UUV to a desired distance and orientation, the effectiveness of a PID controller is also investigated. The PID controller is tested for the control of translation only in the x-axis direction and without any disturbances present. The selected PID controller gains are P=400, I=2 and D=300. The PID controller does, in fact, eventually control the UUV to the desired reference value (FIG. 4D). However, after a reasonable effort to tune control gains, excessive overshoot still remains, more specifically a 30% maximum percent overshoot. PID controller performance is acceptable for translational control about the x-axis, but a potential overshoot is not acceptable for y and z-axis translational control because it causes the UUV to lose its line of sight with the external light source. Therefore, it is concluded that PID control is considered unsuitable for this application. FIG. 4D shows a PID x-axis control for a 5×5 array.

Case Study: Dynamic Positioning with Multiple Concurrent Initial Pose Errors

After it is determined that a 5×5 array with the implementation of SMC is suitable for pose detection and control of a UUV, a dynamic positioning case study is conducted. In contrary to the cases described in the previous sections, the UUV is given 4-DOF "off-axis" initial conditions (i.e., concurrent non-zero errors in x, y, z and yaw). The goal is to dynamically position the UUV with respect to the fixed, single beam light source with a desired position and orientation. The control strategy in this case study is for the UUV to perform decoupled control actions, one DOF at a time, until the desired reference value is finally reached, where the decoupled control sequence is as follows: 1) z-axis control 2) yaw control 3) y-axis control 4) x-axis control. The initial, reference and final positions and orientations are listed in Table 4.3.

TABLE 4.3

Initial, reference and final UUV positions and orientations for a 5 × 5 curved array for decoupled 4-DOF control

| Initial position/ orientation | Reference position/ orientation | Final position/ orientation |
|---|---|---|
| $x_i$ = 8 m | $x_d$ = 4 m | $x_f$ = 4.12 m |
| $y_i$ = 0.14 m | $y_d$ = 0 m | $y_f$ = −0.01 m |
| $z_i$ = 0.14 m | $z_d$ = 0 m | $z_f$ = 0.02 m |
| $\psi_i$ = −20° | $\psi_d$ = 0° | $\psi_f$ = −0.1° |

Figure 4E:
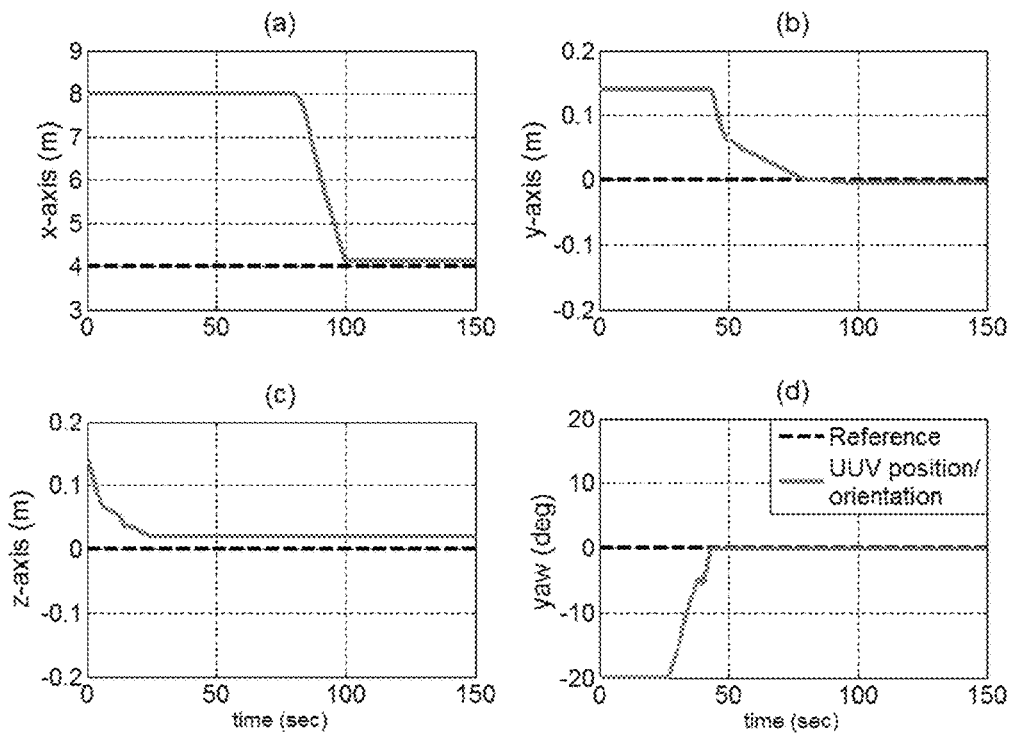
FIG. 4E illustrates a UUV docking case study using SMC for a 5×5 array. The UUV with four initial non-zero pose errors is commanded to position itself with respect to a fixed light source. (a) x-axis control (b) y-axis control c) yaw control d) z-axis control.

The results demonstrate that the UUV accomplishes the control task to within reasonable accuracy (FIG. 4E). There is an offset of 0.02 m for the z-axis. The calibration procedure for y and yaw detection is based on the case where the UUV z-axis coordinate is perfectly aligned with the corresponding z-axis coordinate of the external light source. Thus, the pose detection algorithm is robust enough to produce accurate estimates in the presence of relatively small steady-state errors. In the second step, yaw control is quite accurate with 0.1° error and then the control system switches to y-control mode, where it stops at t=80 s when a satisfactory y-axis position is reached. In the final step, the x-axis coordinate is controlled with a steady-state error of 0.12 m. It should be noted that after y-axis control stops and x-axis control begins, there is a slight change in the UUV y-axis coordinate. This is due to the steady-state error in yaw. FIG. 4E shows UUV docking case study using SMC for a 5×5 array. The UUV with four initial non-zero pose errors is commanded to position itself with respect to a fixed light source. (a) x-axis control (b) y-axis control c) yaw control d) z-axis control.

Figure 4F:
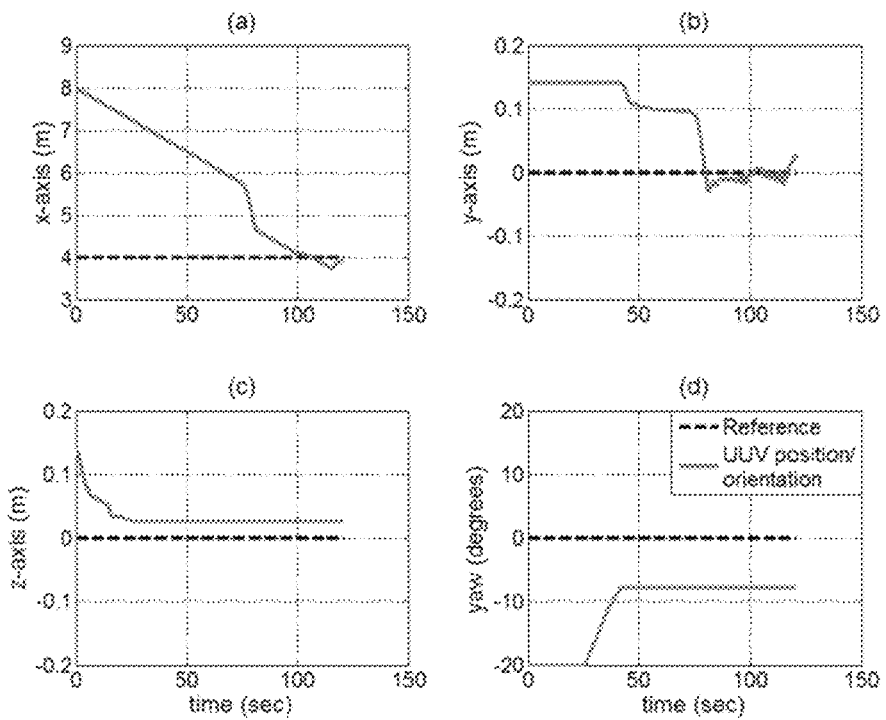
FIG. 4F illustrates a UUV docking case study using SMC for a 5×5 array with a current of −0.03 m/s in x-axis. (a) x-axis control (b) y-axis control c) yaw control d) z-axis control.

Case Study: Dynamic Positioning with Multiple Concurrent Initial Pose Errors in the Presence of Added Disturbances In this scenario, the UUV initial conditions and the references are kept the same as that in Table 4.3, but a constant current (external disturbance) of −0.03 m/s in the x-axis direction is introduced. It is observed from the results (FIG. 4F) that z-axis control is not significantly affected by the added current but does have a noted steady-state error. And, although yaw control is affected by the current, it stabilizes at 8°. Due to the yaw steady-state offset, when the UUV moves along its body-fixed coordinate x-axis, the UUV also moves in the Earth-fixed coordinate y-axis. This can be observed from t=7 s. to t=82 s. In this period, there is only x-axis control. Then, the controller switches to y-axis control and it attempts to regulate to the y-coordinate but does so with some chatter. As the UUV approaches to x-axis desired reference, the SMC switches between x and y-axis control to the end of the simulation. FIG. 4F shows a UUV docking case study using SMC for a 5×5 array with a current of −0.03 m/s in x-axis. (a) x-axis control (b) y-axis control c) yaw control d) z-axis control.

Dynamic-Dynamic System

In addition to the static-dynamic scenario in which the optical-based sensor system uses SMC to control a UUV with respect to a fixed light source, the capabilities of the dynamic-dynamic (tracking control) scenario is also investigated. In the dynamic-dynamic system, there are two moving UUVs, a leader UUV and a follower UUV. The leader UUV has a light source at its crest and is assumed to move independently, for example, via remote operation. The follower UUV processes the sampled light field coming from the leader UUV on the detector array and performs the appropriate control action autonomously in order to track the leader. In this scenario the leader and the follower UUV initial conditions, reference values and the final positions are given in Table 4.4.

TABLE 4.4

Initial, reference and final UUV positions and orientations for a 5 × 5 curved array for dynamic-dynamic control

| Initial Leader position | Reference position | Final Leader position | Final Follower position |
|---|---|---|---|
| $x_{il}$ = −8 m | $x_d$ = −8 m | $x_{fl}$ = −9.75 m | $x_{ff}$ = −1.5 m |
| $y_{il}$ = 0 m | $y_d$ = 0 m | $y_{fl}$ = 0.10 m | $y_{ff}$ = 0.14 m |
| $z_{il}$ = 0 m | $z_d$ = 0 m | $z_{fl}$ = 0.11 m | $z_{ff}$ = 0.14 m |

Figure 4G:
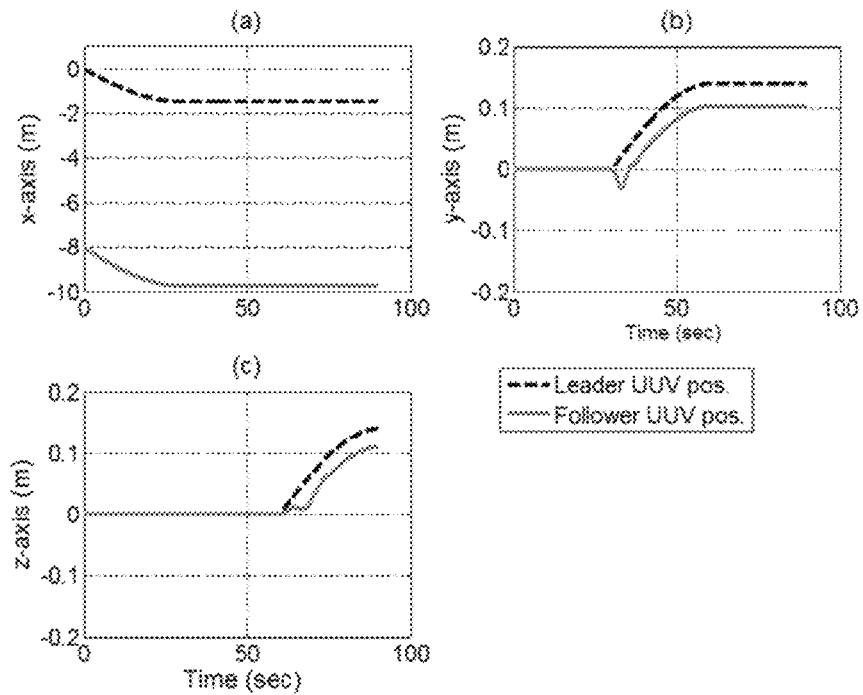
FIG. 4G shows the leader-follower case study in a dynamic-dynamic system with SMC for a 5×5 array. (a) x-axis control (b) y-axis control and (c) z-axis control.

Initial evaluation of yaw control in a dynamic-dynamic scenario (not shown here) reveals that relatively small deviations in yaw cause loss of line-of-sight between the UUVs. Therefore, yaw control in a dynamic-dynamic system is not pursued in this study. The controlled DOF between the UUVs are, instead, translation about all three coordinate axes. SMC is implemented for the control of a UUV mounted with a 5×5 detector array. In this simulated scenario, both the leader and follower UUV start with an 8 m offset in x-axis direction and no offset along the y and z-axis directions. The control goal for the follower UUV is to maintain these initial conditions when the leader UUV translates in x-y-z coordinate system. The results demonstrate that at the end of the scenario, the x-axis offset between the leader and the follower UUVs is maintained at a steady-state distance of 8.25 m, the y-axis offset at 0.04 m and the z-axis offset 0.03 m (FIG. 4G). The x-axis leader pose estimation during the time of flight is within reasonable accuracy and as a result, a smoother follower UUV trajectory is achieved. For z-axis control, initially, the leader UUV's z-axis coordinate is estimated to decrease while it actually increases. The pose detection algorithm then corrects its estimations and a more accurate control action is performed. A similar situation is observed in y-control where it is seen that the leader UUV is initially estimated to move in the reverse direction of its actual trajectory. Then, the detection algorithm corrects its estimations and more accurate control feedback and trajectory control are achieved. FIG. 4G shows the leader-follower case study in a dynamic-dynamic system with SMC for a 5×5 array. (a) x-axis control (b) y-axis control and (c) z-axis control.

Discussion

Simulation results of pose detection algorithms and SMC demonstrate that dynamic positioning of UUVs can be established with acceptable accuracy. The performance of the pose detection algorithms evaluated in this chapter (phase correlation and log polar transform, SAM, and image moment invariants) are compared based on their ability to provide fast, reliable and accurate pose estimates. The phase correlation and log-polar transform algorithm yield accurate results for cases when the motion is only translation. For rotational motion detection, it is not suitable as symmetric detected images of the external light source prevent accurate pose estimations. It should be stressed that roll angle is not detectable as there is a single light source with a Gaussian intensity profile. The results of SAM algorithm and its application on the control of a leader-follower UUV application for a planar array have been shown. SAM algorithm can yield successful results. However, the calibration procedure to provide pose outputs is extensive and a lengthy look-up table is needed to generate a pose output. Therefore, it may not respond to the system requirement of a fast processing algorithm. Image moment invariants approach is chosen due to the following reasons: Simple linear models exist for pose estimation, which leads to faster computational speeds and makes it suitable for real-time applications. In addition, less calibration time is required as its dependence on the look-up tables decreases. This results in less required computational effort in the implementation of the system. Furthermore, an accurate estimate of poses can be obtained with multiple concurrent non-zero pose errors. More specifically, x-axis pose estimation can be obtained when the UUV undergoes y and z-axis translations and yaw rotations. Alternatively, a procedure can be developed to distinguish and quantify concurrent y-axis translations and yaw motions.

SMC and PID controllers are evaluated in conjunction with the feedback obtained from the image moment invariants algorithm. The PID controller results in system overshoot. While overshoot can be tolerated in x-axis control, overshoot in the y and z-axis directions or in yaw is not desirable as it results in the UUV losing line of sight with the external light source. The SMC is selected as a first-order controller with a time-varying boundary layer and a saturation function (to minimize chatter). The controller is a SISO controller where the kinematic and dynamic cross-coupling terms are neglected in the UUV model. The uncertainties due to added mass and hydrodynamic forces are compensated in the control system. SMC requires position and velocity state information as sensor feedback. The position information can be obtained from pose detection algorithms. However, for the velocity signals, the derivative of the pose information is taken. In order to avoid data fluctuations, the Kalman filter is implemented for both position and velocity signals. SMC simulation results suggest that satisfactory positioning results can be obtained. Overshoot which is an important criterion in this study is not observed in SMC simulation results. The study of the effect of external disturbances such as current suggest that the control system can yield acceptable results (especially in x and y-axis directions) under a modest amount of constant current in x-axis (−0.03 m/s). However, the steady-state error in yaw increases and requires compensation for reasonable accuracy.

The effect of the detector array size on the dynamic positioning is investigated by developing pose detection algorithms for a 21×21 and 5×5 detector arrays. The simulation results conducted on a 5×5 array suggest that the developed algorithms yield satisfactory control results, so as to deem the use of a more costly 21×21 array unnecessary. The SMC controller is shown to be robust against modeling uncertainties and to modest amount of disturbances. However, when there are larger disturbance forces (especially in the y-z plane and/or when there is non-systematic background noise such as a sediment plume), the estimated pose may be misinterpreted and the UUV could lose line of sight with the external light source.

Conclusions

UUV pose detection and control algorithms are evaluated to dynamically position a UUV in scenarios of static-dynamic (regulation control with respect to a fixed external light source) and dynamic-dynamic (tracking control with respect to a moving UUV) control. Criteria for pose detection and control algorithms are: 1) processing time, 2) positional accuracy, and 3) dependence on environmental characteristics. Based on a previously developed simulator that calculates the interaction of light with respect to water conditions and hardware characteristics, an image is generated from the measurements on a hemispherical detector array.

Three pose detection algorithms (phase correlation and log-polar transform, SAM, and image moment invariants) are evaluated. It is determined from a series of simulations that the method of image moment invariants requires a modest amount of calibration and is the most suitable in terms of processing speed and positional accuracy. Utilizing image moments invariants algorithm, linear models are created to determine and quantify the type of motion to differentiate and estimate 3-DOF translational motion and pitch and yaw. Case studies are simulated for both static-dynamic and dynamic-dynamic systems.

PID control and SMC are also evaluated in terms of their response characteristics. According to simulation results, it is concluded that PID control is not suitable for this application as it causes a system overshoot which, in turn, causes UUV loss of line of sight with the target light source. The SMC does not result in overshoot and is implemented in a case study to demonstrate the UUV dynamic positioning performance when it is given initial conditions such that there are multiple concurrent non-zero pose errors. A dynamic-dynamic case study also suggests that a follower UUV can track a leader UUV under these conditions with reasonable accuracy.

The effect of detector array size on the pose detection algorithms is evaluated to explore their capabilities to generate pose feedback for UUV dynamic positioning. For this purpose, the performance results of a 21×21 and 5×5 detector array are compared under independent DOF control in all 5-DOF motion (x, y, z, yaw and pitch), demonstrating that a 5×5 detector array is sufficient to generate pose feedback from the sampled light field.

Experimental Pose Detection for UUV Control System Using an Optical Detector Array The capabilities of an optical detector array to determine the pose (x, y and z-axis) of a UUV based on optical feedback to be used in UUV docking applications are demonstrated in this chapter. The optical detector array consists of a 5×5 photodiode array that samples the intersected light field emitted from a single light source and forms an image. After a set of calibrations for pose geometry, it is possible to develop pose detection algorithms based on an image processing approach, specifically image moments invariants. Monte Carlo simulations were conducted to determine the system performance under environmental and hardware uncertainties such as diffuse attenuation coefficient, temperature variations and electronic noise. A previously developed simulator was used as a test bed to run the Monte Carlo simulations. The simulator takes the relative geometry between the light source and the detector and environmental and hardware characteristics as inputs. The performance evaluation for Monte Carlo simulations was based on the generated pose outputs with respect to changing environmental and hardware parameters for a number of samples, i.e. $N_S=2000$. Experimental results of this study show that the pose estimations in x, y and z-axis are accurate within 0.3 m, 0.1 m and 0.1 m, respectively. Monte Carlo simulation results verify that the experimental results are within the confidence interval bounds (95%) and the pose uncertainties associated with x, y and z-axis are 1.5 m, 1.3 m and 1 m.

Introduction

Unmanned Underwater Vehicles (UUVs) provide an operational platform for long periods of deployment on the order of hours and in depths that are too dangerous for divers. However, the time of operation of these systems is limited based on the hardware available in the platform, such as the power supply and data storage capacity. In order to extend the duration of the mission, the power supply needs to be replaced or recharged and data should be transferred from the UUV's internal storage unit to an external storage unit in order to clear space for additional data collection. A common approach to extend the UUV operations underwater is the use of docking stations which enable the UUVs to conduct data transfer and recharge the batteries.

Figure 5A:
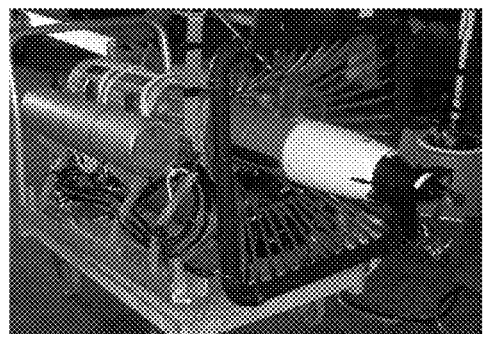
FIG. 5A shows a funnel type docking station.
Figure 5B:
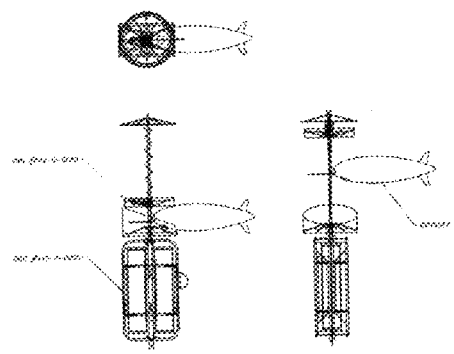
FIG. 5B shows pole docking mechanism architectures.

The two most common types of docking station architectures are: (1) funnel-docking station in which the UUV enter a tube for homing; and (2) pole-docking station, where the UUV connects to the station using a hook mechanism placed perpendicular to the seafloor. The structural design of the funnel docking station is similar to a cone (FIG. 5A). The funnel docking station is designed for a specific class of UUVs of the same length with the same physical connections for power. The funnel docking station allows a small tolerance of misalignment as the UUV navigates into the cone. Due to the cone shaped design, the UUV's entrance trajectory into the docking station is restricted. The data transfer in the funnel type system can be conducted through wired communication or wireless Ethernet radios. The power transfer is accomplished by having a charge pin inserted from the docking mechanism. The data and power transfer in these systems are reliable as there is a stable connection between two platforms when the vehicle goes into the funnel type docking station. However, the design of each funnel-docking station is unique for a specific class of UUVs. The architecture of the pole-docking station offers an omnidirectional docking approach (FIG. 5B). The UUV latches onto a vertical docking pole in order to dock. After the UUV is securely latched, a circular carriage that moves along the pole forces the UUV to mate with the inductive links for data and power transfer. The pole docking station does not restrict the UUV's entrance trajectory into the docking station. However, the tolerance of UUV speed and its distance from the pole is limited. If the UUV is not rigidly attached to the pole, power and data connections between the UUV and the docking station may not be successful. FIG. 5A shows a funnel type docking station and FIG. 5B shows pole docking mechanism architectures.

Recent studies have demonstrated the potential use of both acoustic and optical communication for docking. In these systems, acoustic communication is used in relatively longer ranges, 100 m, for navigating towards a docking station and video cameras are used in closer ranges, 8-10 m, to guide the vehicle into the docking station.

This chapter presents pose detection to be used in UUV control system using the feedback from the optical detector array. This approach can be utilized in UUV navigation e.g. into a docking station. The detection system developed is based on a static-dynamic system, i.e. one UUV is navigating to a docking station that is fixed in space. A single beacon light source at the docking station was used as a transmitting unit and a prototype detector array interface mounted on a dynamic UUV platform was used as a detector unit. The input data generated from the detector array are signature images of the light field that were used to calculate the relative pose between the UUV and the docking station and provide feedback to guide the UUV to the docking station. The pose detection performance during the navigation of the UUV platform is evaluated for both the funnel-docking and pole-docking stations. The system was designed based on the environmental characteristics of Portsmouth Harbor, N.H. As a proof-of-concept, a scaled model was experimentally tested at wave and tow tank at Jere E. Chase Ocean Engineering facilities.

The performance of the experimental platform, i.e. optical detector array, developed in this study was evaluated in terms of two criteria. The first criteria is accuracy of pose detections in three axes, x, y and z. This requirement is set based on a potential successful docking operation of a UUV especially for a funnel type docking station in which the entrance trajectory is restricted. The second criterion is the accurate UUV velocity estimations. This criterion is important when the UUV approaches to docking station especially for a pole docking station in which the UUV speed tolerance is limited rather than the entrance trajectory.

Pose Detection and Hardware

The pose detection algorithms were developed based on the image moment invariants approach which was previously described herein.

The hardware selection for this study is based on the results obtained from prior research that included evaluation of different detector array geometries based on their capability to generate a unique pose feedback to the UUV. The evaluation included curved and planar array designs with varying number of photo-detector elements. It was concluded that a 5×5 hemispherical curved array is sufficient to generate the desired pose feedback to the UUV. Analytical pose detection and control algorithms were developed for both static-dynamic and dynamic-dynamic system, i.e. one leader UUV guides the follower UUV. During the development of analytical pose detection algorithms for both systems, the detector array was assumed to be mounted on the bow of the UUV. In the static-dynamic system, a single light source that acted as a guiding beacon was mounted to the wall whereas in the dynamic-dynamic system, the light source was placed onto the crest of the leader UUV.

Figure 5C:
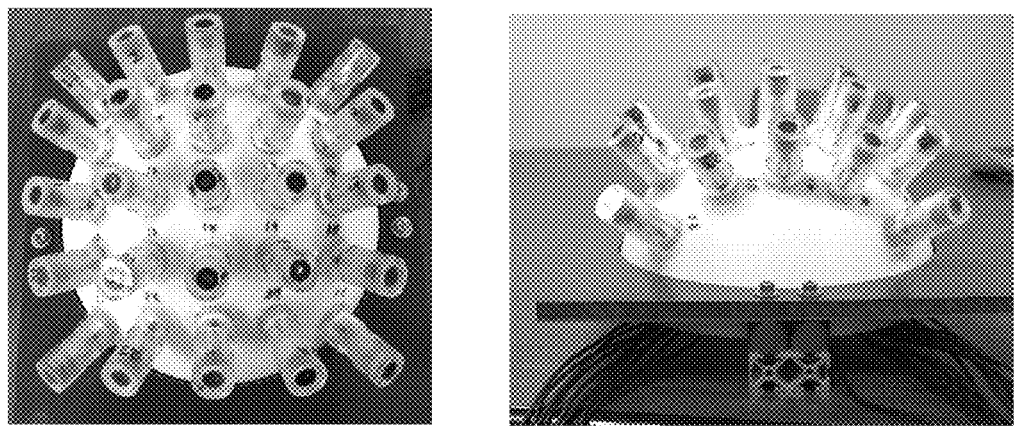
FIG. 5C shows the optical detector array used in the experiments. The photodiodes are facing different angles for an increased field-of-view. They are placed on an ABS hemisphere surface for precise hole locations. The acrylic hemisphere is used for waterproofing. Left—Top view. Right—Side view.

The detector module used in this research consists of a 5×5 photodiode array (Thorlabs SM05PD1A), two Analog to Digital (A/D) boards, an on-board computer (OBC), power supply and reverse-bias circuit elements. The photodiodes placed on a hemispherical surface with an outer diameter of 0.25 m (FIG. 5C). The hemispherical surface with 25 holes of 0.0254 m diameter was manufactured using a Rapid Prototyping Machine (Dimension SST 768) using ABS material. Each detector was placed in waterproof acrylic fixtures that were mounted onto the holes on the frame (photodetector facing outward) and aligned concentric to the hemisphere center. The length of each acrylic fixture outside the hemisphere is 0.064 m. Thus the effective radius of the detector array (radius of the hemisphere plus the length of the fixture) is 0.19 m. The photodiodes were connected to a reverse-bias circuit that provided dynamic output range from 0 to 5 V. SubMiniature version A (SMA) cables were used to connect the photodiode output to the reverse bias circuit. The light intensities collected by the photodiodes were sampled using two A/D boards on two different Arduino microcontroller platforms with 10-bit resolution (0-1023 bit range). The data sampled at the A/D boards were transmitted serially to the OBC running a 1 GHz ARM Cortex processor with Linux operating system. The OBC receives the collected light intensity data from the photodiodes and sends it to a Linux based PC. The photodiode intensity readings were sampled at 5 Hz. The power supply used in the reverse-bias circuit was provided by 5 V port on the Arduino platform. The reverse-bias circuit to increase the dynamic range of a single photodiode consists of a 47Ω resistor, a 1 MΩ resistor and a 0.47 μF capacitor. FIG. 5C shows photos of the optical detector array used in the experiments. The photodiodes are facing different angles for an increased field-of-view. They are placed on an ABS hemisphere surface for precise hole locations. The acrylic hemisphere is used for waterproofing.

Methodology

The empirical measurements in the study were conducted in the wave and tow tank at the UNH's Jere E. Chase Ocean Engineering facilities. The measurements were based on scaled model on Portsmouth Harbor between New Hampshire and Maine. A prospective location for a docking station is considered at the entrance to the harbor near UNH's Judd Gregg Marine Research Complex facilities in Fort Point, Newcastle, N.H. Portsmouth Harbor is a highly active port that includes a naval shipyard, fishing vessels, survey vessels and recreational vessels. As a result, the harbor is acoustically noisy and optical communication is the most viable method to navigate a UUV to a docking station. There are several factors that affect the reliability of the system performance. These factors can be listed as the diffuse attenuation coefficient, bathymetry and current information in the prospective implementation area. According to UNH Coastal Ocean Observation Center archive on Aug. 16, 2005, the average diffuse attenuation coefficient value in Portsmouth Harbor area was 0.2 $m^{-1}$. The depths in the harbor range up to 20 m in depth at the center of the navigational channel with a current speed range of 0.1-0.9 m/s at around 12 m depth at Fort Point.

Figure 5D:
FIG. 5D shows the Wave and Tow tank at the UNH Ocean Engineering facilities. The Tow Tank is cable driven and computer controlled with 1 mm precision along x-axis. Left—detector array mounted on the dynamic platform on the Tow-Tank. Right—400 W light beacon used as a mock-up docking station.

The depth of the wave and tow tank is 2.44 m with relatively clear water conditions (diffuse attenuation coefficient of 0.09 $m^{-1}$). The tank is outfitted with a cable-driven tow carriage with actuation that extends through the length of the tank that can move up to 2.0 m/s. A single light source was evaluated as potential guiding beacon for the docking station: 400 W metal halide light with ballast. This mock-up docking station is placed onto the wall of the wave and tow tank (FIG. 5D). The detector array was mounted on an aluminum frame on the wave and tow tank. For pose calibration, the distance between the light source and the detector array was measured and the x-axis offset was controlled with the actuating mechanism. FIG. 5D shows the wave and tow tank at the UNH Ocean Engineering facilities. The tow tank is cable driven and computer controlled with 1 mm precision along x-axis. Left—detector array mounted on the dynamic platform on the Tow-Tank. Right—400 W light beacon used as a mock-up docking station.

Calibration Procedure

Two types of calibration procedures were conducted for this study: 1) Calibration for photodiodes: This step includes a) Output consistency of the photodiodes to be used in the optical detector array when they are exposed to the same light field conditions. b) Photodiode responses to the potential temperature variations. c) The potential noise level and the cross-talk of the system. 2) Calibration for pose estimation in water in wave and tow tank: This step consists of the calibration experiments which in turn is to be used in the development of pose detection and control algorithms.

Figure 5E:
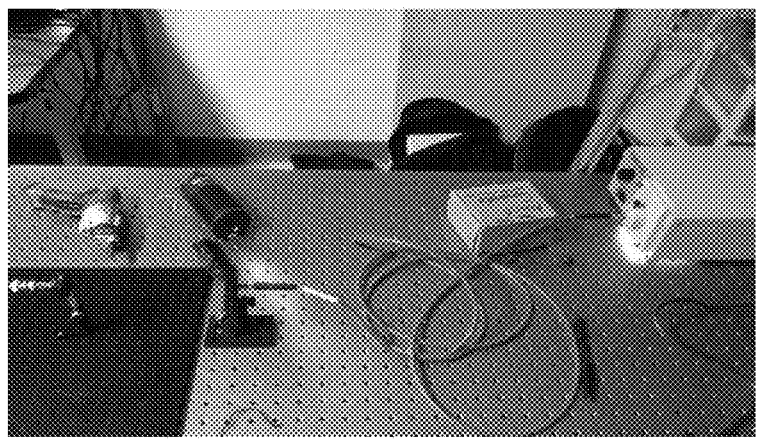
FIG. 5E shows a Photodiode Calibration Procedure. 25 photodiodes were tested at a time in order to observe their voltage range under same conditions.

In the first calibration procedure, in order to check the consistency of the photodiode outputs, a single photodiode, i.e. photodiode under test, was mounted to a threaded cage plate (Thorlabs SM05). Photodiode and cage plate setup was stabilized at a distance of 0.18 m away from a halogen light source (PL-900 Fiber-Lite). The output from the photodiode under test was connected to an Oscilloscope (Tektronix DPO 3054). The data was collected for 2 minutes and the average voltage was recorded. This procedure was repeated for all of the photodiodes on the array, i.e. 25 photodiodes (FIG. 5E). FIG. 5E shows the Photodiode Calibration Procedure. 25 photodiodes were tested at a time in order to observe their output voltage range under same conditions.

Figure 5F:
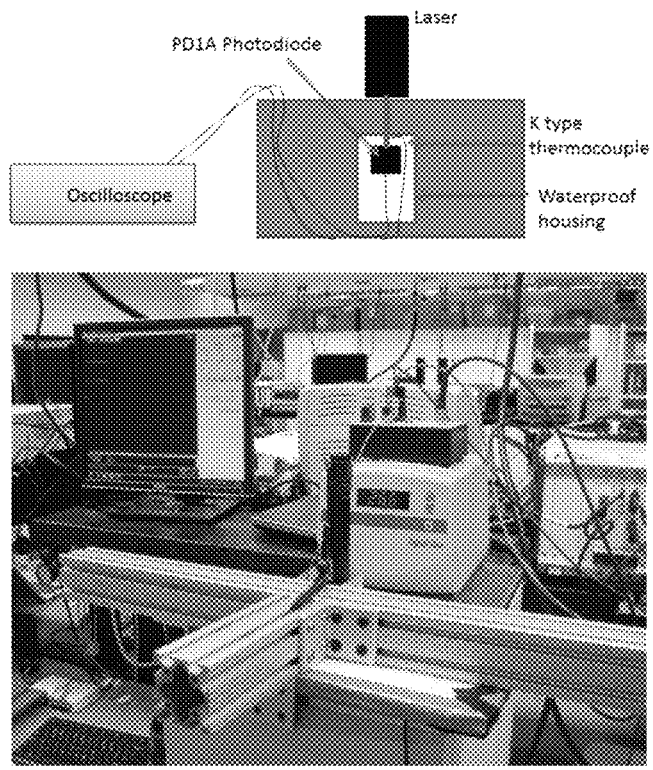
FIG. 5F shows a diagram for temperature calibration and an experimental setup for photodiode response to temperature changes. The diagram for temperature calibration is shown at the top of the Figure. A thermocouple was placed inside the waterproof housing for temperature monitoring of the photodiode. The experimental setup for photodiode response to the temperature changes is shown at the bottom of the Figures.

A separate calibration procedure was conducted to quantify SM05PD1A response to the potential temperature changes in water. SM05PD1A placed in an acrylic waterproof housing was submerged into a digitally controlled refrigerated bath/circulator (NESLAB RTE-111). In this procedure, the water bath was used to change the surrounding water temperature. The temperature of the water bath was changed from 20° C. to 70° C. at 10° C. increments. 20° C. is approximately the operating temperature at the wave and tow tank. A green laser at 532 nm wavelength (Z-Bolt SCUBA underwater dive laser) with the power output of 4 mW illuminated the photodiode. A k-type thermocouple was used to measure the temperature of the photodiode and fixture. At each temperature, the system was allowed to come to thermal steady state before the voltage output of the photodiode was measured. The output of SM05PD1A was connected to an oscilloscope (National Instrument PXI 5142) and the responses for varying temperatures were recorded (FIG. 5F). FIG. 5F shows a diagram for temperature calibration (top) and an experimental setup for photodiode response to temperature changes (bottom). In the disclosed experimental procedures a thermocouple was placed inside the waterproof housing for temperature monitoring of the photodiode.

Photodiode response is also observed for any potential noise and electronic cross-talk in the data acquisition system. In order to test these effects, all of the photodiodes were mounted on the curved detector array. In a dark environment, one photodiode was illuminated at a time with a light source using a black plastic tube between the light source and the detector. The remaining 24 photodiodes were exposed to the ambient light. The response of each 25 photodiode was observed for any potential cross-talk that can occur during the transmission of the signals with 3.3 m SMA cables. Potential noise sources in the hardware were explained in more detail.

The final calibration procedure, i.e. pose calibration procedure, was conducted to detect and quantify the pose to be used as the feedback signal in the control system. The DOF of interest for the UUV motion at the calibration stage are translations along x, y and z-axis. The calibration procedure was conducted using the optical detector array. Optical detector array was placed in the tow carriage in the wave and tow tank. The center of the light source was submerged 1 m deep in the water column. The calibration procedure for x-axis was conducted using the computer controlled actuation mechanism in the wave and tow tank. In x-axis, optical detector array was brought from 4.5 m to 8.5 m at 1 m increments. For y and z-axes, aluminum 80/20 frames were used to quantify the amount of offset and bring the optical detector array to the specified location. The calibration procedure for y-axis was conducted from −0.6 m to 0.6 m at 0.3 m increments. For z-axis, the calibration procedure was conducted starting at 1 m deep in the water column to 1.8 m depth at 0.2 m increments. Thus, at each x-axis position, 25 different images (beam patterns) were collected (125 images in total calibration scheme). The photodiode intensity data collected during the calibration procedure were analyzed offline in order to develop algorithms that convert the light input into pose information.

Performance Evaluation

The performance of the system was evaluated in terms of two criteria. 1) Positioning accuracy of the UUV platform with respect to the light source for both in steady-state and dynamic cases. 2) Velocity estimation accuracy during the navigation.

For the first criterion, the UUV platform, which is the optical detector array mounted on the actuating tow tank, was set in the water column at a pre-determined offset away from the light source. Then, with a specified acceleration and velocity in the tow tank controller, the UUV platform was commanded to go to a final position. In the dynamic tests, the goal is to detect the location of the center of the light source within 0.5 m for x-axis and within 0.2 m for y and z-axis when the UUV platform is both stationary and dynamic. This is a requirement for both locating the target, i.e. the docking station and for a successful docking operation. The tolerances for y and z-axis are tighter than the error tolerance in x-axis as the UUV requires a certain accuracy in y and z-axis to enter into the docking station. Two sets of experiments were conducted in order to verify the system performance. The first experiment consists of the case when the UUV platform and the light source are aligned in y and z-axis with an offset of 8.5 m in x-axis. The second experiment is conducted for the case when there are offsets of 0.6 m in y-axis and 0.8 m in z-axis. These offsets were chosen as the maximum possible offset specified by the calibration range in order to evaluate the system performance in its most limiting conditions.

For the second criterion, during the motion of the UUV platform, it is also important to estimate the velocity relative to the light source. Based on the velocity feedback obtained from the optical detector array, the UUV control system can control its speed during its navigation for a smoother entrance into the pole docking station. The velocity estimation performance of the UUV platform was evaluated during the dynamic experiments that were conducted for pose estimations. The system was evaluated to yield reliable estimations if the velocity is within 0.1 m/s of the reference velocity specified during the platform motion.

Stochastic Assessment of Pose Uncertainty

In addition to the empirical performance evaluation, an accuracy assessment of the pose detection algorithms was developed using Monte Carlo analysis. The accuracy assessment is used to predict the uncertainty in the final pose based on the optical feedback. All the first-order and second-order parameters contributing to the pose estimation were identified. These parameters included from environmental characteristics such as diffuse attenuation coefficient and temperature variation in the water column to the detector array and processor hardware noise. By using a random distribution for a larger number of samples (e.g. $N_s=2000$) for these parameters, the total propagation uncertainty (TPU) can be obtained.

Figure 5G:
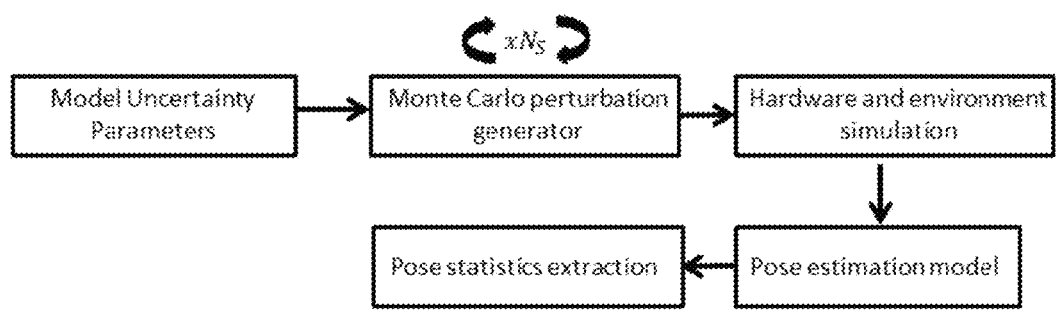
FIG. 5G is a Monte Carlo flow diagram for the pose statistics. Pre-determined model uncertainty parameters were integrated into the hardware and environment model to estimate the total uncertainty propagation in the pose detection algorithms.

The parameters that contribute to the forming of the beam pattern on the optical detector array mainly depend on the environmental conditions. More specifically, diffuse attenuation coefficient, i.e. a measure of turbidity in the water, and the temperature variation in the medium contributing to environmental conditions. The scattering of light in the water column is not taken into account in this study. The uncertainties relating to diffuse attenuation coefficient and the water temperature variations were modeled as uncorrelated Gaussian random variables. The uncertainty associated with the hardware characteristics was modeled as unipolar random values drawn from standard uniform distribution. These variables were input to the developed simulator which generates an image on the specified number of photodiodes based on 1) the geometry between the light source and the detector 2) the environmental characteristics of the medium such as turbidity and the temperature, and 3) hardware characteristics such as electronic noise and light source intensity profile and distribution, etc. Monte Carlo simulation scheme is shown in FIG. 5G. FIG. 5G is a Monte Carlo flow diagram for the pose statistics. Pre-determined model uncertainty parameters were integrated into the hardware and environment model to estimate the total uncertainty propagation in the pose detection algorithms.

The standard deviation of the hardware noise was determined during the calibration process and it was deduced that the standard deviation of the noise did not exceed 1% of the maximum photodiode intensity. Uncertainty parameters used in Monte Carlo simulations are given in Table 5.1

TABLE 5

Uncertainty parameters for Monte Carlo simulations

| Parameter | Standard deviation |
| --- | --- |
| Diffuse attenuation coefficient | $0.015 \frac{1}{m}$ |
| Temperature variation | 3° C. |
| Hardware noise | 2 orders of magnitude less than the maximum intensity on a photodiode |

Results

Calibration Results

The output signals from the photodiodes when the emitted light field intersects with the detector array are to be used in pose detection and control algorithms. Therefore, the consistency of the photodiode readings is vital and need to be characterized. In order to observe the photodiode response, all of the photodiodes were set at the same distance, 0.18 m, from the halogen light source (PL-900 Fiber-Lite). The calibration results showed that the photodiode readings were in the range of 291-300 mV with the mean value of 297.4 mV and the standard deviation of 2.41 mV. This result shows that the photodiode measurements at the same experimental conditions are reasonably close to each other without much variation. Although the mean voltage variation for photodiode measurements is not significant, it should be taken into account in the pose detection algorithms.

In order to determine the temperature dependence of SM05PD1A in water, its response to the temperature variation was characterized for a specific light source, i.e. Z-Bolt SCUBA underwater dive laser operating at wavelength of 532 nm. For the calibration procedure, the temperature was varied from 20° C. to 70° C. at 10° C. increments. It was observed from the experiment that the voltage output from SM05PD1A decreases as the temperature increases. During the experiments, it was noted that at 70° C., the steam build-up in the water bath affected the amount of light incident on the photodiode. Therefore, this data point was evaluated as an outlier. By applying a linear fit line to the rest of the data points, temperature sensitivity was found to be 2 mV/° C. The equation for the linear fit is $$V_o(T) = -2*T + 576 \tag{5.1}$$

Here $V_o(T)$ is the measured temperature in terms of voltage and T is the temperature in ° C. Based on the surrounding temperature in the environment, the voltage reading can be adjusted and the effect of the varying temperatures can be integrated in the pose detection and control algorithms.

After the calibrations for photodiode response range and photodiode response characteristics for varying temperatures were conducted, the system was investigated for noise and cross-talk that can be caused by the signal transmission in the SMA cables or in their connection to the reverse-bias circuitry. It was observed from the data that when there was no incident light on the other photodiodes, the noise level in the system contributed by the dark current, shot noise, background noise, quantification errors, cable transmission losses (including the 3.3 m SMA cables from the photodiodes to the reverse-bias circuitry and the serial communication losses) were in the range of 1 mV. Thus, it was deduced that the cable and circuit connection cross-talk in the system is not significant.

Underwater calibration procedure was conducted in order to develop algorithms to determine the pose and the velocity during UUV platform navigation. At each x-axis position, 25 images were sampled at different locations (5 different measurements at y-axis ranging from −0.6 m to 0.6 m at 0.3 m increments and 5 different measurements at z-axis ranging from 0 m to 0.8 m at 0.2 m increments). The total number of images taken for the pose estimation calibration is therefore 125. In order to observe the variation in the photodiode readings, 200 measurements were taken at each 125 locations. The measurements were averaged and the standard deviations of the readings were recorded. It was found that for the total x-axis calibration range, the variation in the photodiode readings was around 1% of the maximum photodiode intensity.

Performance Evaluation Results

The success of the optical detector array depends on its pose and velocity estimates when the UUV platform is both stationary and approaching to the light source. There are several identifiers that can be used to estimate the pose. For the x-axis pose estimation, the pose detection algorithm relies on the intensity of the middle photodiode. Based on the prior calibration experiments, an exponential fit was applied to the intensity readings on the middle photodiode taken at x=4.5 m to x=8.5 m at 1 m increments the center of the light source was aligned with the middle photodiode. For the estimation of y and z-axis offsets with respect to the light source, the algorithm relies on the image moments invariants calculations. For each pose, the image moments invariants algorithm yields a 3×3 matrix which indicates symmetry information of the sampled light field. The pose detection algorithm developed in this study utilizes matrix elements obtained from the 3×3 matrix for y and z-axis and fits linear models to estimate the pose in the corresponding axes. Because, in some examples, the x-axis estimation solely relies on the middle photodiode intensity, the estimates can be inaccurate when the relative offset between the light source and the middle photodiode increases. Thus, the pose estimation in x-axis is corrected based on the y and z-axis pose estimates. The velocity estimation in x-axis is calculated by taking the derivative of the initial x-axis pose estimates.

In order to validate the system performance for both stationary and dynamic cases, two types of experiments were conducted: 1) The center of the light source and the center of the UUV platform is aligned. 2) The center of the light source and the UUV platform is at the maximum offset (i.e. at the maximum limits of the calibration scheme). In both of these cases, the UUV platform is given an initial position of 8.5 m and a final position of 4.5 m with given a velocity of 0.5 m/s and acceleration/deceleration values of 0.2 m/s$^2$.

Case 1: The Light Source and the UUV Platform is Aligned

Figure 5H:
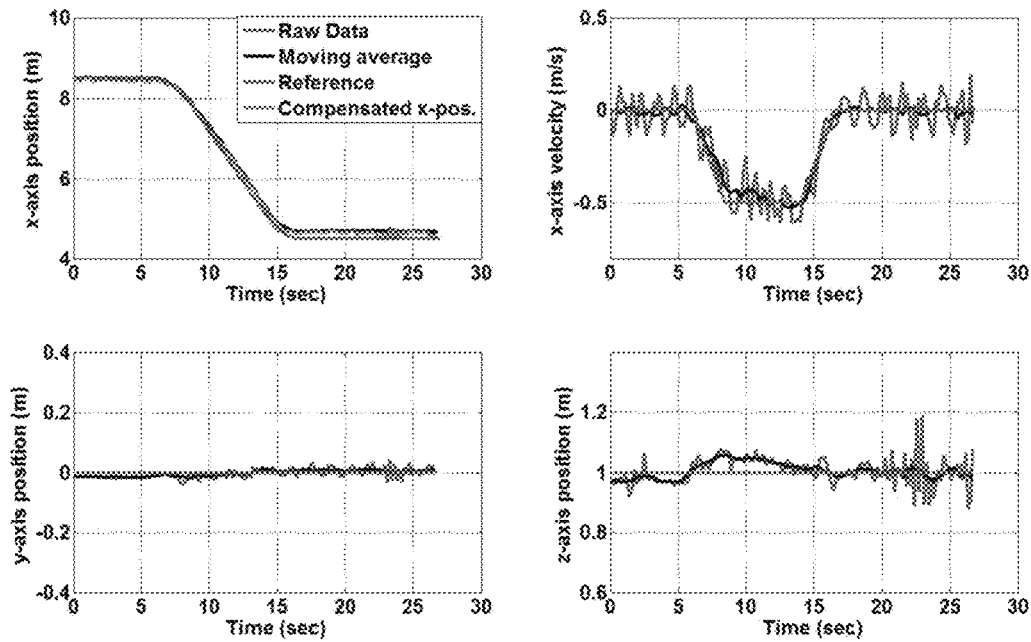
FIG. 5H shows Experimental Case 1: Top left: Reference position, raw x-axis pose estimate, corrected x-axis pose estimates, and the moving average window result. Top right: Velocity reference, raw velocity estimates and moving average window of size 10 applied to the raw velocity estimates. Bottom left: y-axis pose estimate and the applied moving average window of size 10 during the motion. Bottom right: z-axis pose estimate and the applied moving average of size 10 during the motion.

In this case, the UUV platform is stationary at the beginning of the experiment at x=8.5 m for 5.5 s. Then, the tow tank is commanded to go to 4.5 m (FIG. 5H). The offset of the UUV platform in y and z-axis are zero with respect to the light source.

FIG. 5H shows Experimental Case 1: Top left: Reference position, raw x-axis pose estimate, corrected x-axis pose estimates, and the moving average window result. Top right: Velocity reference, raw velocity estimates and moving average window of size 10 applied to the raw velocity estimates. Bottom left: y-axis pose estimate and the applied moving average window of size 10 during the motion. Bottom right: z-axis pose estimate and the applied moving average of size 10 during the motion.

The results for the first experimental case show that x-axis pose estimate is within 0.3 m accuracy at all times during both when the platform is stationary and dynamic. The corrected and uncorrected pose estimates are very similar in this case as the estimations in y and z-axis poses are not off from the reference pose significantly. Because the velocity estimates are obtained by taking the derivative of the x-axis pose estimate, the velocity signal is prone to noise. However, by applying a moving average window of size 10, it is observed that the estimated velocity trend follows the reference velocity within a reasonable accuracy, less than 0.1 m/s. For y-axis pose, initially, when the platform is stationary at x=8.5 m, there is an estimation error of around 0.18 m. The error in the corrected x-axis estimation is higher when the platform is stationary due to the estimation errors in y-axis during the same period. After the platform starts moving, the estimation error reduces significantly to 0.04 m. The z-axis estimation is more accurate when the UUV platform is stationary with the maximum estimation error of 0.05 m. When the platform starts moving, the error increases to 0.08 m.

Case 2: The Light Source and the UUV Platform is at Maximum Offset

Figure 5I:
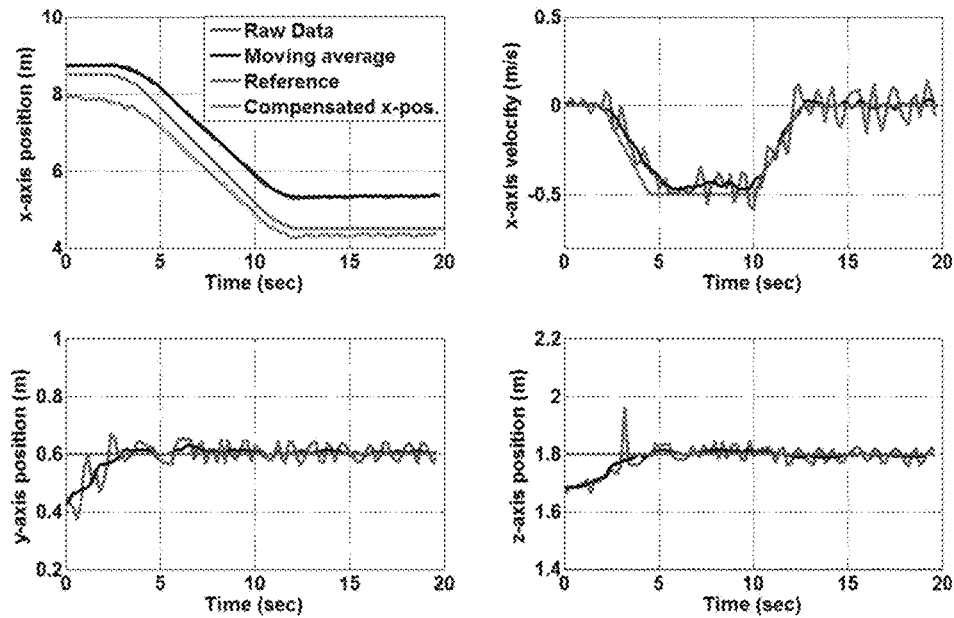
FIG. 5I shows Experimental Case 2: Top left: Reference position, raw x-axis pose estimate, corrected x-axis pose estimates, and the moving average window of size 10 result. Top right: Velocity reference, raw velocity estimates and moving average window of size 10 applied to the raw velocity estimates. Bottom left: y-axis pose estimate and the applied moving average window of size 10 during the motion. Bottom right: z-axis pose estimate and the applied moving average of size 10 during the motion.

The second experimental case is identical with the first experimental case with the difference of y and z-axis offsets (FIG. 5I). In this experiment, y-axis offset is set to 0.6 m and z-axis offset is set to 0.8 m lower than the light source (1.8 m below the water surface). The UUV platform is commanded to go to final x-axis position of 4.5 m from its initial x-axis position of 8.5 m away from the light source at 2.5 s.

FIG. 5I shows Experimental Case 2: Top left: Reference position, raw x-axis pose estimate, corrected x-axis pose estimates, and the moving average window of size 10 result. Top right: Velocity reference, raw velocity estimates and moving average window of size 10 applied to the raw velocity estimates. Bottom left: y-axis pose estimate and the applied moving average window of size 10 during the motion. Bottom right: z-axis pose estimate and the applied moving average of size 10 during the motion.

For the x-axis pose estimation, both corrected and uncorrected estimations have offsets in the beginning of the motion when the platform is stationary (uncorrected estimations have 0.25 m and corrected estimations have 0.5 m offset). As the platform starts moving and finally comes to a stop at 4.5 m, the corrected pose estimations yield more accurate results than the uncorrected estimations, with 0.05 m error in corrected estimation and 0.8 m error in uncorrected estimation. Thus, it was deduced that the corrected estimations for x-axis should be taken into account as the feedback signal in the control algorithms. Similar to the first experimental case, the x-axis velocity estimations are noisy due to the derivative operation. However, applying moving average reveals that the trend of the velocity estimation follows the reference velocity. Pose estimations in y-axis starts with 0.2 m error when the platform is at steady-state conditions at 8.5 m. When the platform moves towards the light source, the y-axis pose estimation error reduces and stays within 0.1 m of the actual value. Although the pose estimation pattern for y-axis fluctuates, the moving average result shows that the accuracy of the estimations is within 0.1 m. Estimations for z-axis also start with 0.2 m error. It approaches to 0.1 m as the platform moves closer to the light source. The experimental results verify that the optical detector array yields pose estimations within the specified error values for a successful docking operation.

Stochastic Model Results

In order to predict the performance of the pose detection algorithms under varying environmental and hardware conditions, such as in Portsmouth Harbor, N.H., a stochastic approach, such as Monte Carlo simulations, was taken. The goal of the Monte Carlo simulations is to evaluate the system performance when there is uncertainty in the environmental conditions (diffuse attenuation coefficient and temperature variations) and hardware characteristics. The measurements of these parameters are not always available or require extensive experimental work to obtain. The uncertainties in the environment and hardware affect the reliability of the light intensity measurements and thus the pose output for each axis. Therefore, Monte Carlo simulations were conducted to evaluate the system performance under changing parameters.

Figure 5J:
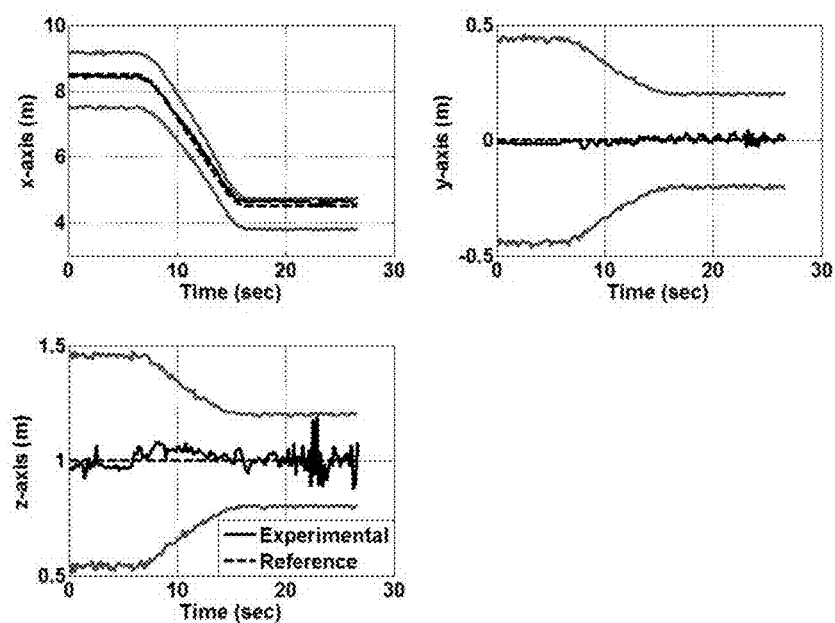
FIG. 5J illustrates an experimental pose with the Monte Carlo generated CI bounds (95%). The standard deviation of the hardware noise is set to 1% intensity of the photodiode with the maximum intensity.

Two sets of Monte Carlo simulations were conducted in this study. The first simulation compares the experimental pose estimations to the model generated pose estimations. The simulations were conducted to evaluate the second experimental case. Here, under the same detector trajectory, i.e. starting from x=8.5 m to x=4.5 m, the model generated nominal poses were calculated by changing the diffuse attenuation coefficient, temperature and hardware noise with sample size of, $N_S$=2000. The experimental pose, reference pose, upper and lower CI bounds (95%) for x, y and z-axes are shown in FIG. 5J, respectively. FIG. 5J shows an experimental pose with the Monte Carlo generated CI bounds (95%). The standard deviation of the hardware noise is set to 1% intensity of the photodiode with the maximum intensity.

The experimental pose estimations by the pose detection algorithm stay within the Monte Carlo generated CI bounds (95%) for all axes. The maximum observed uncertainty for x-axis is around 1.5 m while it is 1.3 m and 1 m for y and z-axis respectively. The bounds for x-axis estimations do not exhibit much variation during the course of trajectory. However, for y-axis, the uncertainty decreases until t=6.8 sec. and then starts to increase as the detector approaches to its final position. For z-axis, the uncertainty has a decreasing trend after the motion starts and as the optical detector array gets closer to the light source it converges to a constant value.

Figure 5K:
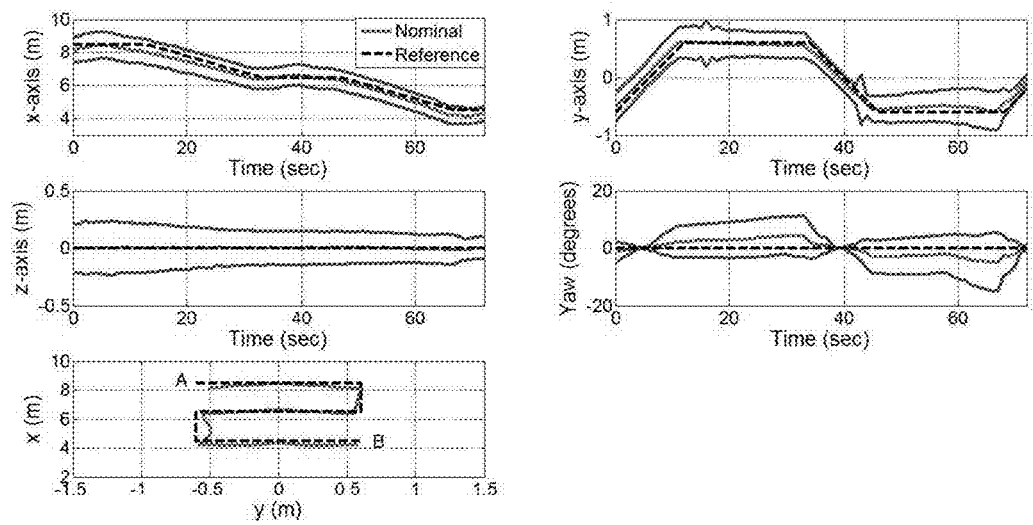
FIG. 5K shows Monte Carlo Simulation results with 95% CI bounds when the conceptual UUV navigates a zig-zag trajectory in-plane. The standard deviation of hardware noise is set to 0.5% intensity of the photodiode with the maximum intensity. Top-left: Nominal x-axis pose estimations. Top-right: y-axis pose estimation. Middle-left: z-axis pose estimation. Middle-right: Yaw pose estimation. Bottom: UUV reference navigation in the x-y plane and the nominal estimation.

The second Monte Carlo simulation scenario was conducted when a conceptual UUV navigates in xy-plane, with a predefined trajectory from point A to point B (FIG. 5K). The light source is assumed to be at x=0, y=0. Because the UUV navigates in xy-plane, it is likely that in the pose detection algorithms, the y-axis pose can be misinterpreted as yaw. Thus, the capability of the detection algorithm to distinguish and quantify y-axis and yaw was also evaluated in this scenario. The pitch angle was not taken into account in this study as the UUV is assumed to be built stable in pitch. FIG. 5K shows Monte Carlo Simulation results with 95% CI bounds when the conceptual UUV navigates a zig-zag trajectory in xy-plane. The standard deviation of hardware noise is set to 0.5% intensity of the photodiode with the maximum intensity. Top-left: Nominal x-axis pose estimations. Top-right: y-axis pose estimation. Middle-left: z-axis pose estimation. Middle-right: Yaw pose estimation. Bottom: UUV reference navigation in the xy-plane and the nominal estimation.

The error between the reference motion and the model generated nominal pose estimations for x and y-axes were within the specified tolerance limits at all times during the navigation. The maximum observed uncertainties in the x, y and z-axis are 1.5 m, 0.8 m and 0.48 m, respectively. During y-axis translation, the CI bounds get narrower than the CI bounds when the UUV does not move in y-axis. However, when the UUV undergoes translation in y-axis, the motion can be interpreted as yaw. However, the quantified value of this cross-talk is less than 5°. In the yaw rotation plots, in three regions namely around t=4.5 s, t=39 s and t=71 s the CI bounds for yaw, decrease significantly. At these locations, the pose detection algorithms can distinguish y-axis motion from yaw rotation efficiently. The Monte Carlo simulation results for the two cases suggest that the nominal pose estimations follow the reference trajectory, with a small yaw angle detection of less than 5°.

Discussion

The results confirm that the hardware and detection system of the detector array can be applied in static-dynamic system applications, e.g. for both funnel-docking and pole-docking stations. Evaluation of the feedback signal from the experimental results showed that the current design can estimate the translational pose up to 0.3 m in x-axis, 0.1 m in y and z-axis. These results suggest that the proposed system has a strong potential to be used in both types of UUV to docking station applications that is planned to be implemented in Portsmouth Harbor, N.H.

The experimental y and z-axis pose outputs from the optical detector array exhibit a zig-zag behavior at times, in addition, there are offsets (bias) from the reference geometry. One potential contributor to these phenomena is the vibration associated with the tow carriage during the motion. The vibration can cause the crabbing behavior and affect the photodiode intensity results. The second potential contributor is the drag force that the optical detector array experiences during the motion which causes differences between the calibration measurements and the test case measurements. These two contributors should be measured to compensate for the effects of these in the detection system. The third potential contributor is the models that were developed to estimate the pose using the image moment invariants algorithm matrix elements. The model generated uncertainty was blended in the TPU at the end the Monte Carlo simulations. A more detailed study analyzing the effect of the uncertainty of these models into the overall system should be further investigated. The velocity of the UUV platform can be estimated within 0.1 m/s of the actual velocity. However, because the velocity estimation relies on the estimated pose, the signal is prone to noise. Thus, in order to utilize the estimated velocity signal in the UUV control system as a feedback signal, it should be filtered to have a smoother velocity reference. This is important in UUV control systems perspective.

Hardware improvements such as using a higher resolution A/D boards and operation in clearer waters can improve the pose detection results. From the architectural perspective, it is possible to design a larger or smaller detector array that can fit to a variety of UUV classes (both for Autonomous Underwater Vehicles (AUVs) or Remotely Operated Vehicles (ROVs)) for a variety of pose detection applications. The major design features of the hemispherical detector array are an effective radius of 0.19 m and a 5×5 array of photodiodes. Increasing the diameter of the array, using additional photodiode elements and using different detector array geometry other than a hemisphere can increase the pose resolution. The placement of the acrylic fixtures on the optical detector array also affects the reliability of the pose estimations.

The range of calibrations was limited by two factors in this study. The first factor is the combination of turbidity in the tank and the specific light source used in this study, which impedes the use of full tank dimensions as calibration range in x-axis. Only a single light source was used in this study, i.e. metal halide light source. Utilizing a laser, the range of detection could be extended greatly. When selecting the hardware components such as the photodiode and the light source, water clarity should be taken into account. The detector and the light source pair that allows maximum light transmittance underwater should be selected. The second factor that limits the calibration range in y and z-axis is the physical dimensions of the wave and tow tank, i.e. width and length. This limited the measurements to ±0.6 m in y-axis and −0.8 m lower than the light source in z-axis.

In addition to the empirical measurements, TPU of the pose estimation was calculated using the Monte Carlo approach. The simulation results show that two of the most influential factors affecting the study is the turbidity of the water column and the hardware noise. These two components affect the photodiode intensity readings significantly. As a result, the uncertainty of the poses can increase drastically. The temperature variation results obtained from the calibrations was not found to be a significant factor affecting the photodiode intensity readings.

Image moments invariants method was utilized in this research in order to develop pose detection algorithms to detect and quantify the relative motion between the UUV and the light source. The pose detection algorithms were developed when there is no noise in the system. The algorithms can provide very accurate estimations when the noise is introduced to the system (standard deviation is 0.5% and 1% of the intensity of the photodiode with the maximum intensity). This shows that algorithm has specific tolerance to noise. However, when excessive noise is added into the system in the form of hardware noise (e.g. standard deviation of the noise is more than 1% of the intensity value of the photodiode with the maximum intensity), the pose detection algorithm can yield inaccurate results.

Figure 5L:
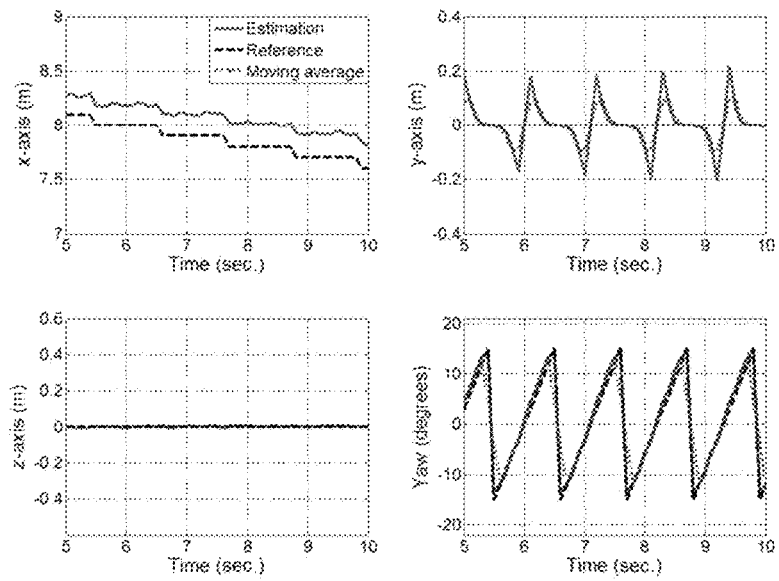
FIG. 5L is a closer look at the cross-talk between yaw and y-axis cross-talk when there is only yaw motion. At x-axis increments of 0.1 m, the conceptual UUV was rotated from −15 o to 15 o at 3 o increments. Monte Carlo simulation was conducted with sample number of 2000 and hardware noise level of 0.5% of the photodiode with the maximum intensity.

It is also important to distinguish between the y-axis and yaw motion in order to inform the control system with an accurate pose feedback. The results suggest that the pose detection algorithms can provide reasonable discrimination between y-axis translation and yaw when there is only y-axis translation. However, at some cases, y-axis translation values could be interpreted as small angle yaw rotations (less than 5° in the nominal case). At these values, the photodiode intensity values for small angle yaw rotation and respective y-axis values were very close to each other which makes the distinguishing process very complex, if not impossible. This small-angle effect was verified for the case when the motion is pure yaw, i.e. no y-axis translation is present by conducting a Monte Carlo simulation (FIG. 5L). FIG. 5L shows a closer look at the cross-talk between yaw and y-axis cross-talk when there is only yaw motion. At x-axis increments of 0.1 m, the conceptual UUV was rotated from −15° to 15° at 3° increments. Monte Carlo simulation was conducted with sample number of 2000 and hardware noise level of 0.5% of the photodiode with the maximum intensity.

It was observed from the results that between rotations of ±3 degrees, the yaw motion was interpreted as y-axis motion. These results from both cases from the Monte Carlo simulations confirm that at small yaw angle detections, the control system should have an extra step to validate that actual UUV motion is yaw. Utilizing more than a single light source can decrease this cross-talk effect.

When calculating the TPU results for the environmental conditions in Portsmouth Harbor, the range of parametric uncertainties regarding the environmental conditions should be increased. The parameters that are expected show greater variation in Portsmouth Harbor than in UNH Ocean Engineering facilities are the diffuse attenuation coefficient due to turbidity. In addition, scattering which was not considered in the model used in this study can be a significant factor that affects the observed beam pattern. Although it was not found to be a significant factor, the seasonal water temperature variations in Portsmouth Harbor should also be taken into account in the pose detection algorithms. These effects are expected to increase the overall uncertainty in the pose estimation. Another important parameter to be considered during implementation of such a system in Portsmouth Harbor are disturbances such as current and waves. In terms of mechanical design and construction, docking platform should be constructed to withstand these disturbances. In addition, the UUV controller should be able to compensate for the potential disturbances.

The optical detector array design can also be used in applications beyond UUV navigation and pose detection. The high sampling rate of the Avalanche Photo Diodes (APDs) can be used for short-range free-space optical communication for data transfer. Also, detector array can be used as an in situ beam diagnostics tool for different light sources to determine the light field and characterize the scattering environment of the water column. One of the electro-optical consideration were to replace the APD detectors with small camera (e.g., commercially off the shelf cameras (COTS)). The benefits of COTS cameras are that they are cost-efficient, easily interfaced to the OBCs and they provide additional spatial information which can improve the pose detection results. However, image extraction and processing time needed for pose detection might not be fast enough for real-time applications.

Conclusions

Optical communication for UUV navigation and docking provides an accurate and cost-effective positioning system that can yield relative pose information of a UUV. Especially, in environments that contain high levels of acoustic noise. The goal of this study was to evaluate the use of an optical detector array unit for pose detection of the UUVs with respect to a docking station using a light source as a guiding beam. A scale model was used to simulate the environmental conditions of Portsmouth Harbor, N.H. at the UNH Ocean Engineering Tank facility. Empirical measurements evaluated the performance of the unit with respect to reference positions and velocities and a Monte Carlo analysis estimated the total propagation uncertainty in the system. The experimental results in UNH Ocean Engineering facilities showed that pose detection in translational axes are within the required pose specifications. The pose estimations were within 0.3 m, 0.1 m and 0.1 m for x, y and z-axis, respectively.

Monte Carlo analysis indicates that the stochastic assessment of the uncertainty in the system was consistent with the experimental results. The results demonstrate that at extreme conditions, i.e. highest amount of x-axis pose estimation uncertainty (95%) was on the order of 1.5 m, y-axis pose estimation uncertainty was 1.3 m and z-axis pose uncertainty was on the order of 1 m. The analysis of the variables separately using Monte Carlo approach showed that the most effective parameter on the uncertainty of the pose estimation is the diffuse attenuation coefficient. Large variation in the hardware noise also had significant implications on the overall pose estimation uncertainty. The algorithm also demonstrated reasonable discrimination power between y-axis translation and yaw rotation. The faulty detections were small angle yaw rotation less than 5°. In the field implementation, i.e. in Portsmouth Harbor, the pose detection uncertainty in 4-DOFs, x, y, z and yaw, are expected to increase due to higher turbidity and environmental disturbances such as waves, currents.

Discussion

In order to fully utilize the optical feedback in underwater, characterization of the underwater environment is essential. Experiments conducted in wave and tow tank show that the effective range between the light source and the light detector is dependent on the diffuse attenuation coefficient as it affects the light intensity during its travel in underwater. In addition, the size of the beam pattern emitted from the light source has also a role in determining the usable portion of the light perpendicular to the optical axis. The approximate dimensions of the optical detector array can be determined based on the location where the light intensity starts to decrease to a certain value such as FWHM.

Because a single light source with a Gaussian light intensity profile is assumed in this study, it is not possible to detect roll changes. In addition, in terms of practical application, most UUVs are built stable in roll and pitch, i.e. there is a specific limit for rotations in these DOFs. Therefore, roll detection is not taken into account in this study. The use of multiple light sources or light sources with different intensity patterns other than Gaussian intensity profile has the potential to add roll detection capability to the detection system. The maximum effective range between the light source and the light detector was kept at 8.5 m in this study. Utilizing lasers, e.g. a green laser at 532 nm wavelength, can increase the range significantly.

The detector array can detect translational changes of 0.2 m and rotational changes (pitch and yaw) of 10°. A larger array size is needed to detect smaller changes. However, a larger array size may not be suitable for all UUV types. While some UUVs such as a larger work-class ROVs can handle array sizes with bigger dimensions, for the observation class ROVs or an AUV, the mechanical stability can degrade by changing locations of center of gravity and center of buoyancy. Another factor affecting the detection capability is the light source characteristics. A narrow beam light source can provide better resolution detections both in translation and rotation. Light sources with different intensity profiles other than Gaussian can also change the detection capabilities.

The pose feedback is obtained by converting the beam pattern sampled on the optical detector array into usable pose information through image processing algorithms. Among these algorithms used in this study are phase correlation and log-polar transform, Spectral Angle Mapper (SAM), and image moments invariants. Phase correlation and log polar transform algorithm is able to yield reliable translation estimations. However, it is not good for rotational estimations due to the symmetry of the sampled images. SAM algorithm proved to be useful for verifying the pose detection capability of the array. However, in terms of control algorithm development perspective, the SAM algorithm requires extensive calibration procedure. It also increases the number of characteristic image parameters to be used in a look-up table for distinction between the motion types. This can increase the processing time and therefore result in a slower UUV thruster response which is undesirable. Image moments invariants algorithm yields reliable estimations for both translation and rotation. In addition, the processing time to obtain the pose estimates is faster due to the linear models obtained from the calibration procedure. In addition, the calibration procedure is not as lengthy as the SAM algorithm. Therefore, image moments invariants approach is chosen to extract the pose from a sampled image.

Two types of controllers were evaluated in this study, Proportional-Integral-Derivative (PID) and Sliding Mode Controller (SMC). The response characteristics such as overshoot were identified in conjunction with the feedback obtained from the image moments invariants algorithm. The analytical results for a static-dynamic system suggest that PID controller exhibit excessive overshoot which is not tolerable in this application. When overshoot occurs during alignment with the light source, the UUV goes out-of-sight and loses communication with the guiding beacon. The overshoot can be tolerated in x-axis but for y and z-axis control, this should be avoided. Control simulations with SMC suggest that satisfactory performance could be obtained in both static-dynamic and dynamic-dynamic system. However, a time-varying boundary layer must be implemented with SMC in order to avoid chatter. In addition, SMC requires a full-state feedback, i.e. it should receive measurements for both position and velocity. The developed optical detector array can yield only pose information. The time-derivative of the pose measurements must be taken and filtered in order to have a smooth reference for the controller. Overshoot was not observed in SMC which makes it a more viable choice over PID as a controller. For the controllers that require extensive knowledge about the vehicle model and parameters, system identification of the vehicle should be conducted through experimental work. Other type of controllers such as $H_\infty$ and adaptive controllers should also be investigated for their practicality in UUV control with optical feedback applications. Additional sensors that measure the disturbances and implementation of observers can contribute for a better control system. It was also found that satisfactory control performance can be obtained by using a minimal 5×5 array and thus use of larger number of arrays is not necessary. This is an important finding as it eliminates the costs associated with extra hardware such as large number of photodiodes, which in turn require large number of ADC boards, extra OBCs and reverse-bias circuitry. This also reduces the logistical complexity for the hardware implementation.

The accuracy of the detections was tested for two types of potential docking applications, i.e. funnel docking and pole docking. In funnel docking applications, the UUV entrance trajectory is more important than its speed. Therefore, for this application pose estimation accuracy is critical. For the pole docking applications, the UUV velocity is more essential. Thus, the velocity estimations have more importance in this case. The pose detection algorithms were developed based on sampled beam patterns for a total number of 125 positions. Based on this set of calibrations, to estimate the pose, linear models were developed utilizing the image moments invariants matrix identities. The performance of the optical detector array was evaluated for both accuracy of pose estimations and velocity estimations. The experimental evaluation of the pose detection of optical detector array demonstrated that the developed system can determine the pose with 0.3 m accuracy in x-axis, and 0.1 m in both y and z-axis. Velocity estimates were within 0.1 m/s of the actual tow velocity.

There are several factors that contribute to the accuracy of the pose detections using optical feedback. The physical affects that contribute to the errors in the measurements can be listed as the vibration of the towing mechanism on the wave and tow tank and the drag force exerted on the optical detector array. These affects cause the array to displace and as a result the real-time intensity measurements differ significantly from the offline calibration measurements at the same locations. The setup used in the experiments consists of a single 80/20 aluminum frame submerged into the water. One potential solution to minimize these effects on the pose estimations is to use a more stable setup for calibrations. In addition, the placement of the acrylic fixtures on the hemispherical surface also is a source of systematic error for the pose estimations. Another potential contribution to the pose errors is the linear models obtained from the calibration procedure through image moments invariants algorithms. Because the calibration models are linear, the pose estimates are not equally accurate at each position.

The uncertainty analysis through Monte Carlo simulations revealed that most important factors affecting the pose estimation accuracy is the turbidity in the water and the noise which could be due to both environmental effects (background noise) and hardware noise. It was also observed that the temperature variation did not have a significant effect on the estimations. Monte Carlo simulations were run for 2000 samples with varying diffuse attenuation coefficient, hardware noise and temperature values. The samples for these parameters were generated with respect to normal distributions with an assumed known mean and standard deviations. The pose detection algorithms were developed for zero hardware noise in the system and the algorithms proved to be robust to noise with standard deviation more than 1% of the intensity value of the photodiode with the maximum intensity. However, as expected, increasing the amount of hardware noise resulted in additional uncertainty in the system. If the background noise in the environment is excessive or turbidity is high, the algorithms may not yield accurate estimations. However, this is an inherent issue with this application.

It is also of importance to distinguish motion that occurs in the same plane. For example, y-axis translation and yaw act on the same plane and therefore it becomes complex to discriminate between these two different motion types. After a calibration procedure, it was found that for the most part of the range under test, i.e. ±15°, y-axis translation and yaw could be distinguished. The failure to discriminate between y-axis translation and yaw occurs when yaw is less than 5°. Around this angle, the corresponding intensity values on the optical detector array were almost identical with the translation counterpart. This makes it a complex process to distinguish between these two motion types, especially in turbid and/or noisy environments.

In the real-world implementation of such a system such as in Portsmouth Harbor, the pose estimation uncertainties are expected to increase due to increased diffuse attenuation coefficient as a result of increased turbidity in the harbor. Scattering which was not considered in this study can also be a significant factor affecting the beam pattern incident on the optical detector array. In addition, background noise which can be evident in the form of sediment plumes is expected to increase the pose uncertainty. By evaluating the data from NOAA Charts, the environmental disturbances such as waves and currents are also expected to increase in Portsmouth Harbor. The docking station should be constructed to withstand these environmental forces. UUV control system also should compensate for these disturbances while navigating into the docking station.

Conclusions

This study has shown the proof of concept of an optical detection system that can yield satisfactory pose estimation results. Pose detection capabilities and limitations have been demonstrated for static-dynamic and dynamic-dynamic systems through simulation and experiments. The limitations of the system in real-world conditions have been identified.

In order to design such a system, as the first step, underwater environment was characterized in order to evaluate the feasibility of a detection and control system using optical feedback. From the experiments, it was found that in 500-550 nm wavelength band, the light transmission is at maximum. FHWM radius of the beam expands from 0.3 m to 0.4 m from 4.5 m to 8.5 m distance. These findings yield a foundation for hardware selection and dimensions of the proposed optical detector array design.

Two types of optical array geometries were evaluated for pose detection in underwater, i.e. planar and curved arrays. The selection criteria for the optical array design include the following: 1) the array should distinguish changes in position and orientation based on a single light source. The array is expected to distinguish motion in 5-DOF, i.e. translations in x, y and z-axis as well as pitch and yaw. Due to the beam symmetry emitted from a single light source, it is not possible to detect roll. 2) The array should have minimum number of optical detectors that can yield pose information, reduce processing time and reduce the costs. In order to evaluate the performance criteria, a numerically based simulator that takes the relative geometry between the light source and the detector as inputs, the water turbidity, hardware and background noise was developed. SAM algorithm evaluated the changes in position and orientation. Using a 21×21 array, it was shown that the translational changes of 0.2 m and rotational shifts of 10° can be detected. The curved array was also shown to be more sensitive to the changes in rotation whereas the two arrays performed similar for the translational shifts. Further simulations showed that a minimum of 5×5 array is required to distinguish changes in 5-DOF. Experimental measurements verified the accuracy of the simulator generated images.

The goal of this research is to use the optical feedback generated from the optical detector array in control applications. Pose detections and control algorithms were developed in order to dynamically position the UUV in static-dynamic system, i.e. a fixed light source as a guiding beacon and a UUV, and dynamic-dynamic system, i.e. moving light source mounted on the crest of a leader UUV and a follower UUV follows its path. The algorithms were evaluated based on processing time, positional accuracy and dependence on the environmental characteristics. A hemispherical array of sizes 5×5 and 21×21 was used to develop the algorithms. Evaluation of image processing techniques such as log-polar transform and phase correlation, SAM and image moments invariants demonstrated that image moments invariants method is the most suitable algorithm in terms of processing time and positional accuracy. The dependence on the noise is an inherent issue for this application and under excessive noise the accuracy of the results degrades for all of the algorithms. Evaluation of PID and SMC for static-dynamic and dynamic-dynamic cases demonstrated that PID is not suitable for this application as it creates an overshoot during dynamic positioning, causing the UUV to lose line of sight with the light source. SMC on the other hand did not yield excessive oscillations and showed satisfactory performance for both static-dynamic and dynamic-dynamic applications. Analysis of the effect of detector number on the array revealed that a 5×5 detector array is sufficient to generate pose feedback to be used in UUV control applications.

After analytical results that compare the effect of detector size, geometry, image processing algorithms and control algorithms on the accuracy of pose estimations, the optical detector array was experimentally built. The final prototype consists of a hemispherical 5×5 array with an effective radius of 0.19 m. The underwater calibrations were conducted for 125 different positions in x, y and z-axis. Pose detection algorithms were developed based on the calibration results using image moments invariants algorithm. Underwater experiments conducted in wave and tow tank showed that pose detection accuracy was within 0.3 m in x-axis and it was within 0.1 m in y and z-axis. The velocity estimations were also within 0.1 m/s. The stochastic assessment of the pose estimations was done using Monte Carlo simulations. The Monte Carlo simulation results show that the experimental pose estimations are within model generated CI bounds (95%). It was also demonstrated there is reasonable discrimination power between y-axis translation and yaw rotation. The faulty detections were small angle yaw rotation less than 5°. The results also demonstrate that at the extreme calibration conditions, the x-axis pose estimation uncertainty (95%) was on the order of 1.5 m, y-axis pose estimation uncertainty was 1.3 m and z-axis pose uncertainty was on the order of 1 m. In the field implementation, i.e. in Portsmouth Harbor, the pose detection uncertainty in 4-DOFs, x, y, z and yaw, are expected to increase due to higher turbidity and environmental disturbances such as waves, currents.

Photodiode Data Collection Procedure Using Beagleboard-XM and Two Arduinos

This section explains the data collection procedure using the onboard computer Beagleboard-XM (BB-XM) and two Arduinos used as A/D converters. Any photodiodes can be used in this type of setup and here Hamamatsu S1133 will be used. In the actual experiments Thorlabs SM05PD1A will be used.

Figure 6A:
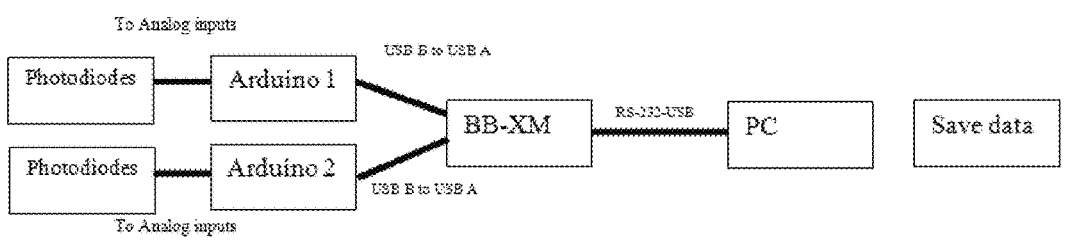
FIG. 6A illustrates a Photodiode-PC communication general diagram.

The data collection procedure can be completed as follows. Photodiodes intersect the light and converts that into current. A voltage reading across the terminals is done by two separate Arduino A/D input pins of 10-bits, i.e. 0-1023 bits. Currently, there are 9 photodiodes so there will be 5 photodiodes on one Arduino and 4 on the other. Arduinos are connected serially to the BB-XM via the USB ports. BB-XM is connected to a PC through a RS-232 (on BB-XM) to USB cable (on PC side) (FIG. 6A). Python serial libraries are used for communication. In addition, all the code to collect the data is written in Python programming language. This section is divided into two sections, i.e. A) Arduino and B) BB-XM. FIG. 6A shows a photodiode-PC communication general diagram.

A) Arduino
1) Upload the Arduino sketches (The Arduino sketch for this application is in the folder hmtsu. The program's name is hmtsu.ino) to the Arduino Boards on a PC. Make sure that the program is uploaded separately to the two boards and modify the program accordingly. For example, there are 25 photodiodes and so Arduinos will get 13 and 12 PD readings accordingly. Change the number of PDs specified in the sketch accordingly (FIG. 6B).
2) Disconnect the Arduino from the PC.

Figure 6B:
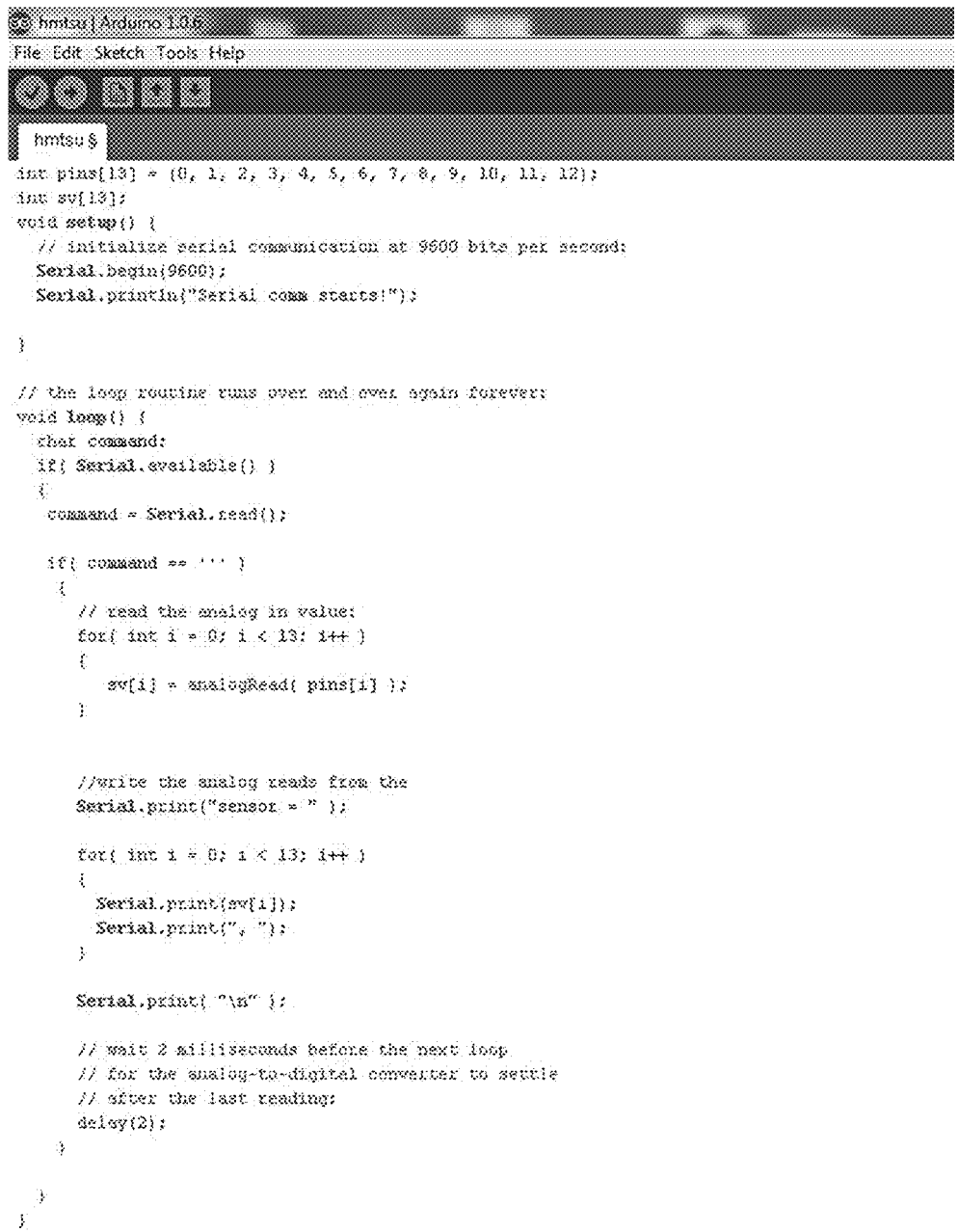
FIG. 6B shows an Arduino sketch. This will be for one Arduino. For the other Arduino change the 13 to 12 and other variables accordingly.

FIG. 6B shows an example Arduino sketch. The example shown will be for one Arduino.

For the other Arduino change the 13 to 12 and other variables accordingly

B) BB-XM

Figure 6C:
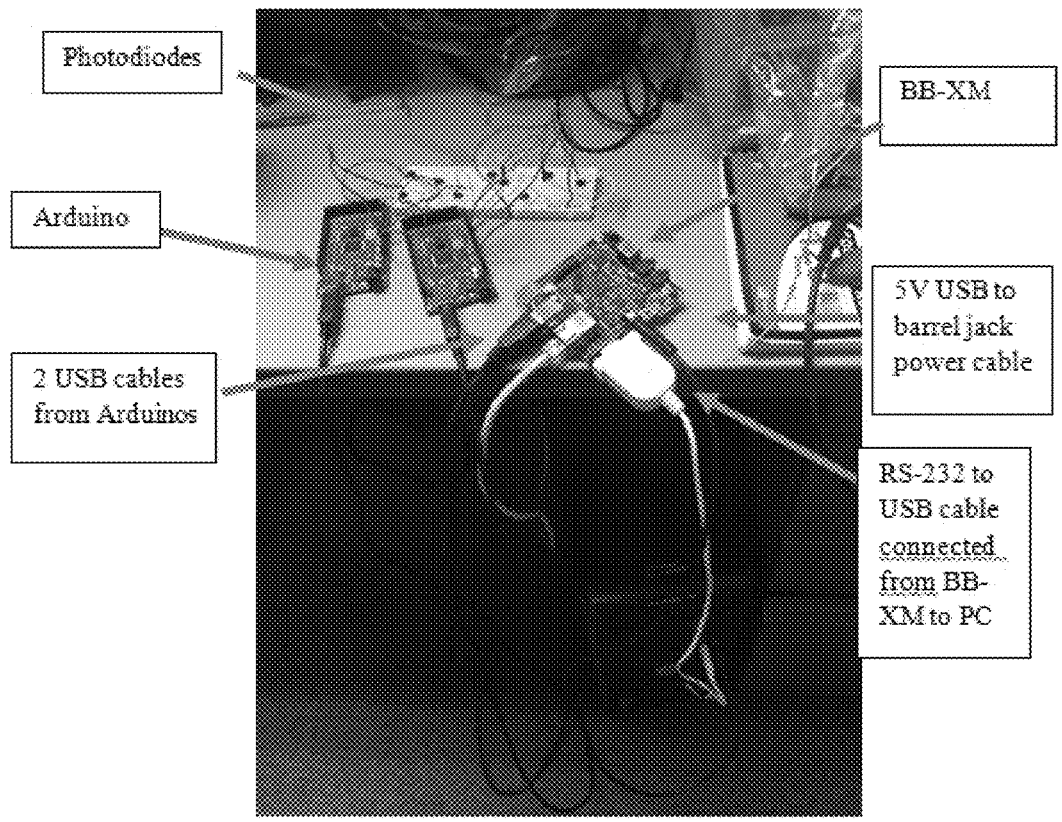
FIG. 6C shows a BB-XM setup.
Figure 6D:
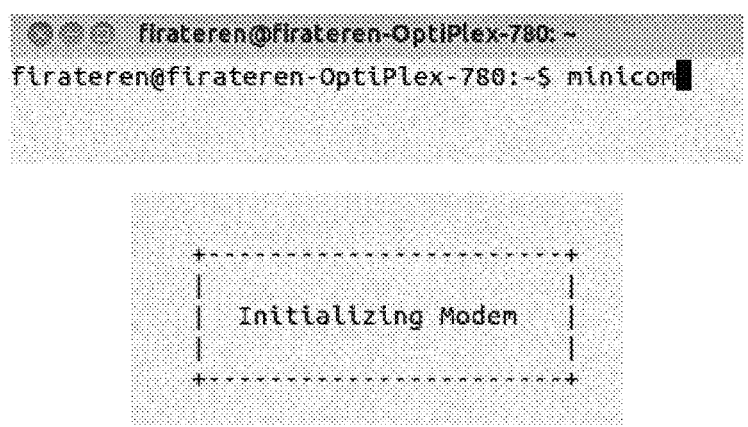
FIG. 6D shows a Minicom login screen.
Figures 6E, 6F:
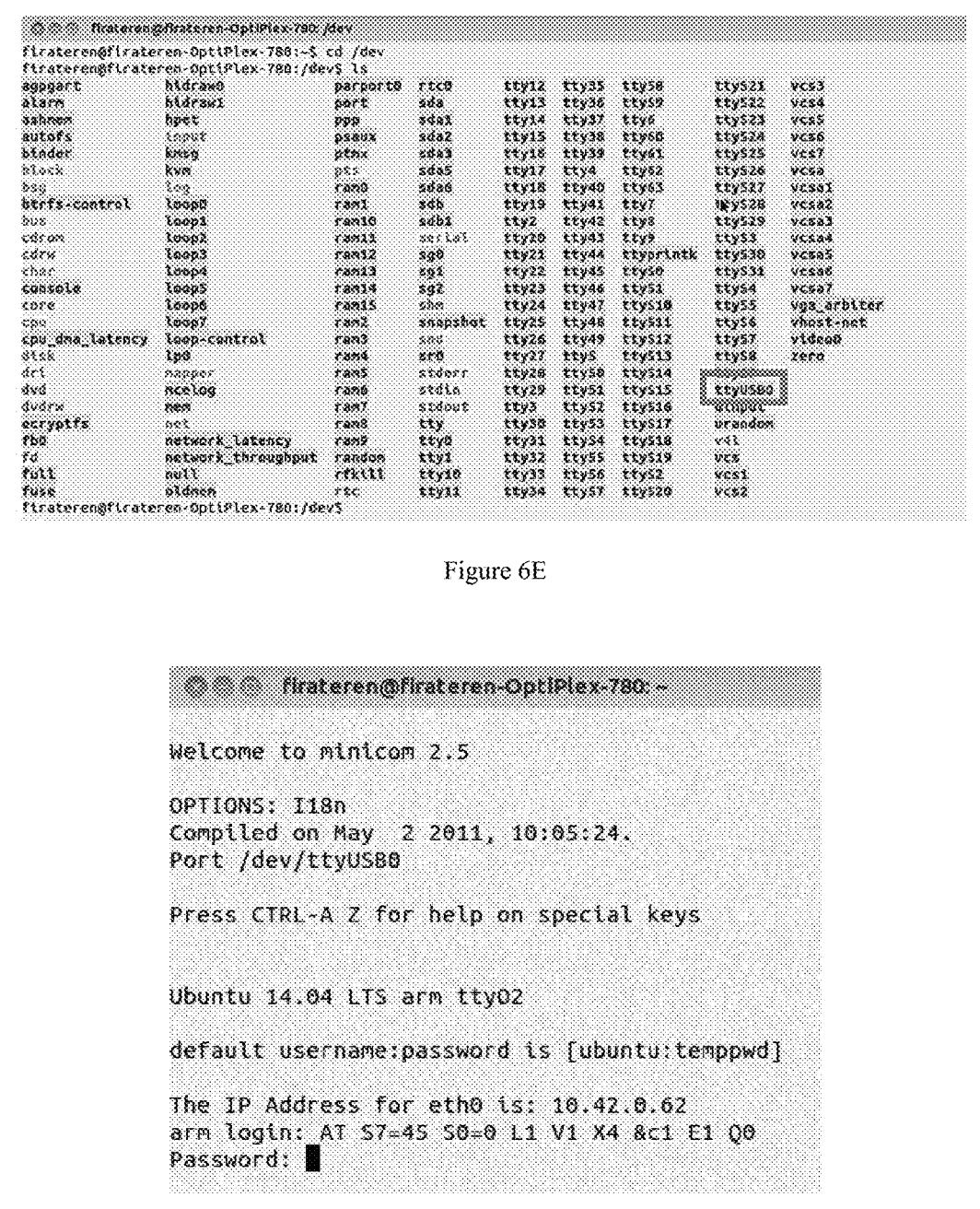

In order to access BB-XM, we use the linux (Ubuntu) operating system.
1) Powering the BB-XM. We use a RS-232 to USB cable here. RS-232 cable is connected to the BB-XM and the USB end connects to the PC. Connect the Arduino USB cables to the two of BB-XM USB ports. Make sure the SD card is in BB-XM. BB-XM will be powered from PC in experiments (We will connect a battery in later stages). After making sure everything is connected, connect the barrel end of the 5V barrel jack to USB power cable to the BB-XM and the USB end to the PC (FIG. 6C).
2) Connect to the BB-XM from a PC through minicom. Open a terminal in Ubuntu by Ctrl+Alt+T. In the terminal window type: minicom. It should display Initializing Modem on the screen. (If it does not connect, the port name might not be correct. In this case find the correct port name and type minicom –D/dev/ttyUSBX. Note: ttyUSBX is the device name. You can find the device name by typing cd/dev and then type 1s). (FIG. 6D-E). FIG. 6D shows a Minicom login screen. FIG. 6E shows a serial to USB port check on PC.
3) After accessing BB-XM through minicom, arm login will not accept what you type as password initially. At the second attempt, type armlogin: firat, password: 1985fir. Remember that you will not be able to see what you type in the password prompt area (FIG. 6F). FIG. 6F shows an arm login and password screen.

4) Similarly, you can check the Arduino device names on BB-XM by typing cd/dev and then typing ls in the minicom terminal. The Arduino device names are typically ttyACM0 and ttyACM1. These port names are very important while establishing the serial connection between BB-XM and the PC. (FIG. A.7)

5) For serial communication protocol and for data collection code, we use Python programming language in both platforms, PC and BB-XM.

Figures 6G, 6H:
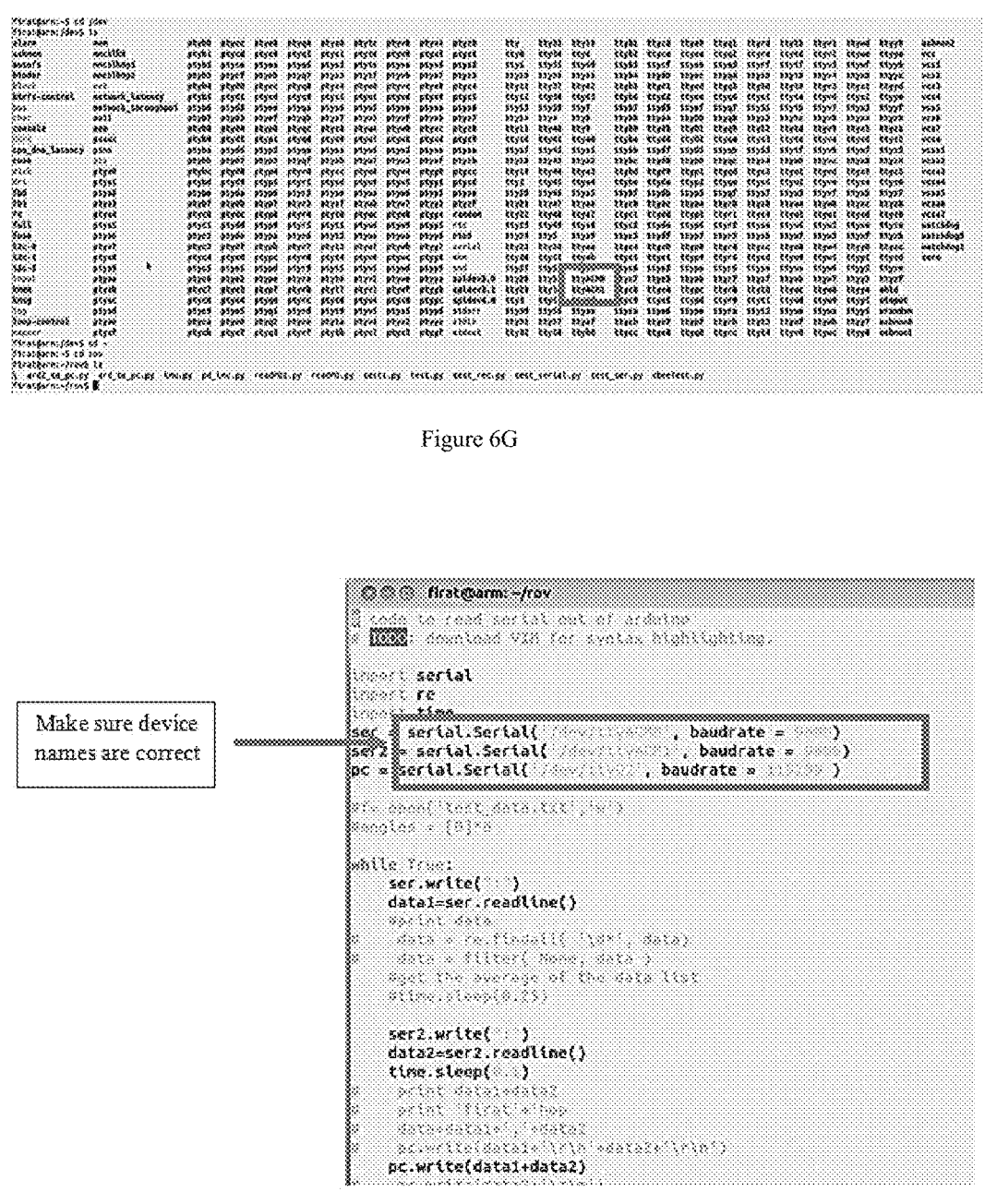

6) To access the data collection program in BB-XM, type cd rov. (Note: If you are in /dev folder, then you need to go back to home by typing cd ~) All the programs are in the rov folder. Then type ls to see the programs. The program to collect data from Arduinos to the BB-XM is readPD.py. FIG. 6G shows a Arduino Device names verified in the BB-XM.

7) In order to access the contents of the program readPD.py, type vim readPD.py (FIG. 6H). vim is the name of the text editor. Make sure the device names match with the connected device names. IMPORTANT: If you need to edit the file, you need to go into insert mode. Do this by hitting I button on keyboard. When it is in insert mode, you will see—INSERT—at the bottom of the program. If you are not in the insert mode, you cannot change the contents. When you are in the INSERT mode:

To save and exit type ":wq"
To exit without saving, type: ":q!"
To exit only if you have not changed anything, type: ":q"

FIG. 6H shows a program that reads data from two Arduinos and passes it to the pc. (readPD.py).

Figures 6I, 7A:
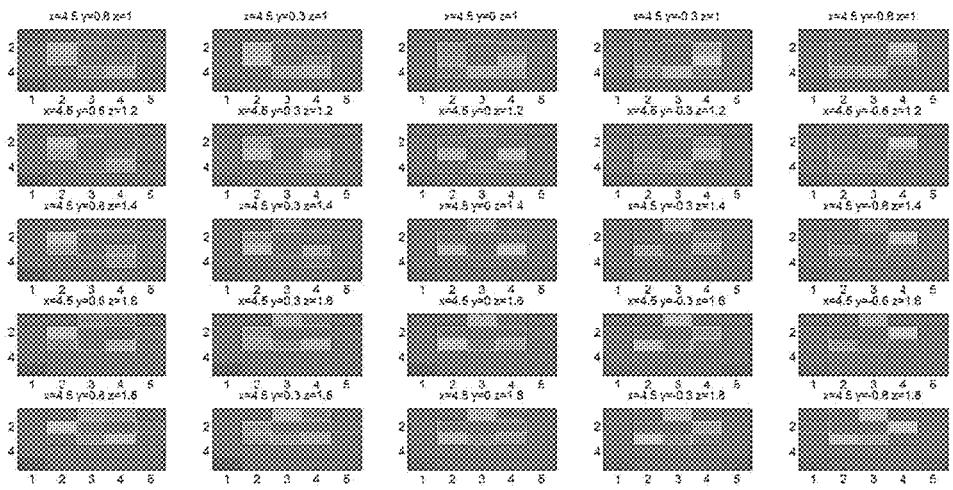
FIG. 6I shows a program that reads the serial output of BB-XM and saves it to a file (getPD.py)
FIG. 7A shows beam pattern images at x=4.5 m

8) The data collection and observation will be on the PC side. Open a new terminal on PC (Ctrl+Alt+T). Then type cd Desktop/test. The name of the program for data collection is getPD.py. You can also access the program by clicking the test folder in Desktop and double clicking on the getPD.py program. (FIG. 6I). This program reads the serial output coming from the BB-XM and saves it into a text file. FIG. 6I shows the program that reads the serial output of BB-XM and saves it to a file (getPD.py).

9) To collect data, go to the minicom terminal, go to the rov folder and type python readPD.py. You will see the series of numbers printed out on the minicom terminal.

10) Now go to the PC terminal to the test folder on Desktop. Type python getPD.py. You will see an error saying that the device reports open but no serial data. Go to the minicom terminal and close it. If minicom screen is open, there will be no data collection.

11) Go back to the PC terminal and once again type python getPD.py. The data collection will start.

IMPORTANT: You can kill the data collection by pressing CTRL+C on the PC terminal. For data collection at a different geometry, change the filename to your geometry for later analysis, and repeat step 11. Everything will be changed on the PC screen from now on. Minicom will keep running.

Figure 7B:
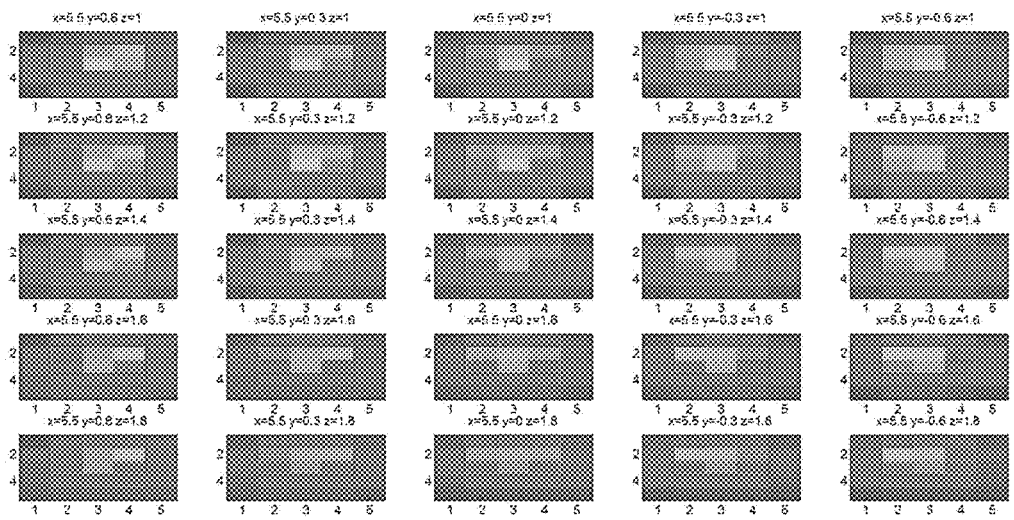
FIG. 7B shows beam pattern images at x=5.5 m
Figure 7C:
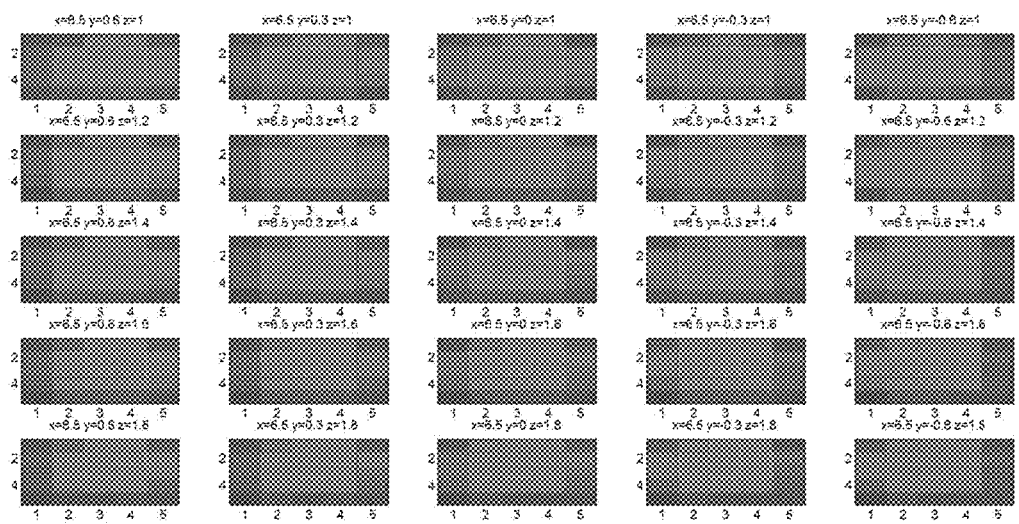
FIG. 7C shows beam pattern images at x=6.5 m
Figure 7D:
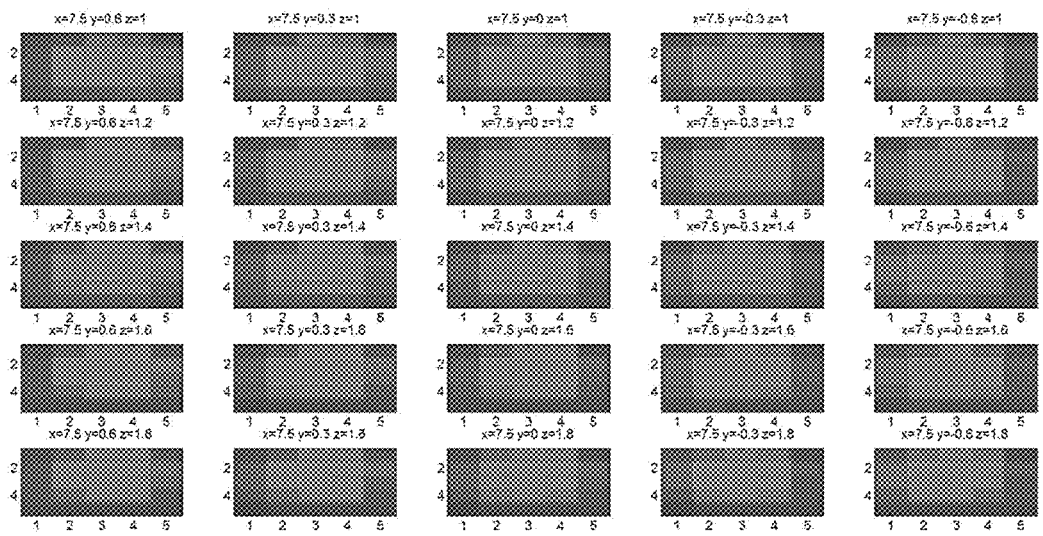
FIG. 7D shows beam pattern images at x=7.5 m
Figure 7E:
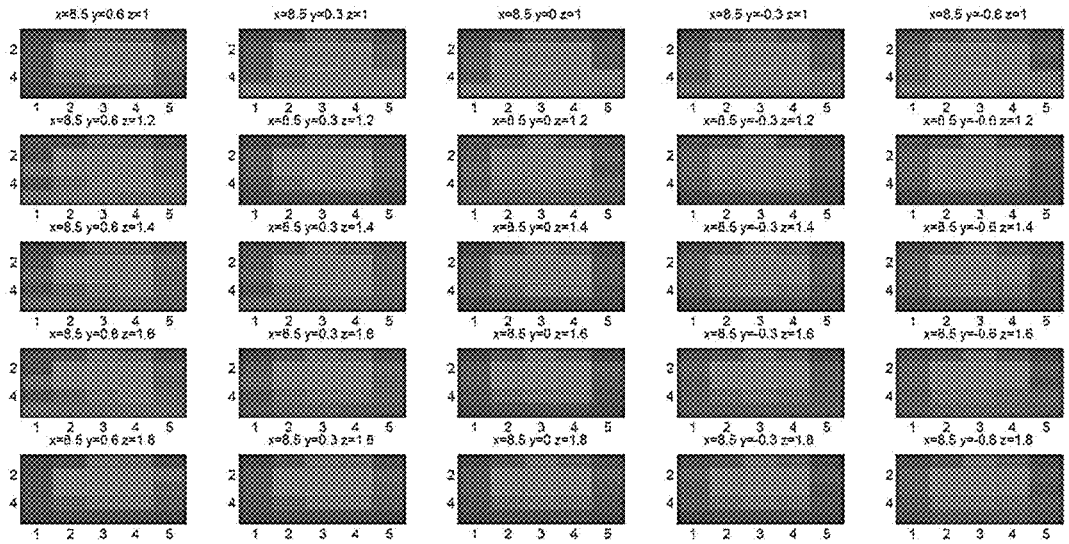
FIG. 7E shows beam pattern images at x=7.5 m

Beam Patterns from Experimental Data
1) 4.5 m
FIG. 7A shows beam pattern images at x=4.5 m
2) 5.5 m
FIG. 7B shows beam pattern images at x=5.5 m
3) 6.5 m
FIG. 7C shows beam pattern images at x=6.5 m
4) 7.5 m
FIG. 7D shows beam pattern images at x=7.5 m
5) 8.5 m
FIG. 7E shows a beam pattern images at x=7.5 m Programs for Experimental Data Collection and Analysis This section includes the programs that were written for photodiode data collection. The photodiode readings are first sampled in the Arduino A/D sketch, i.e. Arduino environment program. Then, the readings from two Arduinos are received by the BB-XM in two different USB ports. The program that resides in the PC, i.e. readPD.py, saves the readings in a text file. Then a separate MATLAB file was written to read the contents of the text file.

1) Program to Collect Photodiode Data to Arduino (hmtsu.ino)

```
int pins[13] = {0, 1, 2, 3, 4,5,6,7,8,9,10,11,12};
int sv[13];
void setup( ) {
  // initialize serial communication at 9600 bits per second:
  Serial.begin(9600);
  Serial.println("Serial comm starts!");
}
// the loop routine runs over and over again forever:
void loop( ) {
  char command;
  if( Serial.available( ) )
  {
    command = Serial.read( );
      if( command == '!' )
    {
      // read the analog in value:
      for( int i = 0; i < 13; i++ )
      {
        sv[i] = analogRead( pins[i] );
      }
      //write the analog reads from the
      Serial.print("sensor = " );
      for( int i = 0; i < 13; i++ )
      {
        Serial.print(sv[i]);
        Serial.print(", ");
      }
      Serial.print( "\n" );
      // wait 2 milliseconds before the next loop
      // for the analog-to-digital converter to settle
      // after the last reading:
      delay(2);
    }
  }
}
```

2) Program to Get the Photodiode Readings from Arduino to BB-XM (readPD.py)

```
# code to read serial out of arduino
import serial
import re
import time
ser = serial.Serial('/dev/ttyACM0', baudrate = 9600)
ser2 = serial.Serial('/dev/ttyACM1', baudrate = 9600)
pc = serial.Serial('/dev/ttyO2', baudrate = 115200 )
while True:
    ser.write("!")
    data1=ser.readline( )
    ser2.write("!")
    data2=ser2.readline( )
    time.sleep(0.1)
    pc.write(data1+data2)
```

3) Program to Get the Photodiode Readings from BB-XM to PC and Save as a .txt File (getPD.py)

```
# program to get the serial data from BB-XM
# use this file to collect data
import serial
import time
import re
# make sure the connection names are correct
sercom=serial.Serial(port='/dev/ttyUSB0',baudrate=115200,parity=serial.
PARITY_NONE,stopbits=serial.STOPBITS_ONE,bytesize=
serial.EIGHTBITS)
sercom.open( )
sercom.isOpen( )
#make sure to change the filename to correspond to the test coordinate
f=open('single arduino.txt','w')
while True:
#       bytesToRead = sercom.inWaiting( )
        x=sercom.readline( )
        f.write(time.ctime( )+','+x)
        f.flush( )
#       print time.ctime( )+','+x
f.close( )
```

4) Program that Extracts the Intensity Readings from the Text File and Processes

```
% Data processing program that reads in the txt files and parses the
values
% into photodiode values
clear;clc;
close all
%% 1) Data Parsing
count=1;
% fileID=fopen('x4.5_y0_z1_upright.txt','r'); %1
xi=4.5;
zi=1.2;
yi=0.3;
% for xi=4.5:8.5
      for zi=1:0.2:1.8
          for yi=-0.6:0.3:0.6
fileID=fopen(sprintf('x%2g_y%1g_z%1g.txt',xi,yi,zi));
N=5;
data=fread(fileID, [1 inf], '*char');
% Number of detectors on Arduino 1 and 2
PD1=13;
PD2=12;
Psum=PD1+PD2+2; % This property is used for data parsing
% find 2014 in the file.. Change this to 2015 in the next year
cycles = strfind(data, '2015');
fclose(fileID);
% Day_ind=strfind(data,Day);
comaind=strfind(data,',');
% Day_ind=Day_ind(2:end)'
k=2;
if comaind(14)-comaind(13)<=5
for i=1:length(cycles)/2
Ard1(i,:)=str2num(data(cycles(2*i-1)+5 : comaind(Psum*i-PD1)));
Ard2(i,:)=str2num(data(cycles(2*i)+5: comaind(Psum*i)));
k=k+1;
end
else
PD1=12;PD2=13;
for i=1:length(cycles)/2
Ard2(i,:)=str2num(data(cycles(2*i-1)+5 : comaind(Psum*i-PD1-2)));
Ard1(i,:)=str2num(data(cycles(2*i)+5: comaind(Psum*i)));
k=k+1;
end
end
PD=[Ard1 Ard2];
%% Plot of the average
PDsum=mean(PD);
stdev(count,:)=std(PD);
for i=1:5
   B(i,1:5)=PDsum(1,5*i-4:5*i ) ;
end
subplot(5,5,count)
```

-continued

```
imagesc(B)
caxis([0 1023])
%% 2) Moment Calculation
[row,col]=find(B==max(max(B)));
row=row(1);
col=max(col); % Sometimes multiple values are returned. Will pick max
row;
%% Sub-pixel accuracy algorithm
% First derivatives
dIdx= (B(row,col+1)-B(row,col-1))/2;
dIdy= (B(row+1,col)-B(row-1,col))/2;
% Second derivatives
d2Idx2=B(row,col+1)-2*B(row,col)+B(row,col-1);
d2Idy2=B(row+1,col)-2*B(row,col)+B(row-1,col);
% Second partial derivatives
d2Idxdy=0.25*(B(row+1,col+1)+B(row-1,col-1)-B(row-1,col+1)-
B(row+1,col-1));
H=[d2Idx2 d2Idxdy; d2Idxdy d2Idy2];
D=[dIdx;dIdy];
S=-inv(H)*D;
col_sub(count)=col+S(1); % Calculate the sub-pixel accuracy
row_sub(count)=row+S(2);
title(sprintf('x=%1gm y=%1gm z=%1gm ',xi,yi,zi))
xf=1:N;
yf=1:N;
[Ypos,Zpos]=meshgrid(xf,yf);
Ysort=reshape(Ypos,N*N,1);
Zsort=reshape(Zpos,N*N,1);
i=0;li=1;
for i=0:2
    for j=0:2
      k=1;
      for k=1:N*N
        Mom(k,li)=((Ysort(k)-col_sub(count))^i) * ((Zsort(k)-
row_sub(count))^j) *PDsum(k);
        Mom_norm(k,li)=Mom(k,li)/sum(PDsum);
        end
        li=li+1;
    end
end
Mnt=sum(Mom_norm);
Mmnt(3*count-2:3*count,:)=transpose(reshape(Mnt,3,3));
count=count+1;
         end
    end
% end
sprintf('row values are between %1g-%1g',min(row_sub),
max(row_sub))
sprintf('col values are between %1g-%1g',min(col_sub),max(col_sub))
```

The invention claimed is:

1. An optical detector system comprising:
a plurality of light sensors configured to detect a broad spectral range of light;
at least one controller coupled to the plurality of light sensors and configured to:
receive a plurality of light intensity signals acquired from a light source by the plurality of light sensors;
determine a first pose of the optical detector system relative to the light source based on the plurality of light intensity signals;
determine a second pose of the optical detector system relative to the light source based on the plurality of light intensity signals;
determine an estimated velocity of the optical detector system relative to the light source based at least in part on the plurality of light intensity signals, the first pose, and the second pose;
determine at least one command based at least on the first pose and second pose; and
transmit the at least one command to adjust a trajectory of the optical detector system.

2. The optical detector system of claim 1, further comprising at least one band-pass filter coupled to the plurality of light sensors.

3. The optical detector system of claim 2, wherein the at least one band-pass filter is configured to attenuate wavelengths outside of 500-550 nanometers.

4. The optical detector system of claim 1, further comprising a data storage coupled to the at least one controller and configured to store data specifying that the second pose be within a distance of the light source specified by a reference value.

5. The optical detector system of claim 4, wherein the reference value is 8.5 meters.

6. The optical detector system of claim 1, wherein the array has a length of 0.6m.

7. The optical detector system of claim 1, wherein the at least one controller is selected from a list including a proportional integral derivative (PID) controller, a sliding mode controller (SMC), and an adaptive controller.

8. The optical detector system of claim 1, wherein an accuracy of pose estimation is within 0.1 meters in a y-direction and a z-direction and less than 0.3 m in an x-direction.

9. The optical detector system of claim 1, wherein the optical detector system comprises a static-dynamic system, a dynamic-dynamic system, or both a static-dynamic system and a dynamic-dynamic system.

10. The optical detector system of claim 1, wherein the at least one controller is configured to determine the first pose and the second pose using a spectral angle mapper, image moment invariants, or both a spectral angle mapper and image moment invariants.

11. The optical detector system of claim 1, further comprising an optical modem, wherein the at least one controller is configured to transmit the at least one command via the optical modem.

12. The optical detector system of claim 1, wherein determining the first pose, determining the second pose, or each of determining the first pose and determining the second pose comprises determining motion of the optical detector system in at least five degrees of freedom.

13. The optical detector system of claim 1, wherein the at least one controller is configured to make corrections to a beam pattern formed by the plurality of signals based on environmental conditions.

14. The optical detector system of claim 1, wherein the estimated velocity is within a speed of a target velocity.

15. The optical detector system of claim 14, wherein the speed is 0.1 m/s.

16. The optical detector system of claim 1, comprised within an unmanned underwater vehicle.

17. The optical detector system of claim 16, wherein the at least one controller instructs translational or rotational movement of the unmanned underwater vehicle in predefined increments.

18. The optical detector system of claim 17, wherein the predefined increments are at least 0.02 m along a y-axis and a z-axis, at least 1 m along a x-axis, and at least 3 degrees rotationally.

19. An unmanned underwater vehicle comprising:
   an optical detector array comprising:
      a plurality of light sensors configured to detect a broad spectral range of light;
      at least one controller coupled to the plurality of light sensors and configured to:
         receive a plurality of light intensity signals with the plurality of light sensors;
         determine a pose and an estimated velocity of the optical detector array relative to the light source based at least in part on the plurality of light intensity signals; and
         control and detect distance and control motion and orientation between the optical detector array and the light source.

20. The unmanned underwater vehicle of claim 19, wherein the at least one controller is configured to navigate the unmanned underwater vehicle to a docking station and control the velocity during navigation into the docking station.

21. The unmanned underwater vehicle of claim 19, wherein the unmanned underwater vehicle is configured to follow the light source.

22. The unmanned underwater vehicle of claim 21, wherein the light source is comprised within another unmanned underwater vehicle.

* * * * *